July 7, 1964 A. R. CHASAR 3,139,994

MECHANICAL LOAD HANDLING, TRANSFER AND STORAGE EQUIPMENT

Filed Nov. 2, 1960 19 Sheets-Sheet 1

INVENTOR.
ANTHONY R. CHASAR

BY

Meyer, Baldwin, Doran & Young
ATTORNEYS

July 7, 1964 A. R. CHASAR 3,139,994

MECHANICAL LOAD HANDLING, TRANSFER AND STORAGE EQUIPMENT

Filed Nov. 2, 1960 19 Sheets-Sheet 2

INVENTOR.
ANTHONY R. CHASAR

BY

Meyer, Baldwin, Doran & Young

ATTORNEYS

INVENTOR.
ANTHONY R. CHASAR
BY
Meyer, Baldwin, Doran & Young
ATTORNEYS

July 7, 1964 A. R. CHASAR 3,139,994

MECHANICAL LOAD HANDLING, TRANSFER AND STORAGE EQUIPMENT

Filed Nov. 2, 1960 19 Sheets-Sheet 4

INVENTOR.
ANTHONY R. CHASAR

BY

Meyer, Baldwin, Doran & Young
ATTORNEYS.

INVENTOR.
ANTHONY R. CHASAR
BY
Meyer, Baldwin, Doran & Young
ATTORNEYS

July 7, 1964 A. R. CHASAR 3,139,994

MECHANICAL LOAD HANDLING, TRANSFER AND STORAGE EQUIPMENT

Filed Nov. 2, 1960 19 Sheets-Sheet 6

INVENTOR.
ANTHONY R. CHASAR

BY

Meyer, Baldwin, Doran & Young

ATTORNEYS

July 7, 1964 A. R. CHASAR 3,139,994

MECHANICAL LOAD HANDLING, TRANSFER AND STORAGE EQUIPMENT

Filed Nov. 2, 1960 19 Sheets-Sheet 7

INVENTOR.
ANTHONY R. CHASAR

BY

Meyer, Baldwin, Doran & Young

ATTORNEYS

July 7, 1964 A. R. CHASAR 3,139,994

MECHANICAL LOAD HANDLING, TRANSFER AND STORAGE EQUIPMENT

Filed Nov. 2, 1960 19 Sheets-Sheet 8

INVENTOR.
ANTHONY R. CHASAR

BY

Meyer, Baldwin, Doran & Young

ATTORNEYS

INVENTOR.
ANTHONY R. CHASAR

BY
Meyer, Baldwin, Doran & Young
ATTORNEYS

INVENTOR.
ANTHONY R. CHASAR

BY
Meyer, Baldwin, Doran & Young
ATTORNEYS

INVENTOR.
ANTHONY R. CHASAR
BY
Meyer, Baldwin, Doran & Young
ATTORNEYS

INVENTOR.
ANTHONY R. CHASAR
BY
Meyer, Baldwin, Doran & Young
ATTORNEYS

INVENTOR.
ANTHONY R. CHASAR
BY
Meyer, Baldwin, Doran & Young
ATTORNEYS

INVENTOR.
ANTHONY R. CHASAR
BY
Meyer, Baldwin, Doran & Young
ATTORNEYS

INVENTOR.
ANTHONY R. CHASAR
BY
Meyer, Baldwin, Doran & Young
ATTORNEYS

INVENTOR.
ANTHONY R. CHASAR
BY
Meyer, Baldwin, Doran & Young
ATTORNEYS

INVENTOR.
ANTHONY R. CHASAR
BY
Meyer, Baldwin, Doran & Young
ATTORNEYS

July 7, 1964 A. R. CHASAR 3,139,994

MECHANICAL LOAD HANDLING, TRANSFER AND STORAGE EQUIPMENT

Filed Nov. 2, 1960 19 Sheets-Sheet 18

INVENTOR.
ANTHONY R. CHASAR

BY

Meyer, Baldwin, Doran & Young

ATTORNEYS

INVENTOR.
ANTHONY R. CHASAR
BY
Meyer, Baldwin, Doran & Young
ATTORNEYS

United States Patent Office 3,139,994
Patented July 7, 1964

3,139,994

MECHANICAL LOAD HANDLING, TRANSFER AND STORAGE EQUIPMENT

Anthony R. Chasar, Cleveland, Ohio, assignor to The Triax Company, Cleveland, Ohio, a corporation of Ohio Filed Nov. 2, 1960, Ser. No. 66,776
9 Claims. (Cl. 214—16.4)

This invention relates to improvements in mechanical storage equipment and more particularly to load transfer and storage apparatus.

The general object of this invention is to provide an automatic mechanical load handling, transfer and storage apparatus comprising a storage frame having a plurality of load support means and a carrier movable to selected individual support means for depositing or retrieving a load thereat.

Another object of the invention is to provide an apparatus of the above type having control means for moving the carrier in at least one direction from a pick-up-and-discharge station to a selected support means and back to said station in an automatic cycle of operation.

A further object of this invention is to provide storage apparatus having the above features wherein the control means includes means for directing the carrier sequentially to two selected support means to carry out two commands before returning to the station.

Yet another object of the invention is to provide an apparatus wherein the control means includes a selector switch whereby an operator can choose between the execution of a single command only or the execution of two sequential commands.

Still another object is to provide, in the above control means, reject means responsive to an attempt to load an already loaded support means which, if actuated during the first command, terminates both commands.

A still further object of this invention is to provide, in the above referred to control means, a second command initiating control element and means for deactivating said control element when the carrier passes a position designated for the second command before having arrived at a position designated for the first command.

Yet another object of the invention is to provide apparatus as set forth above wherein the carrier is provided with a control element actuatable at a selected support means to stop the carrier, said control element having an operative member and power means for moving the operative member from a non-tripping to a tripping position.

Another object of the invention is to provide, in such apparatus, a control element which is actuatable if the carrier overtravels in a given direction and which if actuated during execution of the first command, terminates both commands.

Still another object of the invention is to provide, in the above control means, counter means indicating the position of the carrier in relation to the support means when said carrier is moved in either direction along a path, said counter means being cooperant with selector means to cause said carrier to execute either of said commands.

Further objects of the invention and the invention itself will be readily understood from the following description of the invention as illustrated in the accompanying drawings, in which said drawings:

FIG. 19 is a vertical sectional view taken generally along the line 19—19 in FIG. 8;

FIG. 27 is a second form of horizontal counter drive unit adapted to be substituted for the first form thereof shown in FIG. 27 and to be connected in place thereof to the correspondingly numbered terminals; while

Figures 1, 1A, 1B:
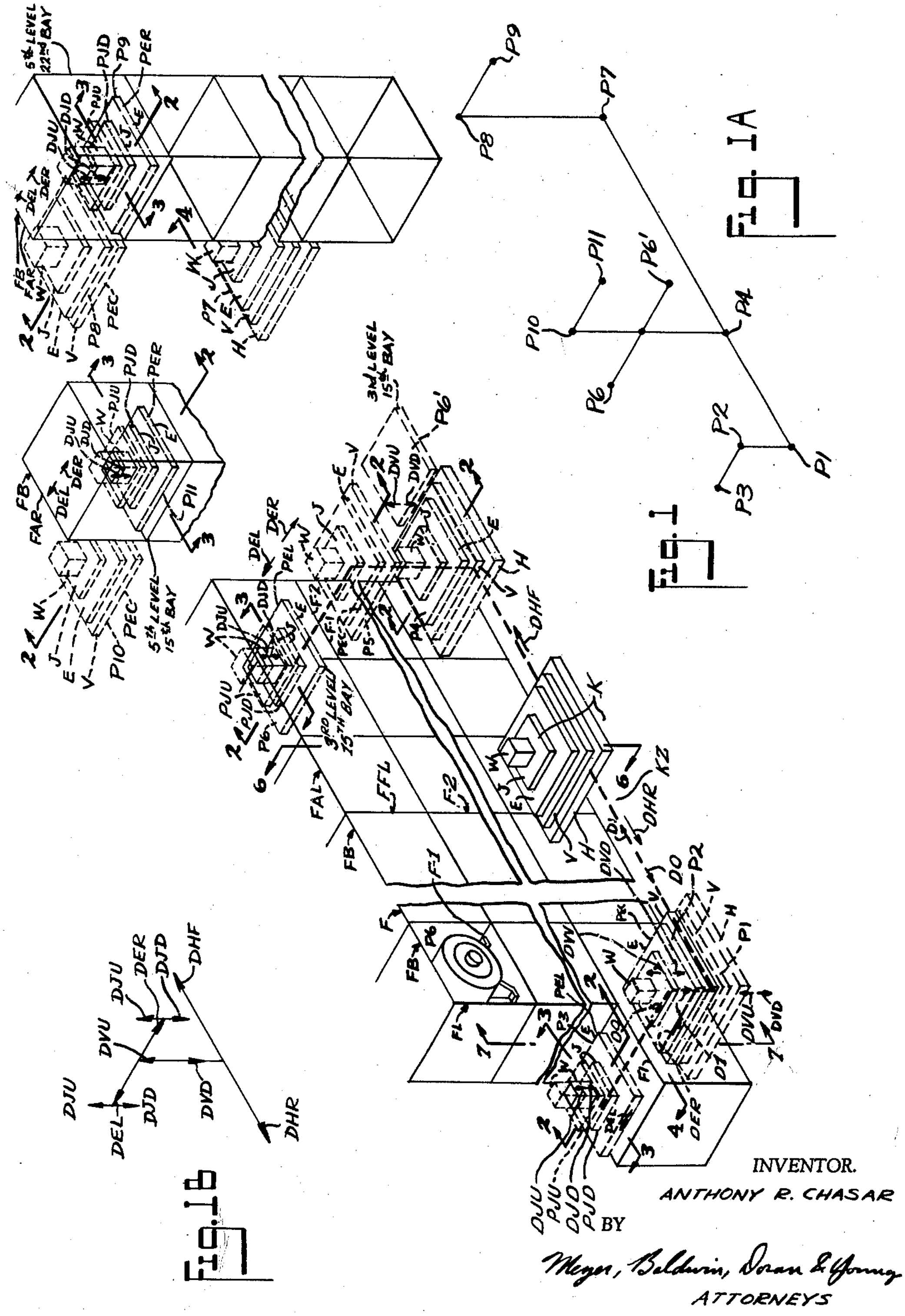
FIG. 1 is a schematic perspective view looking toward the left at the right hand side of a load carrier, looking at a left panel of a load storage frame, showing in positions P6′ and P11 a portion of the right panel of the load storage frame, and schematically illustrating the mode of operation of the load transfer, load handling and/or load storage apparatus described herein.
FIGS. 1A and 1B are schematic perspective views of the relationship between the positions and directions in FIG. 1.

Before the apparatus here illustrated and described is specifically described, it is to be understood that the invention here involved is not limited to the structural details or arrangement of parts here shown and described since an apparatus embodying the present invention may take various forms. It is also to be understood that the phraseology or terminology herein employed is for purposes of description and not of limitation since the scope of the present invention is denoted by the appended claims.

While the present invention might be adapted to various apparatus or uses, it has been chosen to show the same for mechanical storage equipment taking the form of a load transfer and storage apparatus substantially the same in structure as that disclosed in my copending United States patent application, Serial No. 813,585, filed May 15, 1959 by Anthony R. Chasar and Walter F. Double, and entitled "Mechanical Load Handling, Transfer and Storage Equipment and Methods Relating Thereto" to which reference may be had for further disclosure, if necessary, to more clearly understand the present invention and to complete the present disclosure.

*Introduction: Description of Frame Construction and of Frequently Used Terms, Including Frames, Positions, Directions, Coils, Motor Brakes and Switches; and Introductory Description of Mode of Operation To Be Described Hereinafter*

The reference numerals or letters have been picked herein to relate to similarity of functions of the different components in generally the same manner as in my aforesaid copending application. The component parts of frames F, H, V, E and J (being respectively designated by the corresponding letter, hyphen and number, such as member F–3 on frame F) are in each frame secured together in any suitable manner to remain together. Drive components for driving frames H, V, E and J are respectively designated by the reference numeral HM, VM, EM and JM followed by a hyphen and a number, such as belt HM–1.

Since many terms are frequently repeated hereinafter, the full name, location and pertinent description of many components will be given once hereafter (and will be underlined) for reference purposes, and then will be designated hereinafter only by the term underlined, to avoid needless repetition.

Stationary load storage frame F in FIGS. 1–9A, 12 and 13 has generally planar left and right work face portions FFL and FFR on left panel FAL and right panel FAR respectively arranged in two parallel planes straddling carrier travel zone KZ in FIGS. 1, 2, 5 and 7 along which workpiece carrier K travels and carries load W. Each of these work face portions has horizontally and vertically arranged in checkerboard pattern along directions DHF and DVD in FIG. 1 frame openings F–2 in frame F with load support surface F–1 in FIGS. 3, 5 and 6 at and extending away from each of these openings F–2 on the outer side of zone KZ. These openings and surfaces are vertically aligned in FIGS. 1, 2 and 5 in horizontally spaced apart bays FB and are vertically aligned in any one bay each at a different level FL. Each surface F–1 has two parallel load support members F–3 in FIGS. 1, 2, 3, 5, 6, 7, 8, 9, 9A, and 12 at each opening F–2 arranged in horizontally spaced apart relationship as mirror images, generally U-shape in cross section, with surface F–1 being on top of the upper horizontal legs of a pair of opposed members F–3 providing on each member F–3 load support surface F–3A and laterally extending guide way F–3B.

Frame F and carrier K provides a plurality of load transfer positions in FIGS. 1–4 mentioned in this paragraph as "positions." Load W is received into the apparatus at position P3; is transferred by carrier K through reference or control position P1 to any suitable load storage position in frame F (positions P6, P9 and P11 being merely illustrative of many such positions) on surface F–1 at any of these positions by traveling through position P4, P5, P10, P7 or P8; and is retrieved to position P3 for discharge from the apparatus.

Figures 2, 3:
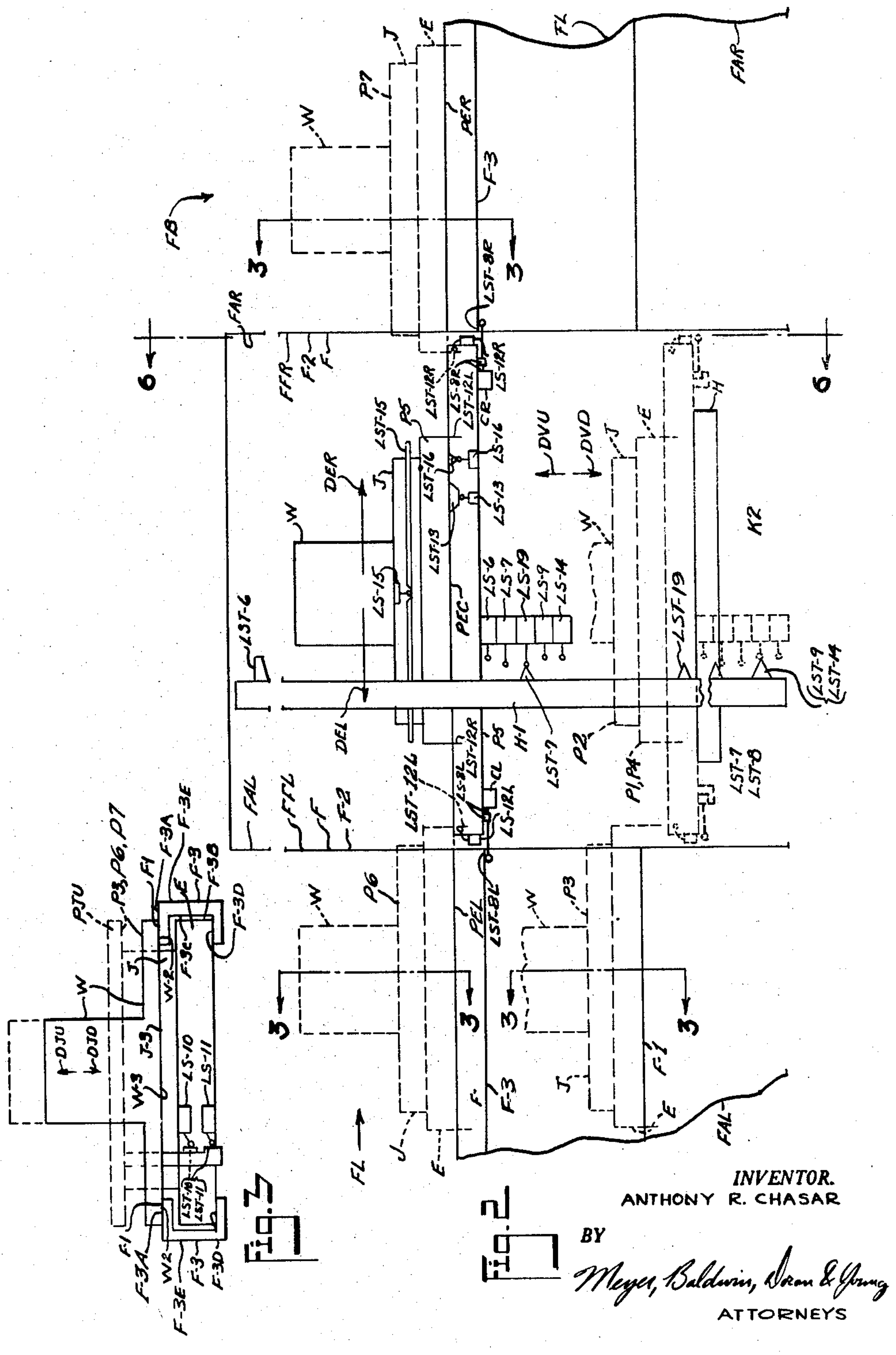
FIG. 2 is a schematic vertical sectional view taken generally along any lines 2—2 in FIG. 1.
FIG. 3 is a schematic vertical sectional view taken generally along any lines 3—3 in FIGS. 1 and 2.
Figure 4:
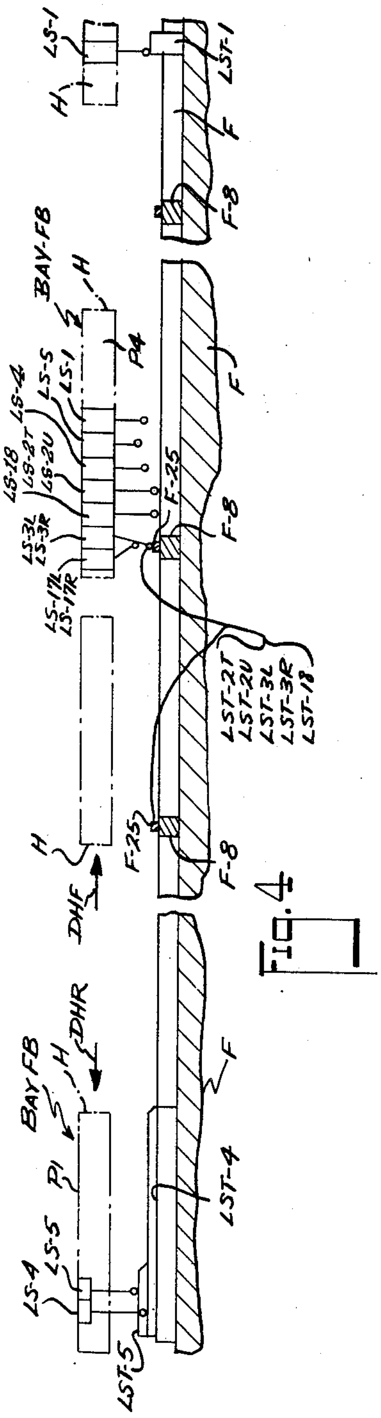
FIG. 4 is a schematic view taken generally along the line 4—4 in FIG. 1.
Figure 4A:
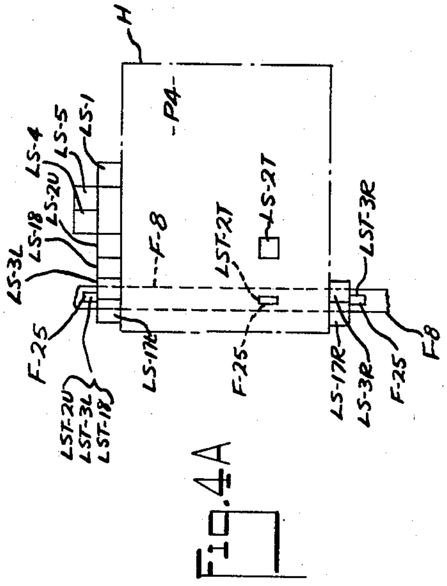
FIG. 4A is a schematic top view of frame H and some other associated structure shown in FIG. 4.
Figure 21:
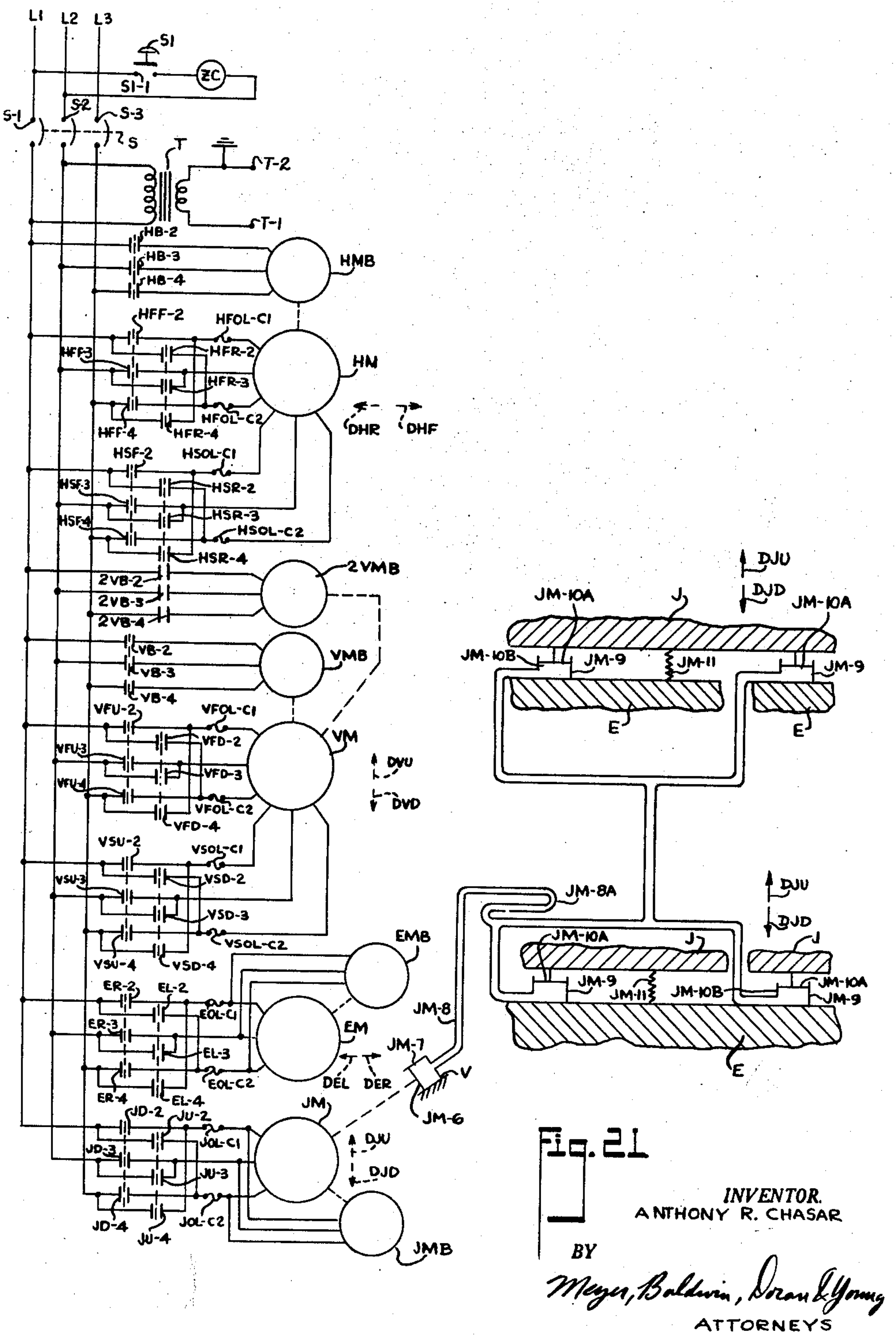
FIG. 21 is an electrical diagram of main power lines, driving motors, motor brakes, and hydraulic flow diagram for moving and controlling the frames of the load carrier.
Figure 23:
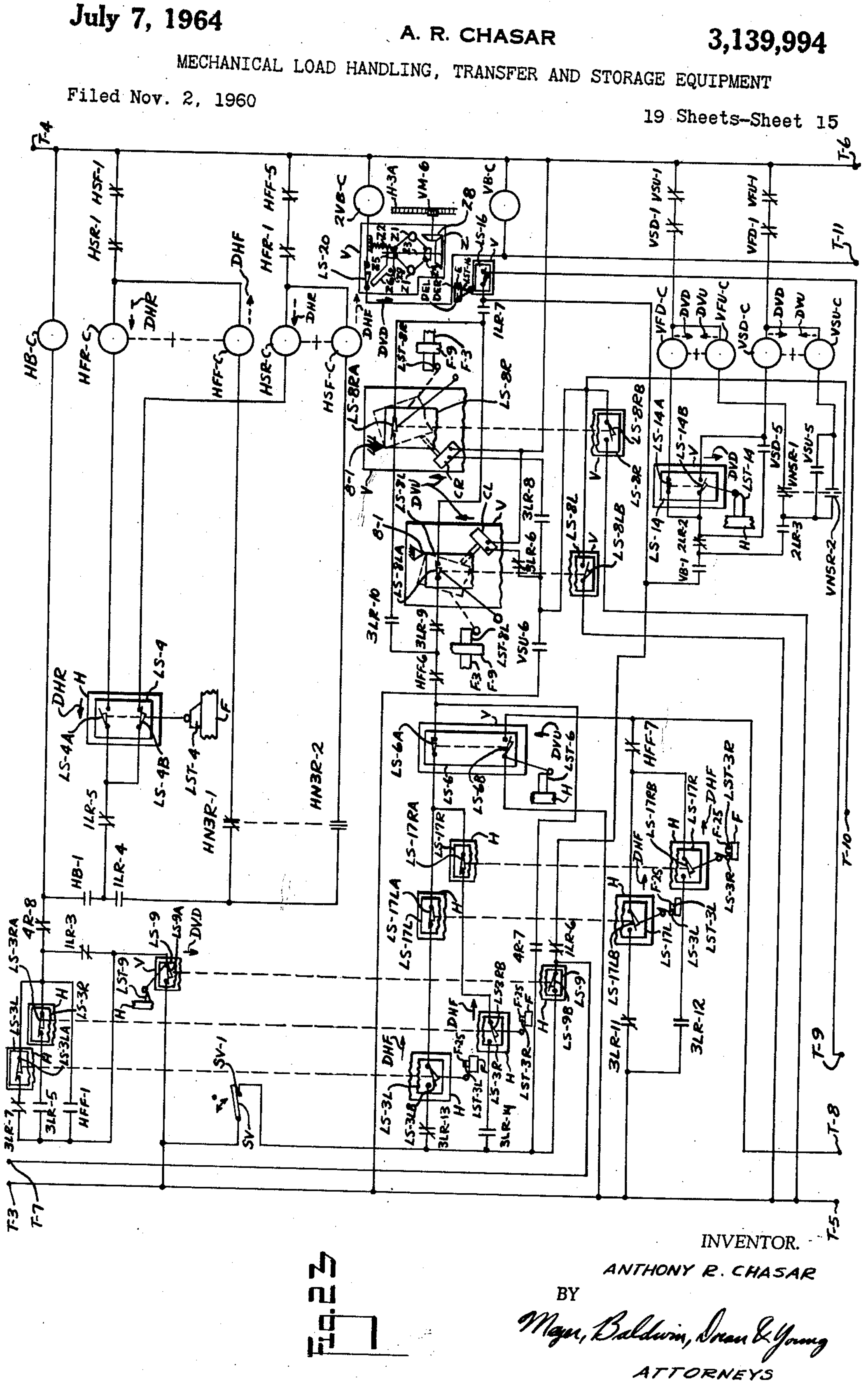
Figure 24:
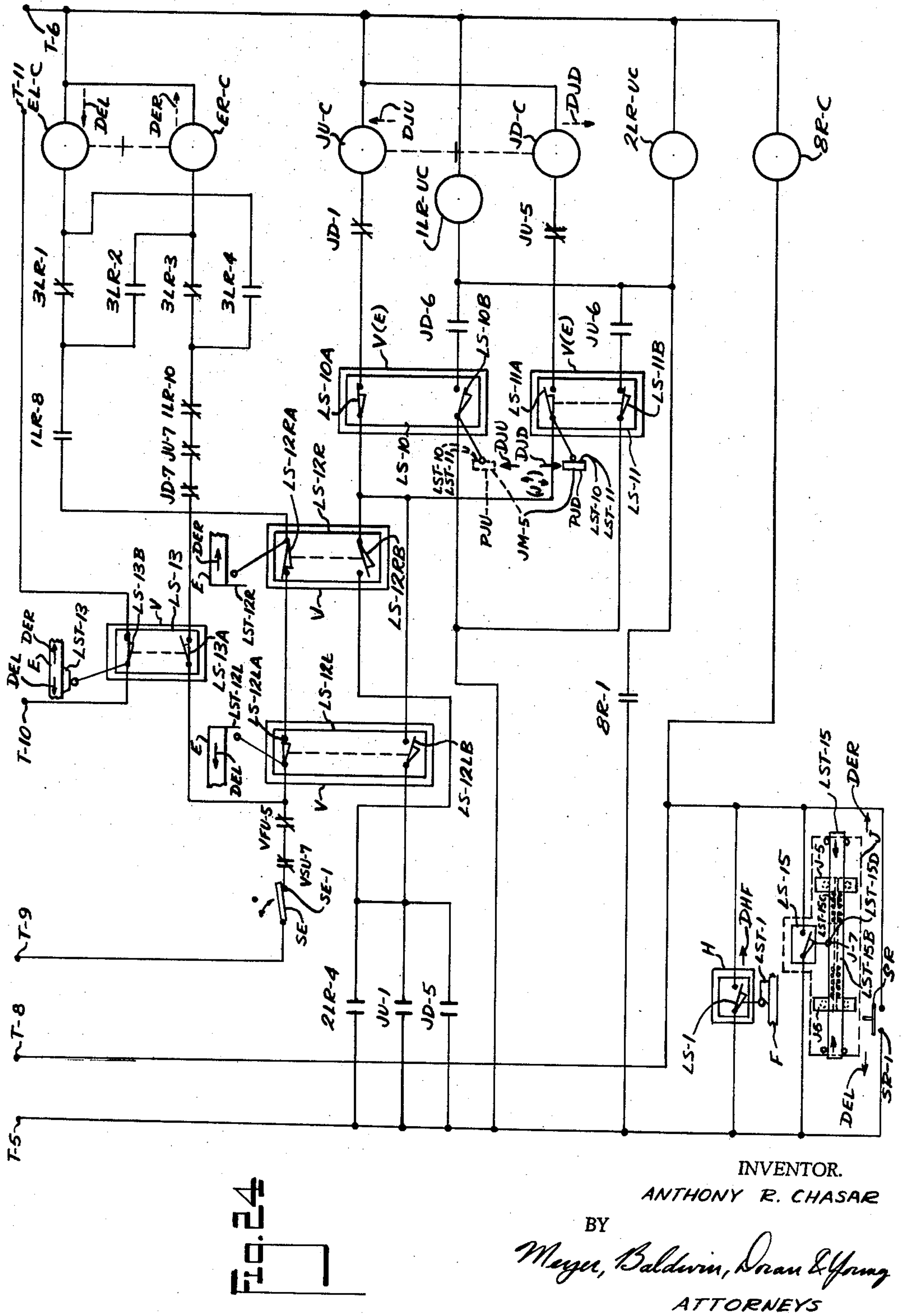

Carrier K is provided for moving load W from one of these positions to another with the load W being moved in zone KZ and being moved either in feed in direction DI or feed out direction DO, as shown schematically in FIGS. 1–4A by having driven by one or more of the hereinafter mentioned motors, after energized by its coil, the load carrier frames of carrier K in a given direction:

(1) Horizontally movable frame H in FIGS. 1, 2, 4, 4A, 6, 8, 9 and 13 driven horizontally in zone KZ relative to frame F by motor HM on frame H in FIGS. 6, 8, 13 and 21, after motor brake HMB in FIG. 21 is energized and disengaged by energized brake coil HB–C in FIG. 23, either in horizontal forward direction DHF in FIGS. 1 and 4 (either at fast speed after motor HM is energized by fast speed forward motor starter coil HFF–C or at slow speed after motor HM is energized by slow speed forward motor starter coil HSF–C in FIG. 23) between position P1, P4 and P7; or in horizontal reverse direction DHR in FIGS. 1 and 4 ( either at fast speed after motor HM is energized by fast speed reverse motor starter coil HFR–C or at slow speed after motor HM is energized by slow speed reverse motor starter coil HSR–C in FIG. 23) between positions P7, P4 and P1;

(2) Vertically movable frame V in FIGS. 1, 2, 7, 8, 9, 13 and 14 driven vertically in zone KZ relative to frames F and H by motor VM on frame V in FIGS. 6, 7, 8, 9, 13 and 21, after motor brake VMB in FIG. 21 is energized and disengaged by energizing brake coil VB–C in FIG. 23, either in vertical up direction DVU in FIGS. 1 and 2 (either at fast speed after motor VM is energized by fast speed up motor starter coil VFU–C in FIG. 23 or at slow speed after motor VM is energized by slow speed up motor starter coil VSC–C in FIG. 23) from position P1 to P2, P4 to P5 or P10, or P7 to P8; or in vertical down direction DVD in FIGS. 1 and 2 (either at fast speed after motor VM is energized by fast speed down motor starter coil VFD–C or at slow speed after motor VM is energized by slow speed down motor starter coil VSD–C in FIG. 23) from position P2 to P1, P10 or P5 to P4, or P8 to P7;

(3) Laterally movable frame E in FIGS. 1, 2, 3, 12, 13 and 14 driven horizontally and laterally relative to frames F and V for transferring load W between zone K and any surface F–1 through its associated opening F–2 by motor EM on frame V in FIGS. 8, 9, 12, 13, 14 and 21 and disengaged motor brake EMB in FIG. 21 either in horizontal or lateral left direction DEL in FIGS. 1 and 2 (after motor EM is energized and brake EMB is energized and disengaged by motor starter coil EL–C in FIG. 24) either from centered or in position PEC at position P2 or P5 to left out position PEL at position P3 or P6 or from right out position PER at position P9 or P11 to position PEC at position P8 or P10; or in horizontal or lateral right direction DER in FIGS. 1 and 2 (after motor EM is energized and brake EMB is energized and disengaged by motor starter coil ER–C in FIG. 24) either from position PEC at position P8 or P10 to position PER at position P9 or P11 or from position PEL at position P2 or P6 to position PEC at position P3 or P5; and (4) Load support frame J in FIGS. 1, 2, 3, 12, 13 and 14 driven vertically relative to frames E and F and surface F–1 for transferring load W onto or off surface F–1 by motor JM on frame V in FIGS. 8, 9, 12, 13, 14, 17, 18, 19, 20 and 21 in vertical up direction DJD in FIGS. 1 and 3 from load released or down position PDJ to load supporting or up position PJU (after motor JM is energized and motor brake JMB in FIG. 21 is energized and disengaged by up motor starter coil JU–C in FIG. 24) or in vertical down direction DJD in FIGS. 1 and 3 from load supporting or up position PJU to load released or down position PJD (after motor JM is energized and brake JMB is energized and disengaged by down motor starter coil JD–C in FIG. 24).

These directions of frame movements are shown in solid lines in the drawings, and the electrical or hydraulic components for causing these movements upon energization have their respective directions shown in dotted line arrows closely associated therewith. These motor starter coils are interlocked mechanically, as shown by the vertical dotted connecting lines and are interlocked electrically by contacts at their right hand portions of FIGS. 23 and 24, to prevent simultaneous engagement of starter coils for causing movement in opposite directions.

Frame H includes interconnected frame members including base H–2, mast H–1 comprising two mast sections H–1A and H–1B connected together at the top by member H–1C, and gear racks H–3A and H–3B secured to these mast sections.

Frame V includes interconnected frame members including two channel members V–3 each having laterally extending guide way V–3B.

Automatic control means is provided herein for controlling the movement of the frames of carrier K for transferring load W between a selected first surface F–1 and frame J at a corresponding first selected load transfer position (such as position P3) and for transferring load W between a selected second surface F–1 and frame J at a corresponding second selected load transfer position (such as position P6) for providing carrier loading action at one of these positions and unloading action at the other of these positions by automatic sequential movement of the frames in the following manner: (1) directionally movable frame H and/or frame V moved from position P1 to the first load transfer position in zone KZ, (2) frame E moved from position PEC to PEL or PER at this first load transfer position, (3) frame J moved from one to the other of its positions (PJU or PJD) at this first load transfer position, (4) frame E moved from position PEL or PER to PEC at the first load transfer position, (5) directionally movable frames V and/or movable relative to frame F from the first load transfer position to the second load transfer position, (6) frame E moved from position PEC to PEL or PER at this second load transfer position, (7) frame J moved from the aforesaid other to the one of its positions (PJD or PJU) at this second load transfer position, and (8) frame E moved from position PEL or PER to PEC at this second load transfer position. Load W is described hereinafter as being transferred from position P3 through P1, P4 and P5 to P6 by the aforedescribed sequence of frame movements. This same sequence is repeated hereinafter when there is sequentially described herein moving empty carrier K from position P1 through P2 to P3; loaded carrier K from position P3 through P1, P4 and P5 to P6; empty carrier K from position P6 through P5, P4, P7 and P8 to P9; loaded carrier K from position P9 through P8, P7, P1, P7 and P8 to P9; empty carrier K from position P9 through P8, P7, P4 and P5 to P6; loaded carrier K from position P6 through P5, P4, P1, P4, and P5 to P6; empty carrier K from position P6 through P5, P4 and P10 to P11; loaded carrier K from position P11 through P10, P4, P1, P4 and P5 to P6; empty carrier K from position P6 through P5, P4, P1, P7 and P8 to P9; and loaded carrier K from position P9 through P8, P7, P1 and P2 to P3. This sequence of movement describes sequentially picking up load W at position P3 for storing, a two command action wherein second command position P9 has a larger bay number than first command position P6, a two command action wherein second command position P6 has a smaller bay number than first command position P9, two command action wherein second command position P11 has the same bay number as first command position P6, single command storing of load W in left panel FAL in position P6, single command retrieving load W in right panel FAR at position P9, and discharging load W at position P3. Then, there will be described safety jam action occurring when moving frame E in direction DEL or DER with its carried load W onto surface F–1 in frame F in position P3, P6, P9 or P11 with frame J in position PJU; overtravel action by frame V in direction DVU past top level FL, frame H in direction DHF past last bay FB, and improper stop by frame H while traveling in direction DHF; return movement of carrier K to position P1 by actuation of cycle return switch SR at any time; and other features found in the disclosed apparatus. This description illustrates the different conditions encountered during operation of the disclosed apparatus for some typical purposes.

To avoid repetition, the described movements of the frames of carrier K have been designated as "Sequence No. 1K, etc." hereinafter and the condition of the circuits and frames at any particular time have been designated as "Condition No. 1C" hereinafter. Each sequence includes the movement of the frames of carrier K between the positions, the circuits formed and broken, and the action of the switches required for this purpose. Then, each sequence and condition is subsequently referred to only by number.

Hereinafter, each of the following is called a coil: latching relay latching coils 1LR–LC, 2LR–LC, 3LR–LC, 4LR–LC and 5LR–LC in FIG. 22; latching relay unlatching coils 1LR–UC and 2LR–UC in FIG. 24; latching relay unlatching coils 3LR–UC, 4LR–UC and 5LR–UC in FIG. 22; main start relay coil 3R–C, pick-up-discharge relay coils 4R–C and 5R–C, and command relay coil 6R–C in FIG. 22; cycle return coil SR–C in FIG. 24; command relay coil 7R–C, control relay coils HN1R–C and HN2R–C, and horizontal slow down relay coil HN3R–C in FIG. 25; vertical counter relay coil VN3R–C, reset relay coil VN4R–C, solenoid stepper coil VNC, and vertical slow down relay coil VN5R–C in FIG. 26; and thermal overload circuit breaker coils HFOL–C1, HFOL–C2, HSOL–C1, HSOL–C2, VFOL–C1, VFOL–C2, VSOL–C1, VSOL–C2, EOL–C1, EOL–C2, JOL–C1, and JOL–C2 in FIG. 21 controlling respectively contacts HFOL–1, HFOL–2, HSOL–1, HSOL–2, VFOL–1, VFOL–2, VSOL–1, VSOL–2, EOL–1, EOL–2, JOL–1 and JOL–2 in FIG. 22. Each of these coils and the motor starter and brake coils earlier mentioned, control contacts (for example, see coil 3R–C controlling contacts 3R–1 to 3R–4 inclusive) in FIGS. 21–27 having the same prefix reference number (to the left of the hyphen); each contact is illustrated in its normal or unactuated position assumed when its controlling coil (other than latching relay coils and thermal overload coils) is unenergized, its unlatching coil has been earlier energized, or its thermal overload coil is not overheated; and each contact is moved to its opposite or actuated position while its controlling coil (other than latching relay coils and thermal overload coils) is energized, after its latching coil has been energized, or while its thermal overload coil is overheated.

Hereinafter, each of the following frequently used switches is called a "switch": normally open units limit switch LS–2U and normally open tens limit switch LS–2T in FIGS. 4, 4A, 9, 13 and 27 on frame H actuated by trips LST–2U and LST–2T respectively on frame F at each bay FB when frame H moves in either direction DHF or DHR; in FIGS. 4, 4A, 9, 13 and 23, limit switch LS–3L (including normally closed limit switch LS–13LA and normally open limit switch LS–3LB components) and limit switch LS–3R (including normally closed limit switch LS–3RA and normally open limit switch LS–3RB components) on frame H actuated respectively by trips LST–3L and LST–3R on frame F at each bay FB when frame H moves in direction DHF; limit switch LS–4 in FIGS. 4, 4A, 9, 13 and 23 (including normally closed limit switch LS–4A and normally open limit switch LS–4B components) on frame H either held actuated at position P1 or actuated by trip LST–4 on frame F only at an approach position to position P1 after frame H moves thereto in direction DHR; limit switch LS–5 in FIGS. 4, 4A, 9, 13 and 22 (including normally closed switch LS–5A and normally open limit switch LS–5B components) on frame H either held actuated in position P1 or actuated by trip LST–5 on frame F when frame H approaches position P1 by movement in direction DHR; limit switch LS–6 in FIGS. 2, 8, 9 and 23 (including normally closed limit switch LS–6A and normally open limit switch LS–6B components) on frame V actuated by trip LST–6 on frame H at the overtravel position past top level FL when frame V moves in direction DVU; normally open limit switch LS–7 in FIGS. 2, 8, 9 and 26 on frame V actuated by trip LST–7 on frame H at the approach position to each level FL when frame V moves in direction DVU; in FIGS. 2, 8, 9, 9A, 12, 13, 14 and 23, limit switch LS–8L (including normally closed limit switch LS–8LA and normally open limit switch LS–8LB components) and limit switch LS–8R (including normally closed limit switch LS–8RA and normally open limit switch LS–8RB components) on frame V actuated respectively by trips LST–8L and LST–8R on frame F at preselected level FL (such as in position P2, P5, P8 or P10 in FIG. 1) when frame V moves in direction DVU; limit switch LS–9 in FIGS. 2, 8, 9 and 23 (including normally open limit switch LS–9A and normally closed limit switch LS–9B components) on frame V either held actuated with frame V in position P1, P4, P7 or any other position horizontally aligned therewith or actuated by trip LST–9 on frame H when frame V moves in direction DVD into one of these positions; limit switch LS–10 in FIGS. 3, 19, 20 and 24 (including normally closed limit switch LS–10A and normally open limit switch LS–10B components) on frame V actuated by trip LST–10 when frame J is in position PJU; limit switch LS–11 in FIGS. 3, 19 and 24 (including normally closed limit switch LS–11A and normally open limit switch LS–11B components) on frame V actuated by trip LST–11 when frame J is in position PJD; in FIGS. 2, 8, 12, 13, 16 and 24 limit switch LS–12L (including normally closed limit switch LS–12LA and normally open limit switch LS–12LB components) on frame V actuated by trip LST–12L on frame E only in position PEL after frame E has moved in direction DEL, and limit switch LS–12R (including normally closed limit switch LS–12RA and normally open limit switch LS–12RB components) on frame V actuated by trip LST–12R on frame E only in position PER after frame E has moved in direction DER; limit switch LS–13 in FIGS. 2, 8, 12, 13, 14 and 24 (including normally closed limit switch LS–13A and normally open limit switch LS–13B components) on frame V either held actuated in position PEC or actuated by trip LST–13 on frame E as frame E approaches position PEC while traveling in direction DEL or DER; limit switch LS–14 in FIGS. 2, 8, 9 and 23 (including normally closed limit switch LS–14A and normally open limit switch LS–14B components) on frame V actuated by trip LST–14 on frame H at the approach position to position P1, P4, P7 or any position horizontally aligned therewith when frame V moved in direction DVD; limit switch LS–16 in FIGS. 2, 8, 12, 13, 14 and 23 on frame V either held closed in position PEC or closed by trip LST–16 on frame E after frame E has traveled in direction DEL or DER into position PEC; in FIGS. 4, 4A, 9, 13 and 23, limit switch LS–17L (including normally closed limit switch LS–17LA and normally open limit switch LS–17LB components) and limit switch LS–17R (including normally closed limit switch LS–17RA and normally open limit switch LS–17RB components) on frame H actuated respectively by overtravel of the actuating arm of switch LS–3L or LS–3R when frame H moves in direction DHF past the desired stop position determined by actuation of switch LS–3L or LS–3R at any selected bay FB, such as in position P4 or P7; and normally open limit switch LS–18 in FIGS. 4, 4A, 9, 13 and 22 on frame H actuated by trip LST–18 on frame F when frame H moves in direction DHR past any selected bay FB to set up the second command action. The direction of relative movement of each of these frames H, V, E and J for individually actuating each of these switches, and other limit switches mentioned hereinafter, by its trip is shown in FIGS. 22–27 as a solid line arrow and has a reference number to correspond with the direction of movement in FIG. 1. Each of these limit switches having A and B component switches, such as switch LS–3L, have these component switches mechanically interlocked as shown by the dotted lines, so that both component switches are simultaneously moved in the same direction when actuated by the common trip, such as trip LST–3L. The general location of all limit switches and their trips is shown in FIGS. 2, 3, 4, 4A, and 22–27 in a schematic manner on their associated frames except for switches LS–10 and LS–11 carried by frame V, which switches are shown on their equivalent frames in parenthesis in FIG. 24 and they will be similarly oriented when FIG. 19 is turned with its top edge downwardly so as to correspond with these switches in FIGS. 3 and 24. For example, even through switch LS–10 and its trip LST–10 are both on frame V in FIG. 19 (trips LST–10 is movably mounted on frame V), they are illustrated in FIGS. 3 and 24 as if they were on their equivalent frames E and J since movement of frame J relative to frame E causes trip LST–10 to move relative to and to actuate switch LS–10. All of these aforementioned limit switches are one way actuated switches (actuated during travel only in the direction indicated because of the pivoted mounting of their actuating arms, and not in the return direction), except the limit switches in FIG. 27 which are actuated during movement in both directions.

Figure 7:
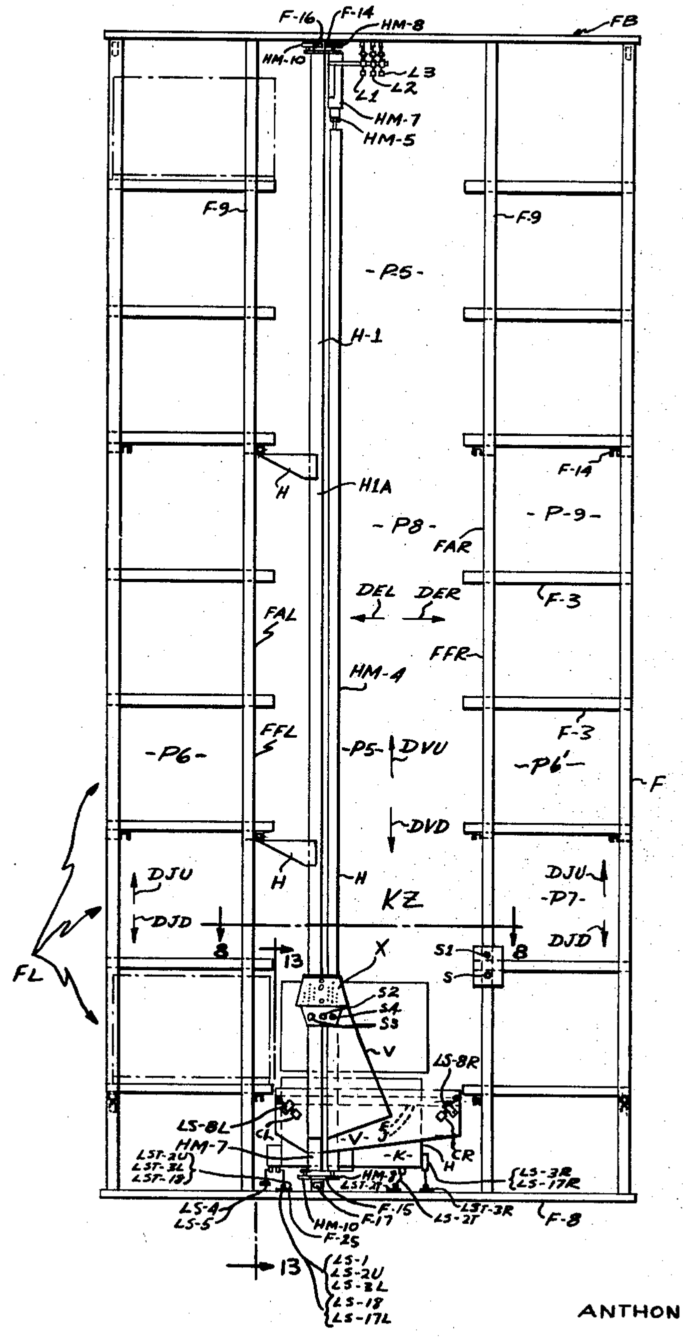
FIG. 7 is a vertical view of the load carrier and load storage frame taken generally along the line 7—7 in FIG. 1.
Figure 28:
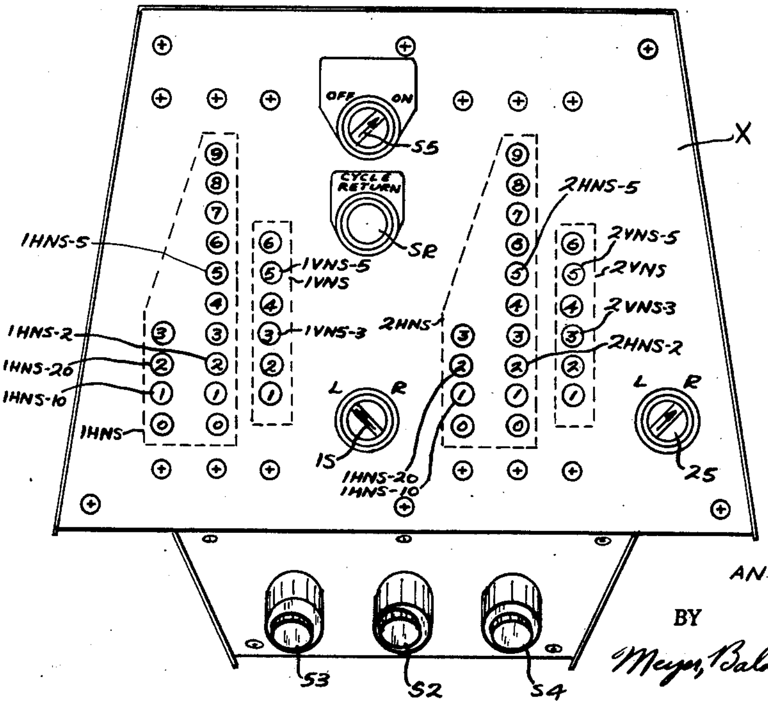
FIG. 28 is a perspective view of the control console shown in FIGS. 6 and 7.

Hereinafter, each of the following manually actuatable control elements, switches or buttons is called a "switch": main switch S and stop switch button S1 in FIG. 21 on frame F in position P1; stop switch button S2, pick-up-discharge switch button S3 and start switch button S4 in FIGS. 7, 22 and 28; two command selection switch S5, first command switch 1S and second command switch 2S in FIGS. 22 and 28; cycle return switch SR in FIGS. 24 and 28; frame E stop switch SE in FIG. 24 on frame V; frame V stop switch SV in FIG. 23; first command push button switch 1HNS and second command push button switch 2HNS in FIGS. 7, 25 and 28; first command push button switch 1VNS and second command push button switch 2VNS in FIGS. 7, 26 and 28; toggle switch HNS1 in FIG. 25; cam actuated switches VNS2 and VNS3 and reset switch VNS4 in FIG. 26. For easy control by the operator, these switches are conveniently located. Switches SV, VNS4 and HNS1 are on frame H; and switches not located above on a frame are on command console X in FIGS. 7 and 28 carried by frame H and located in position P1 for the convenience of the operator when frame H is in position P1.

*Horizontal Driving Movement of Frame H by Motor HM, Vertical Driving Movement of Frame V by Motor VM, Lateral Driving Movement of Frame E by Motor EM, Vertical Driving Movement of Frame J by Motor JM, and Other Features Relating Thereto*

Means is provided for moving frame H horizontally in opposite directions DHF and DHR between positions P1, P4 and P7 into alignment with or away from any preselected bay FB. Two speed, reversible electric motor HM rotates in one direction to drive frame H in direction DHF through drive belt HM–1; speed reducer HM–2; output shaft HM–3; lower universal joint HM–5, shaft HM–4, upper universal joint HM–5 and shaft HM–6; and pinions HM–8 on lower end of shaft HM–3 and on upper end of shaft HM–6 rotatably carried on frame H with said pinions meshing with upper and lower gear racks F–14 and F–15 respectively. Of course, rotation of motor HM in the opposite direction will move frame H in opposite direction DHR. Frame H has idler pinions HM–9 rotatably mounted thereon (parallel to the axis of rotation of shafts HM–3 and HM–6) at top and bottom. Each of these pinions has back up roller HM–10 rotatably secured to frame H and rolling on opposite side of rail member F–16 or F–15 to maintain the pinions in driving engagement with their racks, and for guiding frame H in an accurate path longitudinally of the racks. Frame H is supported by two support rollers HM–12 rotatably secured to frame H and rolling on smooth, level top surface of lower rail or rack F–15 detachably secured to frame member F–17 by screws F–18 in FIG. 5 spaced along rack F–15. Rack and rail F–15 is more easily manufactured in one piece than in separate pieces; will maintain dimensions more accurately than a multiple piece assembly; and will simultaneously correct by its replacement on member F–17 wear on its rack teeth, and wear by rollers HM–10 and HM–12.

Means is provided for moving frame V in opposite directions DVU and DVD between positions P1 and P2; P4, P5 and P10; or P7 and P8 into alignment with preselected level FL at any surface F–1. Two speed, reversible electric motor VM rotates to drive frame V through drive belt VM–1, speed reducer VM–2, hollow output sleeve VM–3, live shaft VM–4 keyed to rotate with sleeve VM–3, gears VM–5 and VM–6 secured to opposite ends of shaft VM–4 on frame V meshing with vertical racks H–3B and H–3A on mast H–1 to drive frame V upwardly in direction DVU upon forward rotation of motor VM and downwardly in direction DVD upon reverse rotation of motor VM with frame V rotatably supported and guided on mast H–1 by rollers VM–8, VM–9, VM–10 and VM–11 rotatably mounted on frame V and engaging channel surfaces of members H–1A and H–1B.

Figure 8:
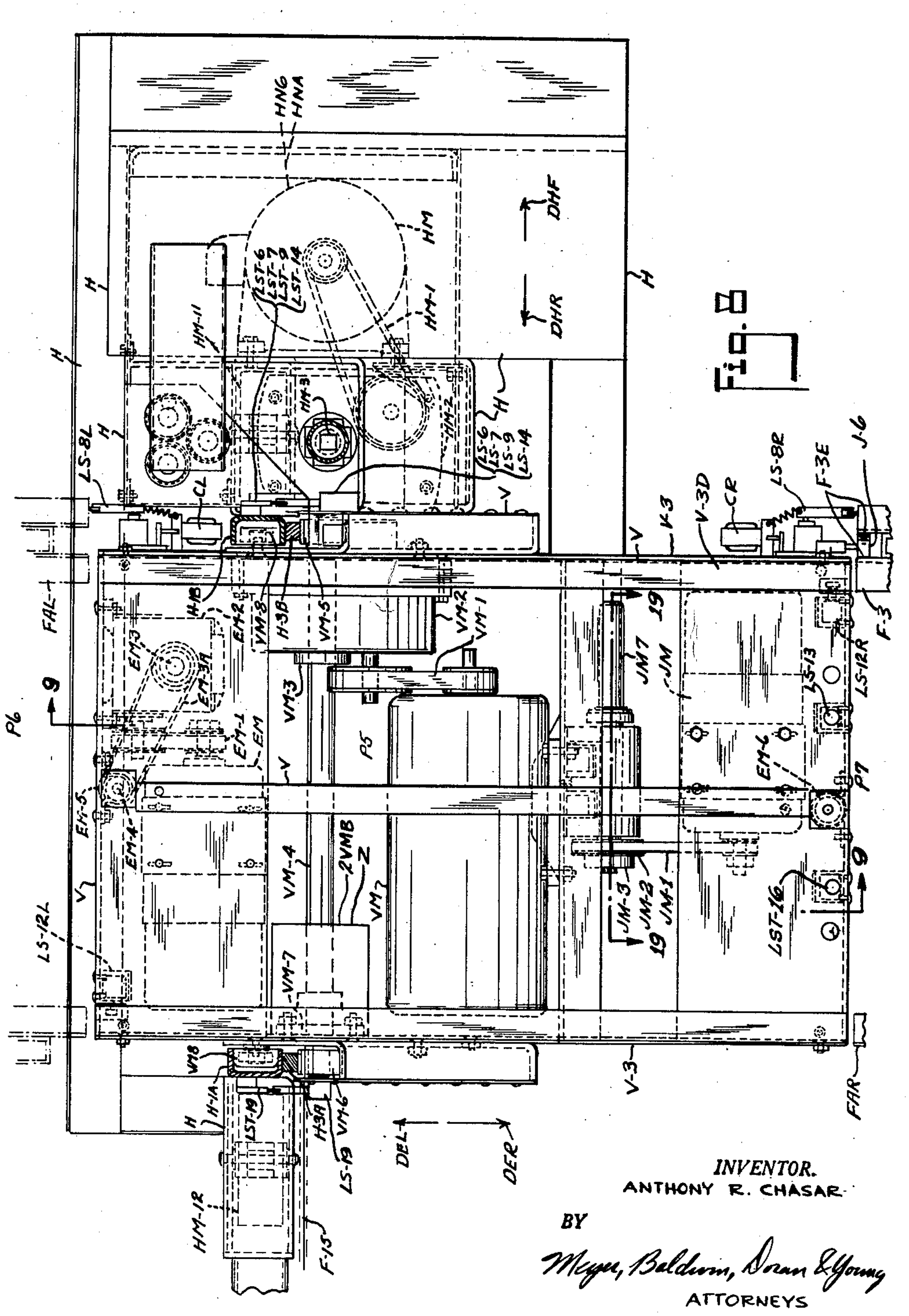
FIG. 8 is a horizontal sectional view taken generally along the line 8—8 in FIGS. 7 and 9 through the load carrier with the laterally movable and load support frames thereof removed.
Figures 9, 9A, 10, 11:
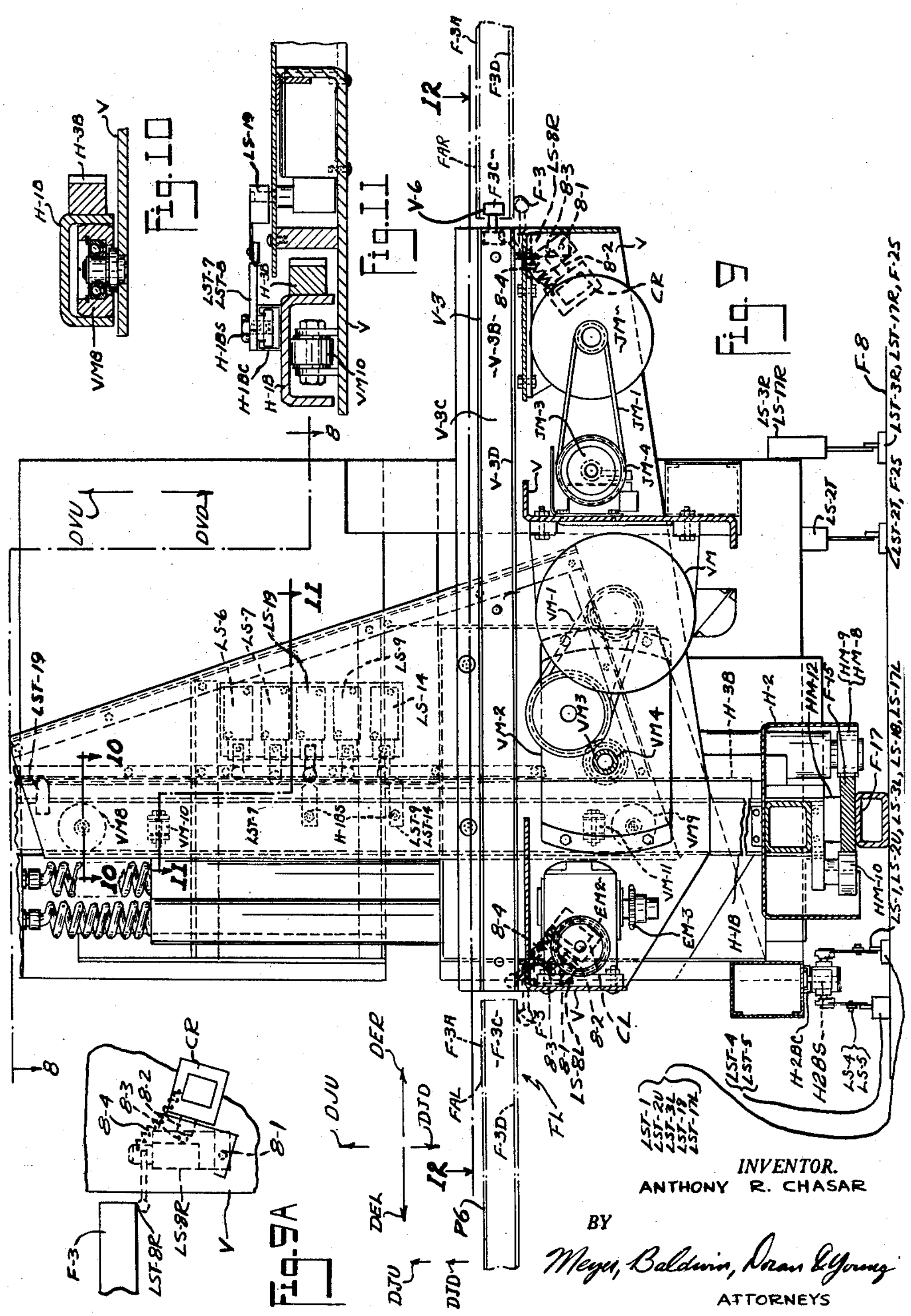
FIG. 9 is a vertical sectional view of the load carrier taken generally along the line 9—9 in FIG. 8 with the mast cut away and the vertically movable frame moved up to a storage opening level at position P6.
FIG. 9A is a side elevational view of one of the switches in FIG. 9.
FIG. 10 is a horizontal sectional view taken generally along the line 10—10 in FIG. 9.
FIG. 11 is a horizontal sectional view taken generally along the line 11—11 in FIG. 9 through the load carrier.

Switch LS–8L and switch LS–8R are respectively adapted to be swung clockwise and counterclockwise by an identical construction from a solid line position to a dot-dash line position in FIGS. 9 and 23 by energizing solenoid coil CL or CR. Energizing one of these coils CL or CR on frame V moves its armature push bar 8–2 in FIG. 9A outwardly against pin 8–3 on switch LS–8L or LS–8R to swing the switch on pivot 8–1, mounting it to frame V, into its outer position. When any of these coils CL or CR are de-energized, its spring 8–4 (connected at opposite ends to an associated coil and switch) swings its switch back to the solid line position about pivot 8–1. Although both switches LS–8L and LS–8R are shown in extended positions in FIGS. 2, 8, 9 and 12 for illustrative purposes, only one is so extended at any one time.

Means is provided for moving frame E in opposite directions DEL and DER between positions PEC and PEL or PER in alignment with surface F–1 in position PEL or PER at position P3, P6, P9 or P11 for permitting transfer of load W relative to surface F–1 between frames J and F. Single speed, reversible electric motor EM in FIGS. 8, 9, 12, 13 and 14 rotates to drive frame E through drive belt EM–1; speed reducer EM–2; output sheave EM–3; belt EM–3A; shaft EM–4; sprocket EM–5 on shaft EM–4; and sprocket chain EM–7 folded twice back upon itself in S-shape, trained around drive sprocket EM–5 and idler sprocket EM–6, and connected by opposite end portions EM–7A and EM–7B to frame E so these end portions of chain EM–7 moves with frame E but all other parts are on frame V. Rotation of motor EM in one direction moves frame E in direction DEL and in the opposite direction moves frame E in direction DER.

Figures 12, 14, 15:
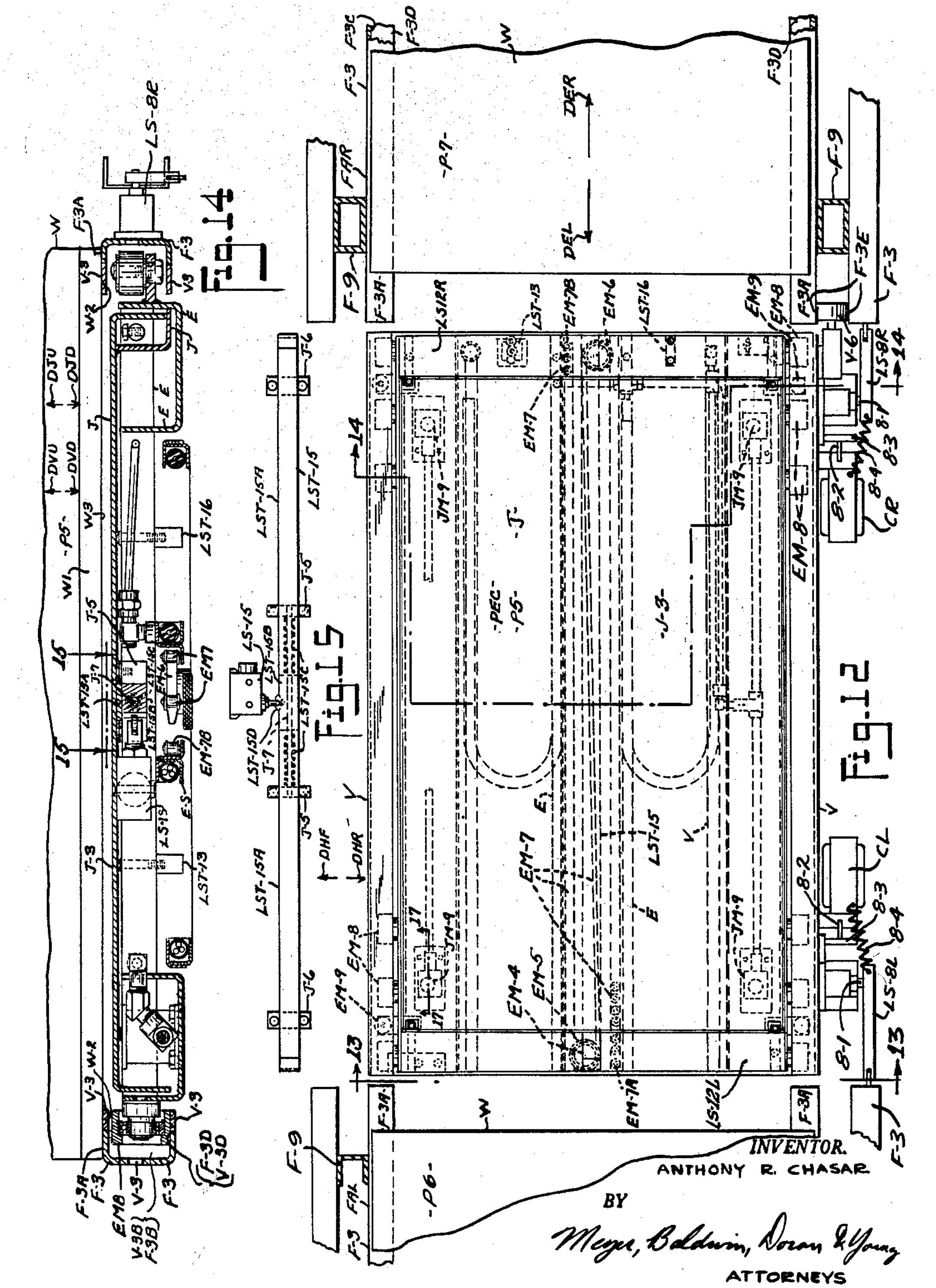
FIG. 12 is a top view of the load carrier and laterally movable frames of the load carrier and of a portion of the left and right storage frame panels taken generally along the line 12—12 in FIG. 9.
FIG. 14 is a vertical sectional view through the load carrier taken generally along the line 14—14 in FIG. 12 with the corners of the U-shaped channel members at the left and right ends of this view cut away on the vertically movable frame to show portions of U-shape channel members of the storage frame therebehind in section.
FIG. 15 is a vertical view of limit switch LS–15 and its trip LST–15 removed from the load carrier with this view of these parts taken generally along the line 15—15 in FIG. 14.
Figure 13:
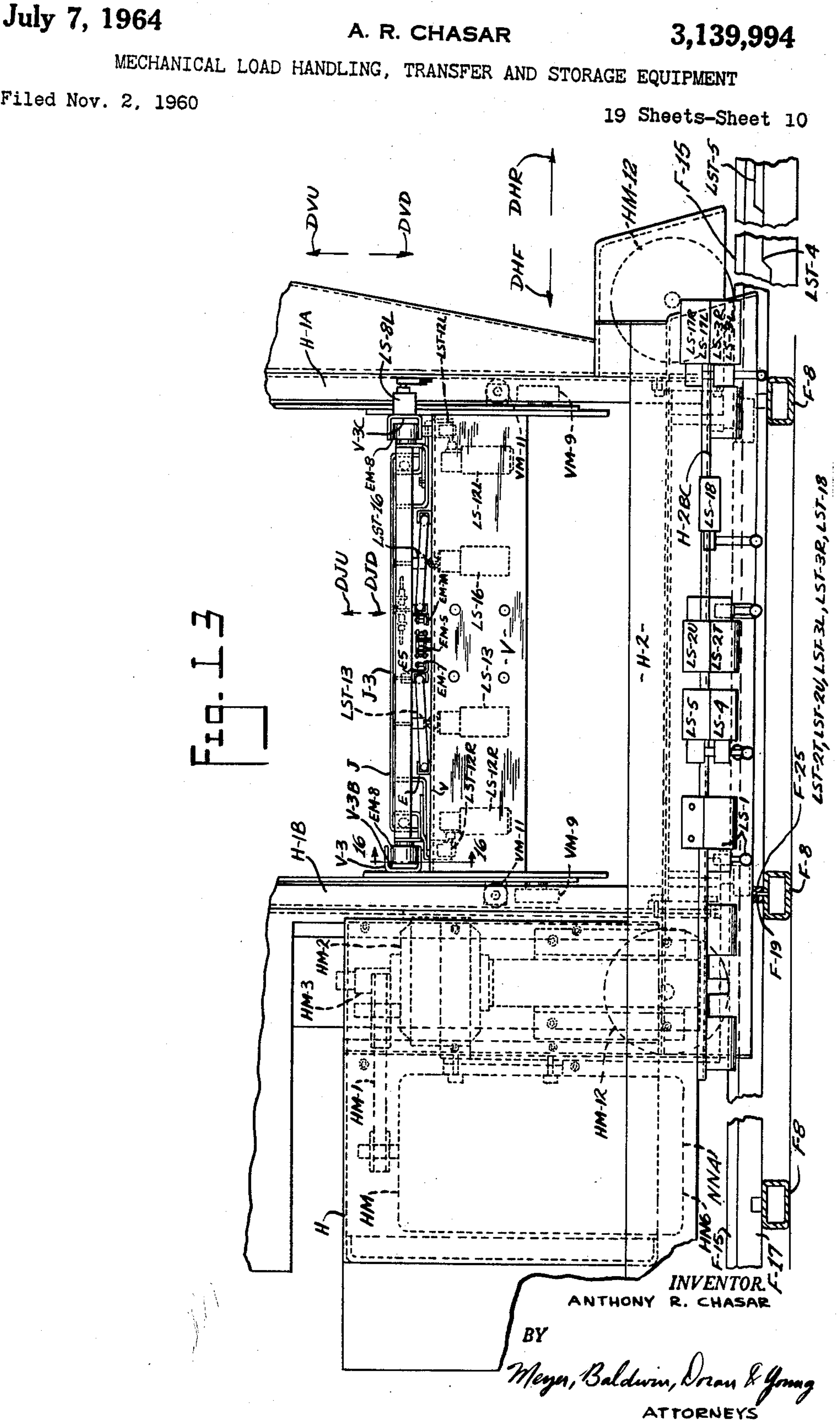
FIG. 13 is a side view of the load carrier and of the switches and trips for controlling the horizontal and vertical movement of the load carrier with this view taken generally along the line 13—13 in FIG. 7 and line 13—13 in FIG. 12 but with the vertically movable frame of the carrier in the lowest position with no load thereon.
Figure 18:
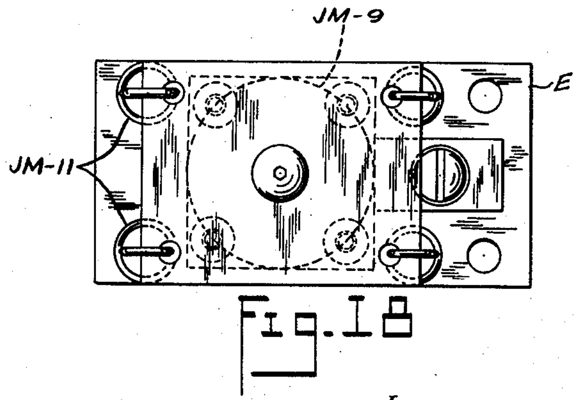
FIG. 18 is a top plan view taken generally along the line 18—18 in FIG. 17.

Frame E is suitably guided in travel between positions PEC, PEL and PER by guide way engaging means on frame E in FIGS. 12, 13 and 14. Twelve rollers EM–8, rotatably mounted on frame E about parallel and horizontal axes, support frame E in the proper vertical position and guide it during travel in direction DEL or DER between parallel members V–3 of frame V and the horizontally extending guide way provided by parallel members F–3 of frame F at each surface F–1 on respective horizontal surfaces V–3D and F–3D. Four rollers EM–9, rotatably secured to frame E on four vertical and parallel axes, restrict lateral movement of frame E in direction DHF and DHR during travel of frame E in opposite directions DEL and DER with rollers EM–9 adapted to bear against connecting vertical surfaces V–3C and F–3C of channels V–3 and F–3 respectively.

When frame V moves in direction DVU to position P5, P8 or P10, for example, this vertical movement causes coacting aligning means on frame V and frame F to engage for horizontally aligning frame E and the horizontally extending guide way provided by members F–3 at this position for smooth movement of frame E between position PEC and PEL or PER. This coacting aligning means includes guide roller V–6 in FIGS. 8, 9 and 12 rotatably carried by frame V for rotation about a horizontal axis extending along direction DEL and constructed to be telescopically moved by this vertical movement in direction DVU between the outer surfaces F–3E on contiguous, horizontally aligned members F–3 in adjacent bays FB for aligning frame E at any given surface F–1 for smooth movement between positions PEC and PEL or PER. This coaction compensates for any alignment error in erecting frame F, or any irregular settling of frame F thereafter; and mast H–1, connecting base H–2 and frame V, has sufficient lateral flexibility so that aligning roller V–6 can pull frames E and F into horizontal alignment and steady the outer end of frame V to permit smooth movement of frame E between positions PEC and PEL or PER if any misalignment otherwise exists between these frames.

Means is provided for moving frame J in opposite directions DJU and DJD between positions PJU and PJD at any surface F–1 in position PEL or PER at position P3, P6, P7 or P11 for transferring load W relative to surface F–1 between frames J and F for picking up load W from or depositing load W on surface F–1 in panel FAL or FAR. In FIGS. 8, 9, 12, 13, 14, 17, 18, 19, 20 and 21, single speed, reversible electric motor JM rotates driving belt JM–1, pulley JM–2 keyed to rotate with nut JM–3 on stationary cylinder JM–7, rotatable lead screw nut JM–3, piston lead screw JM–4 carried by plunger JM–6 and telescopically movable within cylinder JM–7 in sleeve bearing JM–7A and keyed against rotation with respect to cylinder JM–7 by key JM–5 traveling in parallel grooves JM–7B in the wall of cylinder JM–7 secured to frame V. Fluid line JM–8 connects cylinder JM–7 in parallel to each of four single acting jack motors JM–9 located at four corners of frame J.

Figure 17:
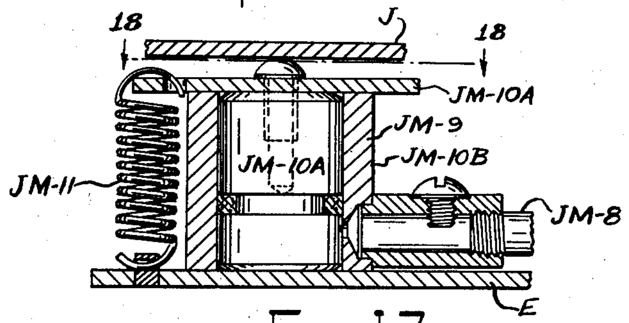
FIG. 17 is a vertical sectional view through the load carrier taken generally along the line 17—17 in FIG. 12.
Figures 16, 20:
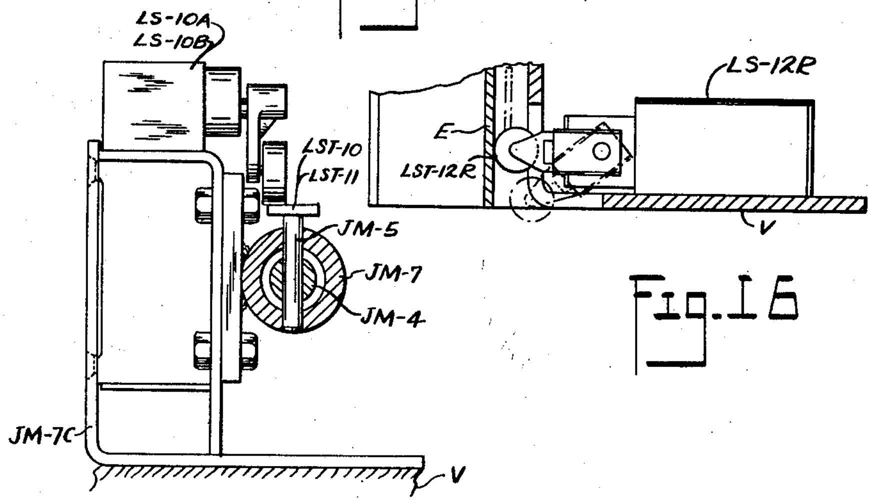
FIG. 16 is a vertical sectional view taken generally along the line 16—16 in FIG. 13 but with the laterally movable frame nearly fully extended in the solid line position and fully extended in the dot-dash line position into the right hand load storage frame panel to actuate the associated limit switch.
FIG. 20 is a vertical view taken generally along the line 20—20 in FIG. 19.
Figure 13:
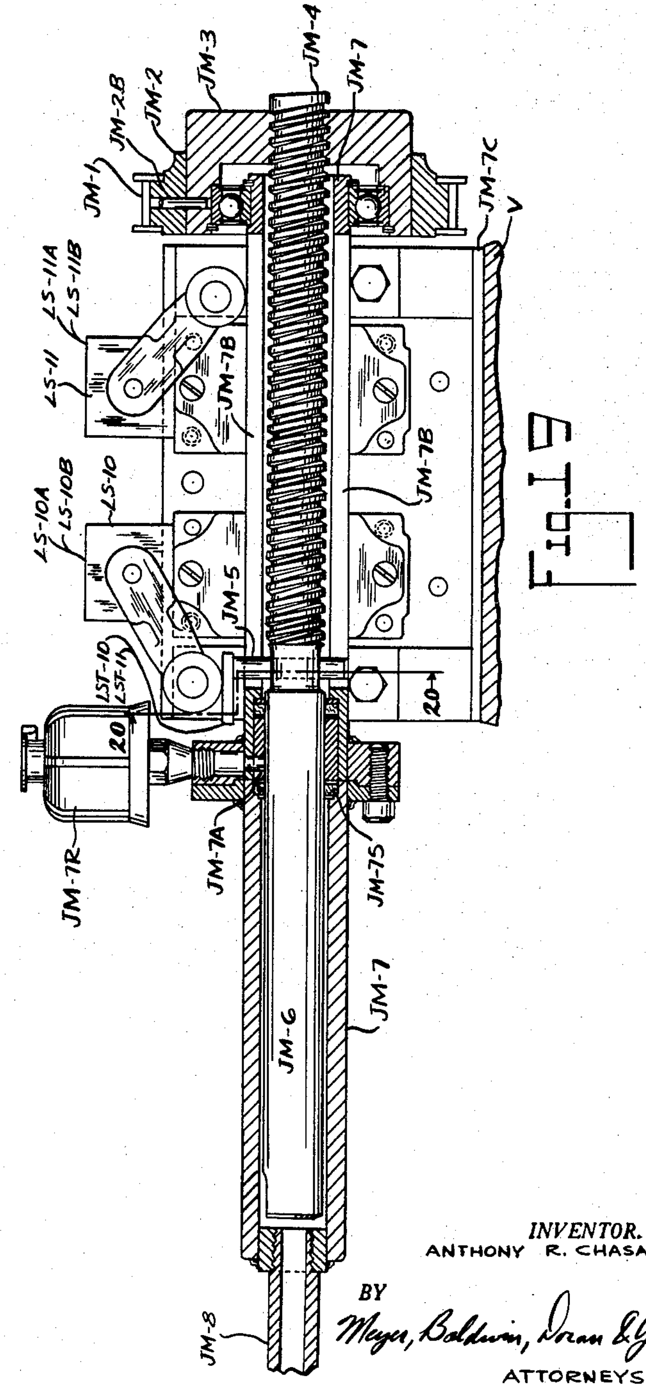

As motor JM rotates in one direction to move frame J in direction DJU, piston JM–6 advances toward the left in FIG. 19 to force fluid from cylinder JM–7 into the lower end in FIG. 17 of cylinder JM–10B of each motor JM–9 to raise plunger JM–10A therein to raise frame J from position PJD to PJU.

As motor JM rotates in the opposite direction to move frame J in direction DJD, four extension springs JM–11, connecting frame E and each piston JM–10A in FIG. 17, pull pistons JM–10A downwardly to permit gravity to lower frame J as piston JM–6 is moved toward the right in FIG. 19 by motor JM to withdraw the fluid from all motors JM–9.

INTRODUCTORY CIRCUITS

The electrical components are shown in FIGS. 21, 22, 23, 24, 25, 26 and 27 with all these switches and coils having their contacts in the position with all coils de-energized with their controlled contacts in normal and unlatched position; and wherein empty carrier K is in position P1 with no load W thereon and frame J is in position PJD so that all components appear in proper position as the cycle of operation is begun to be described.

The electrical diagrams in FIGS. 21, 22, 23, 24, 25, 26 and 27 are connected by the correspondingly numbered terminals T.

The circuits are energized as follows: Circuit No. 1 is formed in FIG. 21 from line L1 through closed contact S–1 of pressed switch S, control circuit transformer T, and closed contact S–2 of switch S to line L2. Lines L1, L2 and L3 extend horizontally along top of frame F in FIGS. 5 and 7 to provide power to electrical components in FIGS. 21–27, inclusive, when switch S is closed. The whole system is de-energized and circuit No. 1 is broken by pressing switch S1 to form circuit No. 2 in FIG. 21 from line L1 through closed contact S1–1 of switch S1, and circuit breaker coil ZC to line L2 so as to trip out a conventional circuit breaker in lines L1, L2 and L3 above location of switch S to de-energize lines L1, L2 and L3 below switch S. Releasing switch S1 breaks circuit No. 2 to re-establish energization when the disconnect switch handle of the conventional circuit breaker is moved to on position after the circuit breaker is reset.

After circuit No. 1 is formed, additional circuits form. Circuit No. 3 is formed from terminals T–1 in FIGS. 21 and 25 through normally closed contact 4R–2, closed switch HNS1, fuse HN3, and pilot light HN1, and terminals T–2 in FIGS. 25 and 21. This pilot light HN1 indicates that power is being supplied to circuits in FIGS. 25 and 26. Since frame V is at the "0" level FL, pilot light VN1 will be energized to disclose this condition by circuit No. 5 formed from terminals T–1 in FIGS. 21 and 25, normally closed contact 4R–2, closed switch HNS1, fuse HN3, terminals T–15 in FIGS. 25 and 26, closed contacts VN15 and VNT–0, pilot light VN1, and terminals T–2 in FIGS. 26 and 21. Rectified A.-C. to D.-C. power is provided by rectifier VN2 by circuit No. 6 formed from A.-C. transformer T in FIG. 21 through terminals T–1 in FIGS. 21 and 25, normally closed contact 4R–2, closed switch HNS1, fuse HN3, terminals T–15 in FIGS. 25 and 26, rectifier VN2, and terminals T–2 in FIGS. 26 and 21.

The description of circuit and frame Condition No. 1C starts here. Since this condition exists whenever carrier K is in position P1, it will be described here and then hereafter referred to as Condition No. 1C.

Figure 25:
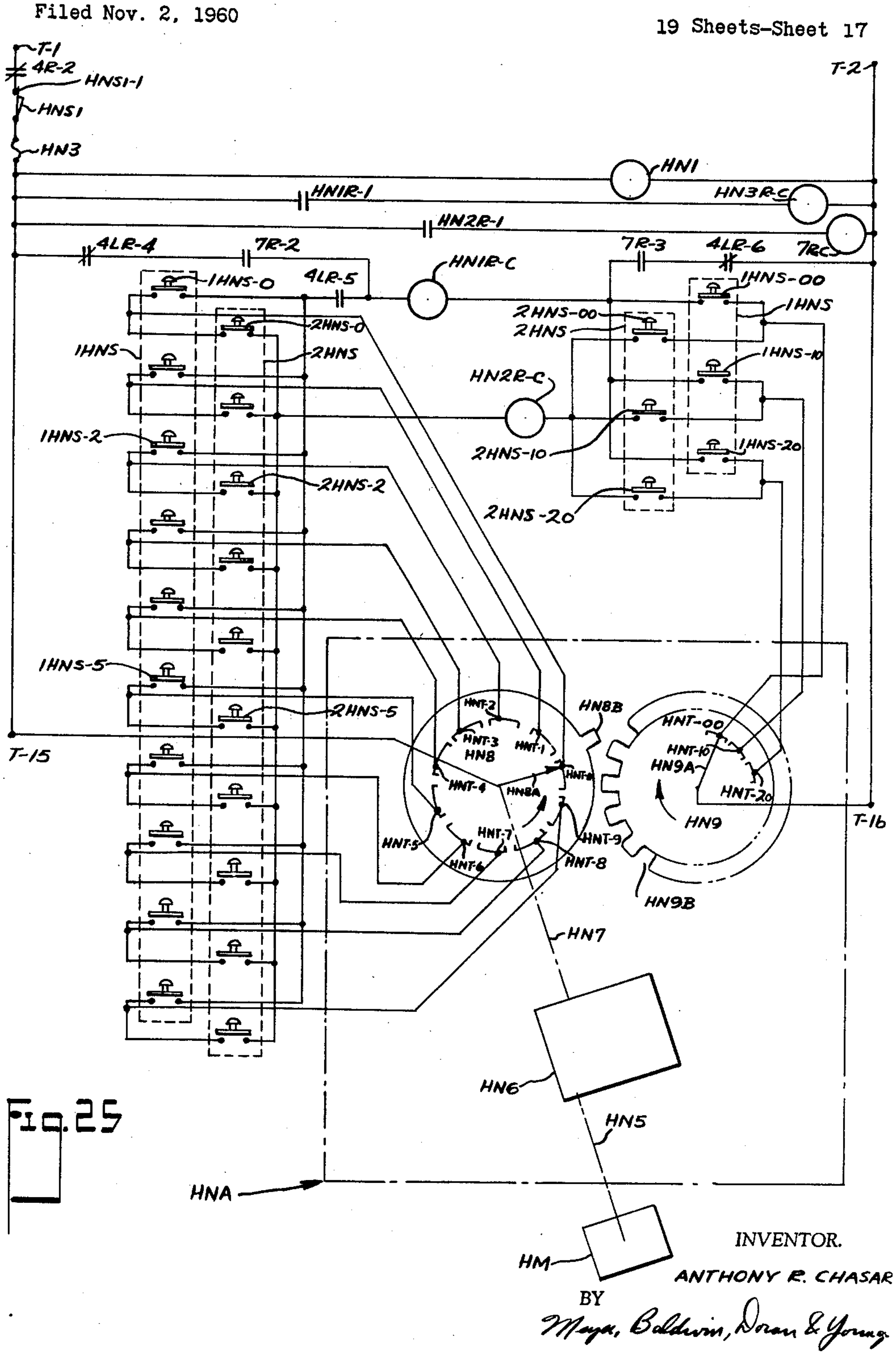
FIGS. 25 and 26 are respectively electrical diagrams of the horizontal and vertical counter circuits.
Figure 26:
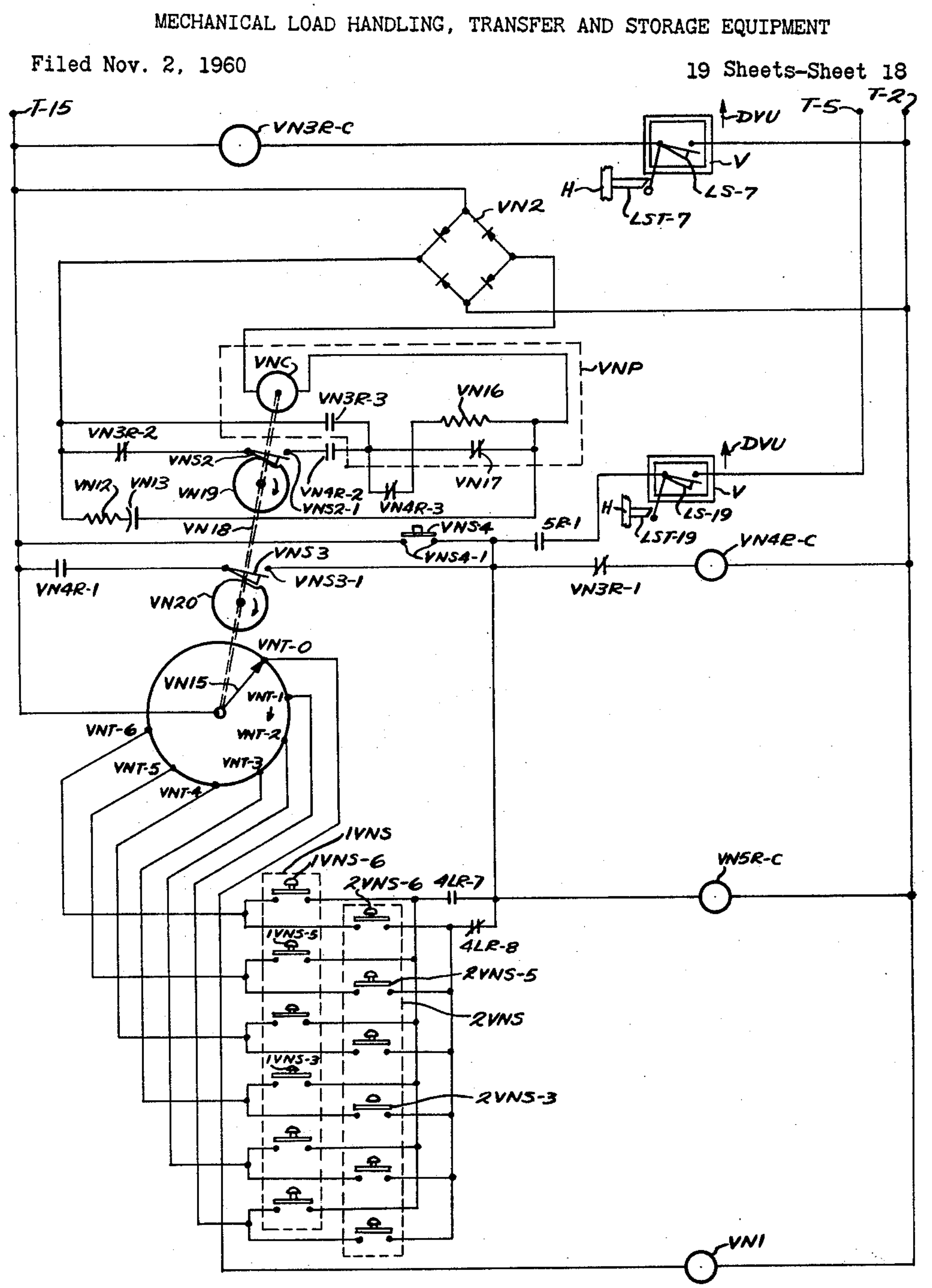

Now, all frames of carrier K are in position P1; all circuits are de-energized except circuit No. 1 to transformer T in FIG. 21, circuit No. 3 to pilot light HN1 in FIG. 25, circuit No. 5 to pilot light VN1 in FIG. 26, and circuit No. 6 to rectifier VN2 in FIG. 26; and all LR contacts are in their unlatched, normal, and illustrated positions (except whichever of the 3LR, 4LR or 5LR contacts now remain latched after having been latched by earlier energization of their respective energized latching coils, but were not later unlatched by energizing their respective unlatching coils). However, these latched and unlatched contacts will be reset in proper positions after which S4 or switch S3 is next pressed at position P1 to move carrier K away from position P1. Carrier K is in position P1 so as to be easily viewed by the operator at position P1 and to receive further travel instructions from the operator.

The description of condition No. 1C ends here.

*Picking up Load W at Position P3 for Storing—(1) Empty Carrier K Traveling in Direction D0 From Position P1 Through Position P2 to Position P3 to Pick up Load W at Position P3*

Sequence Nos. 1K and 3K start here.

Pushing switch S3 at position P1 forms and breaks many circuits to move carrier K from positions P1 to P3. Coils 4R–C and 5R–C are energized by forming circuit No. 8 from terminals T–1 in FIGS. 21 and 22 through closed contact S2–1 of switch S2, normally open switch LS–5B held closed by trip LST–5 with frame H in position P1, closed contact S3–2 of switch S3, coils 4R–C and 5R–C, and terminals T–2 in FIGS. 22 and 21. Energized coil 4R–C opens normally closed contact 4R–2 in FIG. 25 to break circuit Nos. 3, 5 and 6 to de-energize respectively pilot light HN1, pilot light VN1, and rectifier VN2 not used during this operation. Since position P3 is on the left, carrier K must service left panel FAL. This action is assured by forming circuit No. 9 from terminals T–1 in FIGS. 21 and 22 through closed contact S2–1 of switch S2, normally open switch LS–5B held closed by trip LST–5 with frame H in position P1, closed contact S3–3 of switch S3, coil 3LR–UC, and terminals T–2 in FIGS. 22 and 21. Energizing coil 3LR–UC moves all contacts controlled thereby to the illustrated or unactuated position so that panel FAL will be serviced.

Energizing coil 4R–C energizes coils 2LR–LC and 1LR–LC by forming: (1) circuit No. 10 from terminals T–1 in FIGS. 21 and 22 through closed contact S2–1 of switch S2, normally open contact 4R–1 closed by energized coil 4R–C, normally closed contact 3R–2, normally open contact 4R–3 closed by energized coil 4R–C, coil 2LR–LC, and terminals T–2 in FIGS. 22 and 21; and (2) circuit No. 12 from terminals T–1 in FIGS. 21 and 22 through closed contact S2–1 of switch S2, normally open contact 4R–1 closed by energized coil 4R–C, normally closed contact 3R–2, normally open contact 4R–3 closed by energized coil 4R–C, normally open contact 2LR–1 closed by energized coil 2LR–LC, coil 1LR–LC, and terminals T–2 in FIGS. 22 and 21.

Coil 3R–C is energized and some circuits are broken and formed. Coil 3R–C is energized by circuit No. 13 formed from terminals T–1 in FIGS. 21 and 22 through contact S2–1 of switch S2; normally open contact 4R–1 closed by energized coil 4R–C; normally open contact 1LR–2 closed by energized coil 1LR–LC; coil 3R–C; closed contacts HFOL–1, HFOL–2, HSOL–1, HSOL–2, VSOL–2, VSOL–1, VFOL–2, VFOL–1, EOL–1, EOL–2, JOL–1 and JOL–2; and terminals T–2 in FIGS. 22 and 21. Energizing coil 3R–C opens normally closed contact 3R–2 to break circuits Nos. 10 and 12 to de-energize respectively coils 2LR–LC and 1LR–LC. However, all contacts controlled by coils 1LR–LC and 2LR–LC remain in actuated position until coils 1LR–UC and 2LR–UC are energized later in the cycle. Coils 4R–C and 5R–C are kept energized by holding circuit No. 15 formed from terminals T–1 in FIGS. 21 and 22 through normally open contact 3R–3 closed by energized coil 3R–C, normally open contact 1LR–9 closed by energized coil 1LR–LC, normally open contact 4R–4 closed by energized coil 4R–C, normally open contact 3R–4 closed by energized coil 3R–C, coils 4R–C and 5R–C, and terminals T–2 in FIGS. 22 and 21.

Releasing switch S3 breaks and forms circuits. Releasing switch S3 breaks circuits Nos. 8 and 9 to de-energize coil 3LR–UC, but coils 4R–C and 5R–C are held energized by holding circuit No. 15. Releasing switch S3 forms for coil 3R–C holding circuit No. 16 from terminals T–1 in FIGS. 21 and 22 through closed contact S2–1 of switch S2; closed contact S3–1 of switch S3; normally open contact 4R–6 closed by energized coil 4R–C; coil 3R–C; closed contacts HFOL–1, HFOL–2, HSOL–1, HSOL–2, VSOL–2, VSOL–1, VFOL–2, VFOL–1, EOL–1, EOL–2, JOL–1 and JOL–2; and terminals T–2 in FIGS. 22 and 21.

Empty frame V is moved by motor VM in direction DVU from position P1 to P2 in the following sequential steps: (1) energizing motor VM for causing fast speed travel of frame V in direction DVU from position P1 to an approach position before position P2, (2) sensing presence of frame V in this approach position, (3) energizing motor VM for causing slow speed travel of frame V in direction DVU from this approach position to position P2, and (4) stopping motor VM with frame V in position P2.

Fast vertical travel by frame V from position P1 to the approach position before position P2 now occurs. Energizing coil 3R–C energizes coil VB–C by circuit No. 17 formed from terminals T–1 in FIGS. 21 and 22 through normally open contact 3R–3 closed by energized coil 3R–C, terminals T–3 in FIGS. 22 and 23, closed contact SV–1 of switch SV, normally open contact 4R–7 closed by energized coil 4R–C, normally closed contacts HFF–6 and 3LR–9, normally closed switch LS–8LA, normally open contact 1LR–7 closed by energized coil 1LR–LC, normally open switch LS–16 held closed by trip LST–16 in position PEC, terminals T–10 in FIGS. 23 and 24, normally open switch LS–13B held closed by trip LST–13 in position PEC, terminals T–11 in FIGS. 24 and 23, coil VB–C, and terminals T–4 and T–2 in FIGS. 23, 22 and 21. Energizing coil VB–C forms circuit No. 19 in FIG. 21 by closing contacts VB–2, VB–3 and VB–4 to energize and disengage brake VMB. After coil VB–C is energized, fast speed up drive by motor VM is caused by energizing coil VFU–C by forming circuit No. 20 from terminals T–1 in FIGS. 21 and 22 through closed contact 1LR–7 in FIG. 23 by the same path followed by circuit No. 17 and then through normally open contact VB–1 closed by energized coil VB–C, normally open contact 2LR–3 closed by energized coil 2LR–LC, normally closed contact VN5R–1, coil VFU–C, normally closed contacts VSD–1 and VSU–1, and terminals T–4 and T–2 in FIGS. 23, 22 and 21. Energizing coil VFU–C energizes motor VM for fast travel in direction DVU by forming circuit No. 22 in FIG. 21 from lines L1, L2 and L3 through normally open contacts VFU–2, VFU–3 and VFU–4, closed by energized coil VFU–C, and coils VFOL–C1 and VFOL–C2 to motor VM.

Figure 22:
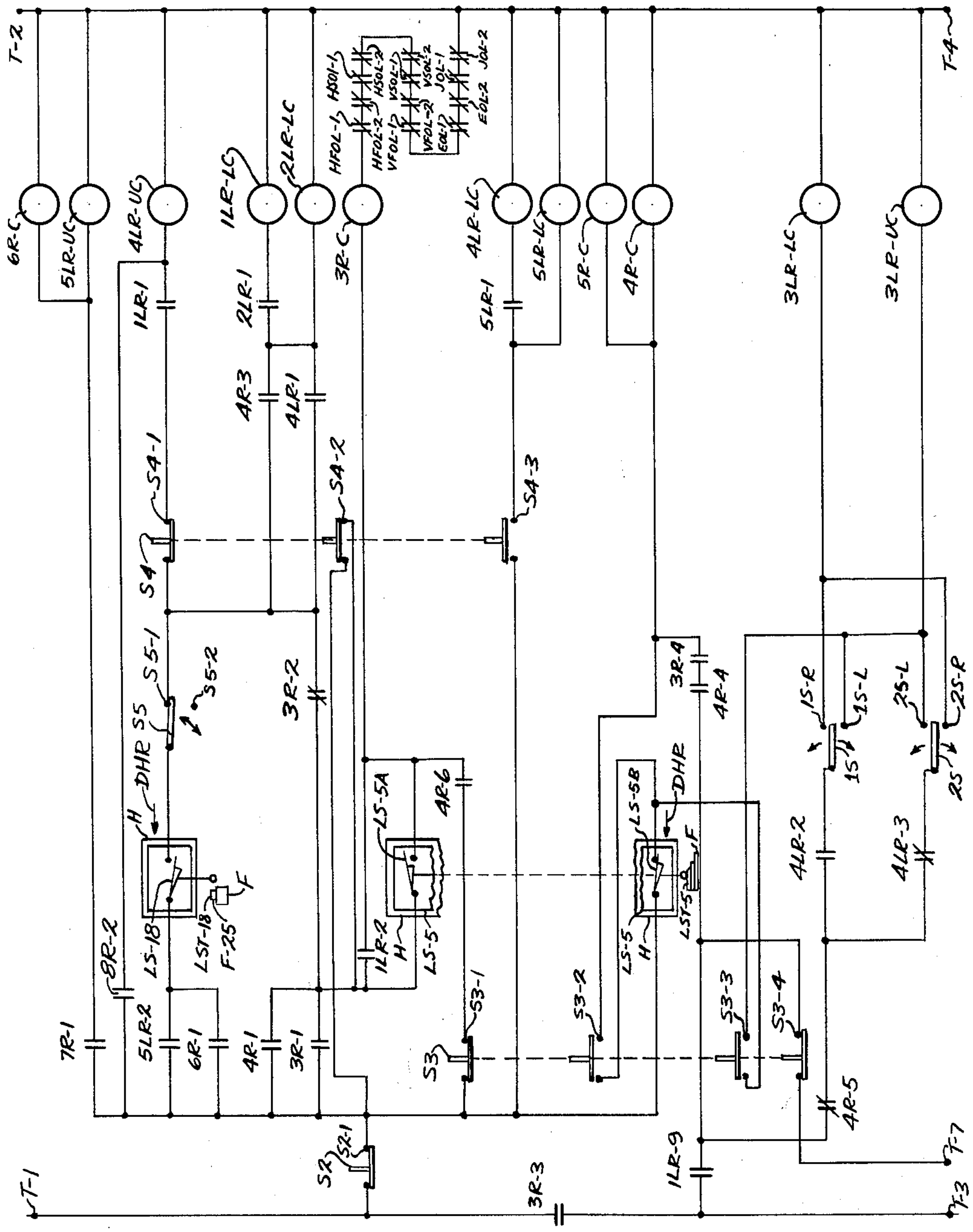
FIGS. 22, 23 and 24 are respectively upper, middle, and lower component parts of the main electrical control diagram schematically showing the limit switches shown in FIGS. 2, 3 and 4.

Upward movement of frame V out of position P1 forms for coils 4R–C and 5R–C holding circuit No. 23 from terminals T–1 in FIGS. 21 and 22 through normally open contact 3R–C closed by energized coil 3R–C, terminals T–3 in FIGS. 22 and 23, closed contact SV–1 of switch SV, normally closed switch LS–9B closed since frame V is above position P1, terminals T–7 in FIGS. 23 and 22, closed contact S3–4 of switch S3, normally open contacts 4R–4 and 3R–4 closed by energized coils 4R–C and 3R–C respectively, coils 4R–C and 5R–C, and terminals T–2 in FIGS. 22 and 21.

The presence of frame V in the approach position to position P2 is sensed by closing of switch LS–19 to form circuit No. 24 from terminals T–1 in FIGS. 21 and 22 through normally open contact 3R–3 closed by energized coil 3R–C; terminals T–3 and T–5 in FIGS. 22, 23 and 26; normally open limit switch LS–19 on frame V in FIGS. 2, 8, 9, 11, and 26 closed by trip LST–19 on frame H as frame V moves in direction DVU at this approach position; normally open contact 5R–1 closed by energized coil 5R–C; coil VN5R–C; and terminals T–2 in FIGS. 26 and 21.

Now, as frame V approaches position P2, motor VM has its fast speed upward drive disengaged and its slow speed upward drive engaged. When coil VN5R–C was energized by forming circuit No. 24, then: (1) normally closed contact VN5R–1 opened to break circuit No. 20 to de-energize coil VFU–C to open contacts VFU–2, VFU–3, and VFU–4 to break circuit No. 22 to de-energize the fast speed upward drive by motor VM; and (2) normally open contact VN5R–2 closed to energize coil VSU–C by forming circuit No. 26 from terminals T–1 in FIG. 21 through closed contact 1LR–7 by the same path followed by circuit No. 17 and then through normally open contact VB–1 closed by energized coil VB–C, normally open contact 2LR–3 closed by energized coil 2LR–LC, normally open contact VN5R–2 closed by energized coil VN5R–C, coil VSU–C, normally closed contacts VFD–1 and VFU–1, and terminals T–4 and T–2 in FIGS. 23, 22 and 21. When coil VSU–C is energized, motor VM is energized for moving frame V in direction DVU at slow speed by circuit No. 27 formed in FIG. 21 from lines L1, L2 and L3 through normally open contacts VSU–2, VSU–3 and VSU–4, closed by energized coil VSU–C, and coils VSOL–C1 and VSOL–C2 to motor VM.

As frame V moves in direction DVU at slow speed, other circuits are formed and broken. When coil VSU–C is energized, switch LS–8L in FIG. 23 is swung by solenoid coil CL on its pivot 8–1 from its solid line to its dot-dash line position to prepare frame V for the stopping action. Coil CL is energized by circuit No. 30 formed from terminals T–1 in FIGS. 21 and 22 through normally open contact 38–3 closed by energized coil 3R–C, terminals T–3 in FIGS. 22 and 23, normally open contact VSU–6 closed by energized coil VSU–C, normally closed contact 3LR–6, coil CL, and terminals T–4 and T–2 in FIGS. 23, 22 and 21. As frame V moves in direction DVU switch LS–19 clears trip LST–19 in FIG. 26 to open to break circuit No. 24 to de-energize coil VN5R–C to open normally open contact VN5R–2 to break circuit No. 26, but coil VFU–C is held energized by holding circuit No. 29 following the same path as circuit No. 26 but through normally open contact VSU–5 in FIG. 23 closed by energized coil VSU–C instead of the parallel path through normally open contact VN5R–2.

When frame V reaches position P2, movement of frame V in direction DVU is stopped. Opening switch LS–8LA by trip LST–8L when frame V is in position P2 breaks circuit No. 17 to de-energize coil VB–C and breaks circuit No. 29 to de-energize coil VSU–C. De-energizing these coils respectively break circuit No. 19 by opening contacts VB–2, VB–3 and VB–4 to de-energize and engage brake VMB and break circuit No. 27 by opening contacts VSU–2, VSU–3 and VSU–4 to de-enerize and stop motor VM.

Sequence No. 5K starts here.

Although de-energizing coil VSU–C opens normally closed contact VSU–6 to break circuit No. 30, coil CL is held energized to maintain switch LS–8L in the dot-dash line position by circuit No. 31 previously formed (after circuit No. 30 was formed an before coil VSU–C was de-energized) from terminals T–1 in FIGS. 21 and 22 through normally open contact 3R–3 closed by energized coil 3R–C, terminals T–3 in FIGS. 22 and 23, normally open switch LS–8LB closed by trip LST–8L when frame V is in position P2, normally closed contact 3LR–6, coil CL, and terminals T–4 and T–2 in FIGS. 23, 22 and 21.

Frame E is moved by motor EM in direction DEL from positions PEC and P2 to positions PEL and P3. Closing switch LS–8LB starts movement of frame E by energizing coil EL–C by forming circuit No. 33 from terminals T–1 in FIGS. 21 and 22 through normally open contact 3R–3 closed by energized coil 3R–C, terminals T–3 in FIGS. 22 and 23, normally open switch LS–8LB closed by trip LST–8L, terminals T–9 in FIGS. 23 and 24, normally closed contact SE–1 of switch SE, normally closed contacts VSU–7 and VFU–5, normally closed switches LS–12LA and LS–12RA (closed as long as frame E is not in position PEL or PER), normally open contact 1LR–8 closed by energized coil 1LR–LC, normally closed contact 3LR–1, coil EL–C, terminals T–6, T–4 and T–2 in FIGS. 24, 23, 22 and 21. Energizing coil EL–C forms circuit No. 34 in FIG. 21 from lines L1, L2 and L3 through normally open contacts EL–2, EL–3 and EL–4, closed by energized coil EL–C, and coils EOL–C1 and EOL–C2 to energize and disengage brake EMB and to energize motor EM to advance frame E in direction DEL under load W at position P3.

Sequence No. 1K ends here.

Frame E is stopped in positions PEL and P3. When frame E reaches positions PEL and P3, normally closed switch LS–12LA is open by trip LST–12L to break circuit No. 33 to de-energize coil EL–C to open contacts EL–2, EL–3 and EL–4 to break circuit No. 34 to stop motor EM and to engage brake EMB to stop frame E in positions PEL and P3.

Sequence Nos. 3K and 5K end here, and Sequence No. 6K starts here.

Circuits are formed to prepare empty frame J to be moved by motor JM in direction DJU from position PJD to PJU to pick up load W from surface F–1 at position P3. Frame J is prepared to be raised into load contact by energizing coil JU–C by forming circuit No. 36 from terminals T–1 in FIGS. 21 and 22 through normally open contact 38–3 closed by energized coil 38–C; terminals T–3 and T–5 in FIGS. 22, 23 and 24; normally open contact 2LR–4 closed by energized coil 2LR–LC, normally open switch LS–12LB held closed by trip LST–12L in position PEL; normally closed switch LS–10A; normally closed contact JD–1; coil JU–C; and terminals T–6, T–4 and T–2 in FIGS. 24, 23, 22 and 21. Energizing coil JU–C energizes motor JM and disengages brake JMB by forming circuit No. 37 in FIG. 21 from lines L1, L2, and L3 through normally open contacts JU–2, JU–3 and JU–4, closed by energized coil JU–C, and coils JOL–C1 and JOL–C2 to motor JM and brake JMB.

Energizing coil JU–C forms and breaks circuits. Coil JU–C is held energized by holding circuit No. 38 following the same path as circuit No. 36 but through normally open contact JU–1 closed by energized coil JU–C instead of the parallel path in FIG. 24 through contact 2LR–4. Energizing coil JU–C energizes unlatching coils 1LR–UC and 2LR–UC by forming circuit No. 40 from terminals T–1 in FIGS. 21 and 22 through normally open contact 3R–3 closed by energized coil 3R–C; terminals T–3 and T–5 in FIGS. 22, 23 and 24; normally open switch LS–11B held closed by frame J in position PJD; normally open contact JU–6 closed by energized coil JU–C; coils 1LR–UC and 2LR–UC; and terminals T–6, T–4 and T–2 in FIGS. 24, 23, 22 and 21. When unlatching coils 1LR–UC and 2LR–UC are energized, all of their respective contacts 1LR–1 to 1LR–10 and 2LR–1 to 2LR–4, inclusive, are returned to their illustrated, unactuated and normal position. Energizing coil 2LRA–UC breaks circuit No. 36 by opening contact 2LR–4 but coil JU–C is held energized by holding circuit No. 38.

Sequence No. 6K ends here.

Energizing coil 1LR–UC breaks other circuits. Energizing coil 1LR–UC breaks: (1) circuit No. 15 used for energizing coils 4R–C and 5R–C by opening normally open contact 1LR–9, but coils 4R–C and 5R–C are kept energized by holding circuit No. 23 earlier formed; and (2) break circuit No. 13 used for energizing coil 3R–C by opening normally open contact 1LR–2, but coil 3R–C is kept energized by holding circuit No. 16 earlier formed.

Sequence No. 7K starts here.

Now, motor JM, energized by circuit No. 37, moves frame J in direction DJU from position PJD to PJU to lift load W off surface F–1 onto frame J. As frame J (moving in direction DJU) leaves position PJD, switch LS–11B opens to break circuit No. 40 to de-energize coils 1LR–UC and 2LR–UC. When frame J reaches position PJU, trip LST–10 opens normally closed switch LS–10A to break holding circuit No. 38 to de-energize coil JU–C. Deenergizing coil JU–C opens contacts JU–2, JU–3 and JU–4 to break circuit No. 37 to de-energize and stop motor JM and to engage brake JMB to stop frame J in position PJU.

Sequence No. 7K ends here.

*Picking up Load W at Position P3 for Storing*—(2) *Carrier K Traveling in Direction DI Carrying Load W From Position P3 Through Position P2 to Position P1*

Sequence Nos. 9K and 11K start here.

Energizing unlatching coils 1LR–UC and 2LR–UC withdraw by frame J load W from frame F at position P3 back onto frame V at position P2 and then lower frame V to position P1.

Sequence No. 8K starts here.

Frame E with load W is moved by motor EM in direction DER from positions PEL and P3 to positions PEC and P2. Frame E is moved in direction DER by energizing motor starter coil ER–C by forming circuit No. 41 from terminals T–1 in FIGS. 21 and 22 through normally open contact 3R–3 closed by energized coil 3R–C; terminals T–3 in FIGS. 22 and 23; normally open switch LS–8LB closed by trip LST–8L with frame V in position P2; terminals T–9 in FIGS. 23 and 24; normally closed contact SE–1 of switch SE; normally closed contacts VSU–7 and VFU–5; normally closed switch LS–13A closed since frame E is in position PEL; normally closed contacts JD–7, JU–7 (closed after breaking circuit No. 38 to de-energize coil JU–C), 1LR–10 and 3LR–3; coil ER–C; and terminals T–6, T–4 and T–2 in FIGS. 24, 23, 22 and 21. Energizing coil ER–C energizes motor EM and disengages brake EMB to move frame E in direction DER by forming circuit No. 43 in FIG. 21 from lines L1, L2 and L3 through normally open contacts ER–2, ER–3 and ER–4, closed by energized coil ER–C, and coils EOL–C1 and EOL–C2 to motor EM and brake EMB. When frame E approaches positions PEC and P2, normally closed switch LS–13A is opened by trip LST–13 to break circuit No. 41 to de-energize coil ER–C to break circuit No. 43 by opening contacts ER–2, ER–3 and ER–4 to de-energize and to engage blake EMB and to de-energize and stop motor EM.

Sequence No. 8K ends here, and Sequence Nos. 14K and 15K start here.

Frame V is moved by motor VM in direction DVD from position P2 to P1 in the following sequential steps: (1) energizing motor VM for causing fast speed travel of frame V in direction DVD from position P2 to an approach position before position P1, (2) energizing motor VM for causing slow speed travel of frame V in direction DVD from this approach position to position P1, and (3) stopping motor VM and frame V in position P1.

Sequence No. 13K starts here.

Fast travel by frame V in direction DVD from position P2 toward the approach position before position P1 now occurs. When frame E reaches position PEC, normally open switches LS–13B and LS–16 are closed by respective trips LST–13 and LST–16 to energize coil VB–C by forming circuit No. 44 from terminals T–1 in FIGS. 21 and 22 through normally open contact 3R–3 closed by energized coil 3R–C, terminals T–3 in FIGS. 22 and 33, normally closed contact SV–1 of switch SV, closed switch LS–9B, normally closed contact 1LR–6, normally open switch LS–16 held open by trip LST–6 in position PEC, terminals T–10 in FIGS. 23 and 24, normally open switch LS–13B held closed by trip LST–13 in position PEC, terminals T–11 in FIGS. 24 and 23, coil VB–C, and terminals T–4 and T–2 in FIGS. 23, 22 and 21. Energizing coil VB–C: (1) reforms circuit No. 19 by closing contacts VB–2, VB–3 and VB–4 to energize and disengage brake VMB; and (2) energizes coil VFD–C by forming circuit No. 45 from terminals T–1 in FIGS. 21 and 22 through normally closed contact 1LR–6 along the path for circuit No. 44 and then through normally open contact VB–1 closed by energized coil VB–C, normally closed contact 2LR–2, normally closed switch LS–14A, coil VFD–C, normally closed contacts VSD–1 and VSU–1, and terminals T–4 and T–2 in FIGS. 23, 22 and 21. Energizing coil VFD–C energizes motor VM by forming circuit No. 47 in FIG. 21 from lines L1, L2 and L3 through normally open contacts VFD–2, VFD–3 and VFD–4, closed by energized coil VFD–C, and coils VFOL–C1 and VFOL–C2 to motor VM.

Sequence Nos. 13K and 14K end here.

As frame V moves in direction DVD from position

P2, switch LS–8L moves clear of trip LST–8L so switch LS–8LB opens to break circuit No. 31 to de-energize coil CL to swing switch LS–8L from the dot-dash line to the solid line position in FIG. 23.

Sequence No. 17K starts here.

As frame V reaches the approach position before position P1, motor VM has its fast speed drive disengaged and its slow speed downward drive engaged. As frame V approaches position P1, normally closed switch LS–14A is opened by trip LST–14 to break circuit No. 45 to de-energize coil VFD–C to open contacts VFD–2, VFD–3 and VFD–4 to break circuit No. 47 to de-energize fast speed motor VM. Trip LST–14 closes switch LS–14B to energize motor VM for slow speed downward movement by forming circuit No. 48 from terminal T–1 in FIG. 21 through normally closed contact 1LR–6 along the same path as circuit No. 44 and then through normally open contact VB–1 closed by energized coil VB–C, normally closed contact 2LR–2, normally open switch LS–14B closed by trip LST–14 since frame V is approaching position P1, coil VSD–C, normally closed contacts VFD–1 and VFU–1, and terminals T–4 and T–2 in FIGS. 23, 22 and 21. Energizing coil VSD–C energizes motor VM by forming circuit No. 50 in FIG. 21 from lines L1, L2 and L3 through normally open contacts VSD–2, VSD–3 and VSD–4, closed by energized coil VSD–C, and coils VSOL–C1 and VSOL–C2 to motor VM.

As frame V moves in direction DVD and switch LS–14B opens as it moves past trip LST–14, circuit No. 48 is broken but coil VSD–C is kept energized by holding circuit No. 51 previously formed along the same path as circuit No. 48 but through normally open contact VSD–5 earlier closed by coil VSD–C energized by circuit No. 48 instead of through parallel switch LS–14B.

As frame V reaches position P1, motor VM and frame V stop. Then, trip LST–9 opens normally closed switch LS–9B to: (1) break circuit No. 51 to de-energize coil VSD–C to open contacts VSD–2, VSD–3 and VSD–4 to break circuit No. 50 to de-energize and stop motor VM, and (2) break circuit No. 44 to de-energize coil VB–C to open contacts VB–2, VB–3 and VB–4 to break circuit No. 19 to de-energize and re-engage brake VMB to stop frame V at position P1.

Sequence Nos. 9K and 17K end here.

Coils 4R–C and 5R–C are de-energized. When switch LS–9B opens, holding circuit No. 23 is broken to de-energize coils 4R–C and 5R–C.

De-energizing coil 4R–C reforms and breaks other circuits. De-energizing coil 4R–C closes normally closed contact 4R–2 in FIG. 25 to reform: (1) circuit No. 5 to energize pilot light VN–1, (2) circuit No. 6 to provide rectified A.-C. to D.-C. power by rectifier VN2, and (3) circuit No. 3 to energize pilot light HN1. De-energizing coil 4R–C opens normally open contact 4R–6 to break circuit No. 16 to de-energize coil 3R–C.

Now, all frames of carrier K are in position P1; and carrier K and all circuits are in the earlier described condition No. 1C.

Sequence Nos. 11K and 15K end here.

*Two Command Action (Second Command Bay Number Larger Than First Command Bay Number): Storing Load W in Left Panel FAL in First Command Position P6 and Retrieving Load W in Right Panel FAR in Second Command Position P9—(1) Load Carrier K Traveling in Direction DI Carrying Load W in Direction DHF From Position P1 to Position P4*

The distinction in the description hereinafter is that the second command bay number at position P9 is larger than the first command bay number at position P6.

The operator desires to store load W by the first command in preselected fifteenth bay FB at preselected third level FL, to pick up load W by a second command in preselected twenty-second bay FB at preselected fifth level FL, and to return last load W to position P1. Then, the operator would at position P1: (1) select and turn on the two command action by closing contact S5–1 of two command switch S5 in FIG. 22; (2) push button 1HNS–10 in the ten series and button 1HNS–5 in the unit series or first command push key switch 1HNS in FIG. 25 to select fifteenth bay FB; (3) push button 1VNS–3 in the unit series of first command push key switch 1VNS in FIG. 26 to select third level FL; (4) push button 2HNS–20 in the ten series and button 2HNS–2 in the unit series of second command push key switch 2HNS in FIG. 25 to select twenty-second bay FB; and (5) push button 2VNS–5 in the unit series of second command push key switch 2VNS in FIG. 26 to select fifth level FL.

The operator must also determine whether he wants to service right or left panel FAR or FAL. Here, the operator closes the start left contact 1S–L of first command switch 1S in FIG. 22 to store load W in position P6 by the first command in left panel FAL and closes start right contact 2S–R of second command switch 2S to pick up load W in position P9 by a second command in right panel FAR.

Sequence Nos. 19K, 21K, 23K and 25K start here.

Now, the operator should be sure that pilot lights HN1 and VN1 in FIGS. 25 and 26 are lighted to indicate respectively that the counter circuits in FIGS. 25 and 26 are energized and that rotating contacts VN15 and VNT–0 are properly closed by circuit No. 5. If any of these lights are not lighted, closing contact HNS1–1 of switch HNS1 may form circuits Nos. 3 and 5; circuit No. 5 may be formed by pressing switch VNS4 to perform Sequence No. 71K, described hereinafter.

Pushing start switch S4 forms some circuits. Coil 5LR–LC is energized by circuit No. 52 formed from terminals T–1 in FIGS. 21 and 22 through closed contact S2–1 of switch S2, closed contact S4–3 of switch S4, coil 5LR–LC, and terminals T–2 in FIGS. 22 and 21. Energizing coil 5LR–LC energizes coil 4LR–LC by circuit No. 54 formed from terminals T–1 in FIGS. 21 and 22 through closed contact S4–3 along the path of circuit No. 52 and then through normally open contact 5LR–1 closed by energized coil 5LR–LC, and terminals T–2 in FIGS. 22 and 21. Energizing coil 4LR–LC energizes coil 2LR–LC by circuit No. 55 formed from terminals T–1 in FIGS. 21 and 22 through closed contact S2–1 of switch S2, closed contact S4–2 of switch S4, normally closed contact 3R–2, normally open contact 4LR–1 closed by energized coil 4LR–LC, coil 2LR–LC, and terminals T–2 in FIGS. 22 and 21. Energizing coil 2LR–LC energizes coil 1LR–LC by circuit No. 57 formed from terminal T–1 in FIG. 21 through closed contact 4LR–1 along the path of circuit No. 55 and then through normally open contact 2LR–1 closed by energized coil 2LR–LC, coil 1LR–LC, and terminals T–2 in FIGS. 22 and 21. Energizing coil 1LR–LC energizes coil 3R–C by circuit No. 58 formed from terminals T–1 in FIGS. 21 and 22 through closed contact S2–1 of switch S2; closed contact S4–2 of switch S4; normally open contact 1LR–2 closed by energized coil 1LR–LC; coil 3R–C; closed contacts HFOL–1, HFOL–2, HSOL–2, HSOL–1, HSOL–2, VSOL–2, VSOL–1, VFOL–2, VFOL–1, EOL–1, EOL–2, JOL–1 and JOL–2; and terminals T–2 in FIGS. 22 and 21.

Sequence No. 19K ends here.

Energizing coil 3R–C energizes coil 3LR–UC to indicate that the first command will service left panel FAL by forming circuit No. 59 from terminals T–1 in FIGS. 21 and 22 through normally open contact 3R–3 closed by energized coil 3R–C, normally open contact 1LR–9 closed by energized coil 1LR–LC, normally closed contact 4R–5, normally open contact 4LR–2 closed by energized coil 4LR–LC, closed contact 1S–L of first command switch 1S, coil 3LR–UC, and terminals T–2 in FIGS. 22 and 21.

Sequence No. 27K starts here.

Energizing coil 3R–C holds coil 3R–C energized by holding circuit No. 61 formed from terminals T–1 in FIG.

21 along the same path as circuit No. 58 but through normally open contact 3R–1 closed by energized coil 3R–C instead of through parallel switch contact S4–2.

After switch S4 is released, circuits Nos. 52 and 54 are broken by opening contact S4–3 to de-energize coils 5LR–LC and 4LR–LC respectively; circuits Nos. 55, 57 and 58 are broken by opening contact S4–2 to de-energize coils 2LR–LC and 1LR–LC, but coil 3R–C is held energized by holding circuit No. 61. Although coils LLR–LC, 2LR–LC, 4LR–LC and 5LR–LC are de-energized, all contacts controlled by each of these coils remain locked in the actuated position until their corresponding unlatching coil is energized later.

Sequence No. 27K ends here.

Frame H with load W is moved by motor HM in direction DHF from position P1 to P4 in the following sequential steps: (1) energizing motor HM for causing fast speed travel of frame H in direction DHF from position P1 to an approach position before position P4, (2) counting bays FB approached by frame H on counter and drive unit HNA in FIG. 25 until preselected first command fifteenth bay FB is approached with frame H in the approach position, (3) energizing motor HM for causing slow speed travel of frame H in direction DHF from this approach position to position P4, and (4) stopping motor HM and frame H at preselected first command fifteenth bay FB in position P4.

Fast horizontal travel by frame H from position P1 to the approach position before position P4 now occurs. After coil 3R–C has been energized, coil HB–C is energized by circuit No. 62 formed from terminals T–1 in FIGS. 21 and 22 through normally open contact 3R–3 closed by energized coil 3R–C, terminals T–3 in FIGS. 22 and 23, normally open switch LS–9A held closed by trip LST–9 (while frame V is in position P1, P4 or P7), normally closed contact 3LR–7, normally closed switch LS–3LA, normally closed contact 4R–8, coil HB–C, terminals T–4 and T–2 in FIGS. 23, 22 and 21. Energizing coil HB–C: (1) disengages brake HMB by forming circuit No. 64 in FIG. 21 from lines L1, L2 and L3 through normally open contacts HB–2, HB–3 and HB–4, closed by energized coil HB–C, to brake HMB to disengage brake HMB; and (2) energizes coil HFF–C by forming circuit No. 65 from terminal T–1 in FIG. 21 through normally closed contact 4R–8 in FIG. 23 along the path followed by circuit No. 62 and then through normally open contact HB–1 closed by energized coil HB–C, normally open contact 1LR–4 closed by energized coil 1LR–LC, normally closed contact HN3R–1, coil HFF–C, normally closed contacts HSR–1 and HSF–1, and terminals T–4 and T–2 in FIGS. 23, 22 and 21. When coil HFF–C is energized, motor HM is energized for causing forward fast travel of frame H by forming circuit No. 66 in FIG. 21 extending from lines L1, L2 and L3 through normally open contacts HFF–2, HFF–3, and HFF–4 closed by energized coil HFF–C, and coils HFOL–C1 and HFOL–C2 to motor HM.

As frame H travels in direction DHF, other circuits are formed. Switch LS–5A returns to its normally closed position since frame H is no longer in position P1. Then, coil 3R–C is maintained energized by holding circuit No. 68 following the same path as holding circuit No. 61 but through closed switch LS–5A instead of closed contact 1LR–2 in parallel therewith. Since travel of frame H in direction DHF causes switch LS–3LA to be opened at each bay FB by trip LST–3L to open circuits Nos. 62 and 65, holding circuits Nos. 69 and 71 are formed to maintain coils HB–C and HFF–C energized after each opening of switch LS–3LA breaks circuits Nos. 62 and 65 respectively. Forming circuit No. 65 forms: (1) circuit No. 69 holding coil HB–C energized along the same path as circuit No. 62 but through normally open contact HFF–1 closed by energized coil HFF–C instead of through contact 3LR–7 and switch LS–3LA in parallel therewith, and (2) circuit No. 71 to hold coil HFF–C energized along the same path as circuit No. 65 but through normally open contact HFF–1 closed by energized coil HFF–C instead of through parallel contact 3LR–7 and switch LS–3LA. Therefore, opening of switch LS–3LA by trip LST–3L at each bay FB will not break these holding circuits Nos. 69 and 71 and will not de-energize coils HB–C and HFF–C.

Sequence No. 21K ends here.

Counting bays FB approached by frame H on counter and drive unit HNA on frame H in FIG. 25 until selected fifteenth bay FB is approached now occurs. As frame H is driven by motor HM in direction DHF, counter mechanism or unit HNA is synchronously driven therewith. Motor HM drives counter mechanism HNA, driven with rollers HM–12 for obtaining its count with rotation of rollers HM–12 on rail F–15 measuring the horizontal distance in direction DHF. This driving action by motor HM drives rotating disk HN8 in FIG. 25 and rotating contact HN8A on rotatable disk HN8 through shaft HN5, gear box HN6 providing suitable speed reduction, and shaft HN7. As frame H approaches each bay FB, disk HN8 is rotated so that its rotating contact HN8A sequentially closes stationary contacts HNT–1, HNT–2, etc. After disk HN8 makes a complete rotation in the counterclockwise direction, its gear tooth HN8B engages one of the gear teeth HN9B on rotatable disk HN9 to move it one tooth in the clockwise direction and thus advance rotating contact HN9A carried by disk HN9 the distance separating a pair of stationary contacts, such as contacts HNT–00 and HN–T10. This units disk HN8 and tens disk HN9 are a schematic illustration of any suitable counter obtaining the disclosed end result; these disks may be friction locked in any suitable manner so as not to rotate by vibration but only to rotate when driven.

Sequence No. 31K starts here.

When frame H has traveled in direction DHF far enough to approach first command selected fifteenth bay FB, the correct count has been reached and new circuits are formed because contacts HN8A and HNT–5 are closed and because contacts HN9A and HNT–10 are closed in this approach position. Then, coil HN1R–C is energized by circuit No. 72 formed from terminals T–1 in FIGS. 21 and 25 through normally closed contact 4R–2, closed contact HNS1–1 of switch HNS1, fuse HN3, closed contacts HN8A and HNT–5, closed switch 1HNS–5, normally open contact 4LR–5 closed by energized coil 4LR–LC, coil HN1R–C, closed switch 1HNS–10, closed contacts HNT–10 and HN9A, and terminals T–2 in FIGS. 25 and 21.

As frame H reaches the approach position before position P4 when circuit No. 72 is formed, motor HM has its fast speed forward drive disengaged. Energizing coil HN1R–C by circuit No. 72 energizes coil HN3R–C by circuit No. 73 formed from terminals T–1 in FIGS. 21 and 25 through normally closed contact 4R–2, closed contact HNS1–1 of switch HNS1, fuse HNS3, normally open contact HN1R–1 closed by energized coil HN1R–C, coil HN3R–C, and terminals T–2 in FIGS. 25 and 21. Energizing coil HN3R–C opens normally closed contact HN3R–1 in FIG. 23 to break circuits Nos. 65 and 71 to de-energize coil HFF–C so as: (1) to break circuit No. 66 by opening contacts HFF–2, HFF–3 and HFF–4 to de-energize the fast speed drive by motor HM; and (2) to break holding circuits Nos. 69 and 71 by opening normally open contact HFF–1 so that these holding circuits cannot be re-established.

Sequence No. 33K starts here.

Energizing coil HN3R–C by forming circuit No. 73 also energizes motor HM for slow speed forward travel. Energizing coil HN3R–C closes normally open contact HN3R–2 in FIG. 23 to energize coil HSF–C by circuit No. 75 from terminal T–1 in FIG. 21 along the same path as circuit No. 62 through normally closed contact 4R–8 and then through normally open contact HB–1 held closed by energized coil HB–C, normally open contact 1LR–4 closed by energized coil 1LR–LC, normally open contact HN3R–2 closed by energized coil HN3R–C, coil HSF–C, normally closed contacts HFR–1 and HFF–5, and terminals T–4 and T–2 in FIGS. 23, 22 and 21. When coil HSF–C is energized, motor HM is energized for causing forward slow travel of frame H by circuit No. 76 in FIG. 21 from lines L1, L2 and L3 through normally open contacts HSF–2, HSF–3 and HSF–4, closed by energized coil HSF–C, and coils HSOL–C1 and HSOL–C2 to motor HM.

As frame H travels toward and arrives in position P4, it should be noted that stationary contact HNT–5 in FIG. 25 is of long enough arcuate form to keep coils HN1R–C and HN3R–C energized even in position P4. It will be apparent hereinafter that contact HNT–5 is also long enough to maintain this energization when limit switch LS–18 is tripped contiguous to position P4 (on the position P1 side thereof) later in this description. It will also be apparent later that similar energization is maintained for position P7 with contact HNT–2 in FIG. 25, as has been described for position P4, and will take place for any other suitable corresponding position.

When frame H reaches position P4, motor HM and frame H are stopped at preselected first command fifteenth bay FB in position P4. As frame H reaches preselected fifteenth bay FB, normally closed switch LS–3LA in FIG. 23 is opened by trip LST–3L to break: (1) circuit No. 62 to de-energize coil HB–C to open contacts HB–2, HB–3 and HB–4 to break circuit No. 64 to de-energize and re-engage brake HMB, and (2) circuit No. 75 to de-energize coil HSF–C to open contacts HSF–2, HSF–3 and HSF–4 to break circuit No. 76 to de-energize and stop motor HM to stop frame H in position P4. De-energized coil HB–C opens normally open contact HB–1 to prevent reforming circuit No. 75.

Sequence No. 33K ends here.

*To Command Action (Second Command Bay Number Larger Than First Command Bay Number): Storing Load W in Left Panel FAL in First Command Position P6 and Retrieving Load W in Right Panel FAR in Second Command Position P9—(2) Carrier K Traveling in Direction DI Carrying Load W in Direction DVU From Position P4 to Position P5 and in Direction DEL to Deposit Load W at First Command Position P6*

Frame V with load W is moved by motor VM in direction DVU from position P4 to P5 in the following sequential steps: (1) energizing motor VM for fast speed travel of frame V in direction DVU from position P4 to an approach position before position P5, (2) counting levels FL approached by frame V in the vertical counter circuit in FIG. 26 until preselected third level FL is reached with frame V in this approach position, (3) energizing motor VM for causing slow speed travel of frame V in direction DVU from this approach position to position P5, and (4) stopping motor VM and frame V at preselected third level FL in position P5.

Sequence No. 35K starts here.

Fast vertical travel by frame V from position P4 to the approach position before position P5 now occurs. When frame H is at preselected bay FB preselected as fifteenth bay by the first command, normally open switch LS–3LB will be closed by trip LST–3L with frame H at position P4. Closing this switch energizes coil VB–C by forming circuit No. 78 from terminals T–1 in FIGS. 21 and 22 through normally open contact 3R–3 closed by energized coil 3R–C, terminals T–3 in FIGS. 22 and 23, closed contact SV–1 of switch SV, normally closed contact 3LR–13 closed when circuit No. 59 energized coil 3LR–UC, normally open switch LS–3LB closed by trip LST–3L, normally closed switch LS–17LA, normally closed switch LS–6A, normally closed contact HFF–6, normally closed contact 3LR–9, normally closed switch LS–8LA, normally open contact 1LR–7 closed by energized coil 1LR–LC, normally open switch LS–16 held closed by trip LST–16 in position PEC, terminals T–10 in FIGS. 23 and 24, normally open switch LS–13B held closed by trip LST–13 in position PEC, terminals T–11 in FIGS. 24 and 23, coil VB–C, and terminals T–4 and T–2 in FIGS. 23, 22 and 21. Energizing coil VB–C: (1) reforms circuit No. 19 by closing contacts VB–2, VB–3 and VB–4 in FIG. 21 to energize and disengage brake VMB in FIG. 21; and (2) energizes coil VFU–C by forming circuit No. 79 from terminals T–1 in FIGS. 21 and 22 through closed contact 1LR–7 along the path followed by circuit No. 78 and then through normally open contact VB–1 closed by energized coil VB–C, normally open contact 3LR–3 closed by energized coil 2LR–LC, normally closed contact VN5R–1, coil VFU–C, normally closed contacts VSD–1 and VSU–1, and terminals T–4 and T–2 in FIGS. 23, 22 and 21. Energizing coil VFU–C reforms circuit No. 22 by closing contacts VFU–2, VFU–3 and VFU–4 in FIG. 21 to energize motor VM for fast vertical upward travel.

Sequence No. 37K starts here.

Counting levels FL approached by frame V by the counter circuit in FIG. 26 until preselected third level FL is approached now occurs. As frame V travels upwardly in direction DVU, trips LST–7 at each level FL closes normally open switch LS–7 momentarily so that the continued travel of frame V in direction DVU creates a pulsing action in switch LS–7 and in circuit No. 80 formed by the closing thereof. Coil VN3R–C is energized by forming circuit No. 80 from terminals T–1 in FIGS. 21 and 25 through normally closed contact 4R–2, closed contact HNS1–1 of switch HNS1, fuse HN3, terminals T–15 in FIGS. 25 and 26, coil VN3R–C in FIG. 26, closed switch LS–7, and terminals T–2 in FIGS. 26 and 21. Coil VNC is then energized by circuit No. 82 formed from A.-C. to D.-C. rectifier VN2 (energized by circuit No. 6), normally open contact VN3R–3 closed by energized coil VN3R–C, normally closed contact VN3R–3, normally closed interrupter contact VN17, coil VNC, and rectifier VN2.

Assembly VNP shown herein has solenoid stepper coil VNC, contact VN3R–3, interrupter contact VN17, holding resistance VN16 and shaft VN18 corresponding respectively to the following elements disclosed in U.S. Patent No. 2,501,950, granted March 28, 1950 to G. H. Leland, and entitled "Commutating Switch Mechanism": coil 24, switch 43, contacts 48 and 49, resistor 84′, and shaft 61 or 75 to operate in basically the same manner as disclosed in that patent, and especially in lines 56–61, column 6 of that patent. Energizing coil VNC by circuit No. 82 rotates shaft VN18 and rotating contact VN15 thereon one step clockwise from stationary contact VNT–0 to VNT–1. Just before the end of the armature advancing stroke of coil VNC, interrupter contact VN17 is opened to break circuit No. 82 but coil VNC is held energized by holding circuit No. 83 formed from rectifier VN2 through normally open contact VN3R–3 closed by energized coil VN3R–C, normally closed contact VN4R–3, holding resistance VN16, coil VNC, and rectifier VN2. Series connected resistance VN12 and condenser VN13 are connected in parallel with interrupter contact VN17 so that when this contact opens, any spark caused by the inductance of coil VNC will be suppressed. Holding circuit No. 83 maintains a slight energization on coil VNC while contact VN17 is open so as to hold the armature of coil VNC at the end of its driving action of shaft VN18 against the pull of return spring 38 in said patent so as to assure only one pulse of coil VNC and only one advance of shaft VN18 each time switch LS–7 closes, and to reduce the voltage on coil VNC to prevent burn out. As frame V continues movement in direction DVU and switch LS–7 clears trip LST–7, switch LS–7 opens to break circuit No. 80 to de-energize coil VN3R–C to open contact VN3R–3 to break circuit No. 83 and to de-energize coil VNC. Return spring 38 in said patent then returns the armature of coil VNC back to its original and retracted position, which action recloses interrupter contact VN17 to prepare assembly VNP for the next counting pulse caused by closing switch LS-7, but leaves contacts VN15 and VNT-1 closed by not retracting shaft VN18 in a counterclockwise return direction. As contact VN15 rotates clockwise away from contact VNT-0, circuit No. 5 is broken to energize pilot light VN1 to indicate that the vertical counter circuit in FIG. 26 is no longer at "0" count.

Sequence Nos. 35K and 37K end here.

As the proper count is reached on the vertical counter circuit in FIG. 26 when frame V reaches the approach position to position P5 (preselected third level FL), coil VN5R-C is energized upon the third closing pulse of switch LS-7 by forming circuit No. 85 from terminals T-1 in FIGS. 21 and 25 through normally closed contact 4R-2, closed contact HNS1-1 of switch HNS1, fuse HN3, terminals T-15 in FIGS. 25 and 26, closed contacts VN15 and VNT-3, closed switch 1VNS-3, normally open contact 4LR-7 closed by energized coil 4LR-LC, coil VN5R-C, and terminals T-2 in FIGS. 26 and 21.

Sequence No. 39K starts here.

Now, as frame V approaches position P5, motor VM has its fast speed upward drive disengaged and its slow speed upward drive engaged. When relay coil VN5R-C is energized, its normally closed contact VN5R-1 in FIG. 23 was opened to break circuit No. 79 to de-energize coil VFU-C to break circuit No. 22 by opening contacts VFU-2, VFU-3 and VFU-4 to de-energize the fast speed upward drive by motor VM. When coil VN5R-C was energized, coil VSU-C was energized by forming circuit No. 86 from terminals T-1 in FIGS. 21 and 22 through closed contact 1LR-7 along the same path followed by circuit No. 78 and then through normally open contact VB-1 closed by energized coil VB-C, normally open contact 2LR-3 closed by energized coil 2LR-LC, normally open contact VN5R-2 closed by energized coil VN5R-C, coil VSU-C, normally closed contacts VFD-1 and VFU-1, and terminals T-4 and T-2 in FIGS. 23, 22 and 21. When coil VSU-C is energized, circuit No. 27 is reformed by closing contacts VSU-2, VSU-3 and VSU-4 in FIG. 21 to energize motor VM to cause slow movement of frame V in direction DVU.

As frame V moves in direction DVU at slow speed, other circuits are formed. Energizing coil VSU-C to close normally open contact VSU-6 reforms circuit No. 30 to energize solenoid coil CL to swing switch LS-8L in FIG. 23 from its solid line to its dot-dash line position to prepare frame V for the stopping action at proper level FL, preselected as third level FL. Coil VSU-C is held energized by holding circuit No. 87 following the same path as circuit No. 86 but through normally open contact VSU-5 in FIG. 23 closed by energized coil VSU-C instead of the parallel path through the normally open contact VN5R-2. Circuit No. 87 holds coil VSU-C energized while the vertical counter in FIG. 26 rotates contact VN15 clockwise back to contact VNT-0 to reset the counter to "0" position.

As frame V moves in direction DVU and switch LS-7 clears trip LST-7 and opens for the last time, circuits Nos. 80 and 83 are broken as before described.

Sequence No. 39K ends here.

The vertical counter circuit in FIG. 26 is now automatically reset to "0" position by rotation of contact VN15 in the clockwise direction until contacts VN15 and VNT-0 super-impose and close. When circuit No. 80 is broken to de-energize coil VN3R-C, coil VN4R-C is energized by forming circuit No. 89 from terminals T-1 in FIGS. 21 and 25 through normally closed contact 4R-2, closed contact HNS1-1 of switch HNS1, fuse HN3, terminals T-15 in FIGS. 25 and 26, closed contacts VN15 and VNT-3, closed switch 1VNS-3, normally open contact 4LR-7 closed by energized coil 4LR-LC, normally closed contact VN3R-1 closed by de-energized coil VN3R-C, coil VN4R-C, and terminals T-2 in FIGS. 26 and 21. Energizing coil VN4R-C holds energized coils VN4R-C and VN5R-C by holding circuit No. 90 formed from terminals T-1 in FIGS. 21 and 25 through normally closed contact 4R-2, closed contact HNS1-1 of switch HNS1, fuse HN3, terminals T-15 in FIGS. 25 and 26, normally open contact VN4R-1 closed by energized coil VN4R-C, normally open contact VNS3-1 of switch VNS3 closed by cam or seal-in wafer VN20 because contacts VN15 and VNT-0 are not closed, either normally closed contact VN3R-1 and coil VN4R-C or coil VN5R-C, and terminals T-2 in FIGS. 26 and 21. Energizing coil VN4R-C energizes coil VNC by circuit No. 92 formed from rectifier VN2 in FIG. 26 through normally closed contact VN3R-2, normally open contact VNS2-1 of cam actuated switch VNS2 closed by cam or homing wafer VN19 because rotating contacts VN15 and VNT-0 are not closed, normally open contact VN4R-2 closed by energized coil VN4R-C, normally closed interrupter contact VN17, coil VNC, and rectifier VN2. Energized coil VN4R-C had opened normally closed contact VN4R-3 to take holding resistance VN16 out of circuit No. 92 so as to drop the voltage on coil VNC to "0" at the end of the advancing stroke of the armature of coil VNC for advancing shaft VN18. Now, closed contact VN4R-2 and switch VNS2 act as master switch 43 in said Patent No. 2,501,950, interrupter contact VN17 is actuated at high speed to open and close circuit No. 92 so coil VNC rapidly rotates contact VN15 clockwise at high speed back to the "0" position (as disclosed in said patent, and especially in lines 44-50, column 6 of said patent) where contacts VN15 and VNT-0 close.

As rotating contact VN15 rotates clockwise away from contact VNT-3, closed contacts VN15 and VNT-3 are opened to break circuit Nos. 85 and 89, but coils VN4R-C and VN5R-C are held energized by holding circuit No. 90.

Sequence No. 41K starts here.

When contacts VN15 and VNT-0 close in "0" position, other circuits are broken and formed. In this "0" position, (1) cam VN20 permits contact VNS3-1 of switch VNS3 to open to break circuit No. 90 to de-energize coils VN4R-C and VN5R-C; (2) cam VN19 permits contact VNS2-1 of switch VNS2 to open to break circuit No. 92 to de-energize coil VNC; and (3) closed contacts VNT-0 andVN15 reform circuit No. 5 to energize pilot light VN1 to indicate that the vertical counter circuit has been reset to "0" position. When coil VN5R-C is de-energized, normally open contact VN5R-2 in FIG. 23 is opened to break circuit No. 86, but coil VSU-C is held energized by holding circuit No. 87.

When frame V reaches position P5, movement of frame V in direction DVU is stopped. Opening switch LS-8LA by trip LST-8L when frame V is in position P5 breaks: (1) circuit No. 78 to de-energize coil VB-C to break circuit No. 19 by opening contacts VB-2, VB-3 and VB-4 to de-energize and engage brake VMB; and (2) circuit No. 87 to de-energize coil VSU-C to break circuit No. 27 by opening contacts VSU-2, VSU-3 and VSU-4 to de-energize and stop motor VM.

As normally open switch LS-8LB is closed by trip LST-8L when frame V is in position P5, circuit No. 31 reforms to hold energized coil CL; and earlier defined Sequence No. 5K occurs to cause now movement of load carrying frame E in direction DEL from positions PEC and P5 to positions PEL and P6 in the same manner as earlier described in Sequence No. 5K for moving empty frame E in direction DEL from positions PEC and P2 to positions PEL and P3.

Sequence No. 23K ended after forming circuit No. 34 to energize motor EM and brake EMB in above mentioned Sequence No. 5K in position P5.

Sequence No. 41K ends here; and sequence No. 42K starts here.

Circuits are formed to prepare frame J to be moved by motor JM in direction DJU from position PJU to PJD to deposit load W on surface F–1 at position P6. As will be recalled, frame J is in position PJU after raising load W off surface F–1 at position P3 and has remained in position PJU throughout its travel. Frame J is prepared to be lowered by energizing coil JD–C by forming circuit No. 93 from terminals T–1 in FIGS. 21 and 22 through normally open contact 3R–3 closed by energized coil 3R–C; terminals T–3 and T5 in FIGS. 22, 23 and 24; normally open contact 2LR–4 closed by energized coil 2LR–LC; normally open switch LS–12LB held closed by trip LST–12L in position PEL; normally closed switch LS–11A; normally closed contact JU–5; coil JD–C; and terminals T–6, T–4 and T–2 in FIGS. 24, 23, 22 and 21. Energizing coil JD–C energizes motor JM and disengages brake JMB by forming circuit No. 94 in FIG. 21 from lines L1, L2 and L3 through normally open contacts JD–2, JD–3 and JD–4, closed by energized coil JD–C, and coils JOL–C1 and JOL–C2 to motor JM and brake JMB.

Energizing coil JD–C forms and breaks circuits. Coil JD–C is held energized by holding circuit No. 96 following the same path as circuit No. 93 but through normally open contact JD–5 closed by energized coil JD–C instead of the parallel path through contact 2LR–4. Energizing coil JD–C energizes coils 1LR–UC by forming circuit No. 97 from terminals T–1 in FIGS. 21 and 22 through normally open contact 3R–3 closed by energized coil 3R–C; terminals T–3 and T–5 in FIGS. 22, 23 and 24; normally open switch LS–10B held closed by frame J in position PJU; normally open contact JD–6 closed by energized coil JD–C; coils 1LR–UC and 2LR–UC; and terminals T–6, T–4 and T–2 in FIGS. 24, 23, 22 and 21. Energizing coil 2LR–UC breaks circuit No. 93 by opening normally open contact 2LR–4 but coil JD–C is held energized by holding circuit No. 96.

Sequence No. 42K ends here.

Energizing coil 1LR–UC breaks other circuits. Energizing coil 1LR–UC breaks: (1) circuit No. 61 energizing coil 3R–C by opening normally open contact 1LR–2, but coil 3R–C is kept energized by holding circuit No. 68 earlier formed; and (2) circuit No. 59 to de-energize coil 3LR–UC by opening normally open contact 1LR–9.

Sequence No. 43K starts here.

Now, motor JM, energized by circuit No. 94, moves frame J in direction DJD from position PJU to PJD to deposit load W on surface F–1 in position P6. As frame J (moving in direction DJD) leaves position PJU, switch LS–10B opens to break circuit No. 97 to de-energize coil 1LR–UC and 2LR–UC. When frame J reaches position PJD, trip LST–11 opens normally closed switch LS–11A to break circuit No. 96 to de-energize coil JD–C to open contacts JD–2, JD–3 and JD–4 to break circuit No. 94 to de-energize and stop motor JM and to engage brake JMB to stop frame J in position PJD.

Sequence No. 43K ends here.

*Two Command Action (Second Command Bay Number Larger Than First Command Bay Number): Storing Load W in Left Panel FAL in Frst Command Position P6 and Retrieving Load W in Right Panel FAR in Second Command Position P9—(3) Empty Carrier K Traveling in Direction DO From First Command Position P6 Through Position P5 to Position P4, and Traveling in Direction DI in Direction DHF From P4 to Position P7*

Sequence No. 44K starts here.

As normally closed contact JD–7 closes after coil JD–C is de-energized, circuit No. 41 reforms to energize coil ER–C and earlier defined Sequence No. 9K occurs to cause now movement of empty frame E in direction DER from positions PEL and P6 to positions PEC and P5 and movement of frame V in direction DVD from position P5 to P4 in the same manner as earlier described in Sequence No. 9K for moving load carrying frame E in direction DER from positions PEL and P3 to positions PEC and P2 and for moving frame V in direction DVD from position P2 and P1.

Sequence No. 45K starts here.

Frame H is moved by motor HM in direction DHR at fast speed. When frame V reaches position P4, trip LST–9 closes normally open switch LS–90A to energize coil HB–C by circuit No. 99 formed from terminals T–1 in FIGS. 21 and 22, normally open contact 3R–3 closed by energized coil 3R–C, terminals T–3 in FIGS. 22 and 23, normally open switch LS–9A held closed by trip LST–9, normally closed contact 1LR–3, normally closed contact 4R–8, coil HB–C, and terminals T–4 and T–2 in FIGS. 23, 22 and 21. Energizing coil HB–C: (1) reforms circuit No. 64 by closing contacts HB–2, HB–3 and HB–4 in FIG. 21 to energize and disengage brake HMB; and (2) energizes coil HFR–C by forming circuit No. 100 from terminal T–1 in FIG. 21 along the path followed by circuit No. 99 through normally closed contact 4R–8 and then through normally open contact HB–1 closed by energized coil HB–C normally closed contact 1LR–5 (normally closed switch LS–4A, coil HFR–C, normally closed contacts HSR–1 and HSF–1, and terminals T–4 and T–2 in FIGS. 23, 22 and 21. Energizing coil HFR–C energizes motor HM for fast travel in direction DHR by forming circuit No. 101 in FIG. 21 from power lines L1, L2 and L3 through normally open contacts HFR–2, HFR–3 and HFR–4, closed by energized coil HFR–C, and coils HFOL–C1 and HFOL–C2 to motor HM.

Sequence Nos. 25K, 31K, 44K, and 45K end here.

As frame H travels in direction DHR, switch LS–18 is closed by trip LST–18 (on the same member F–25 serving as trip LST–3L used to stop frame H in position P4) to set up the second command action and to stop the fast travel of frame H in direction DHR.

As frame H moves in direction DHR and switch LS–18 is closed by trip LST–18, coils 2LR–LC and 1LR–LC are energized to relatch their contacts for the second command by forming: (1) circuit No. 103 from terminals T–1 in FIGS. 21 and 22 through closed contact S2–1 of switch S2, normally open contact 5LR–2 closed by circuit No. 52 having earlier energized coil 5LR–LC normally open switch LS–18 closed by trip LST–18, closed contact S5–1 of switch S5, normally open contact 4LR–1 closed by circuit No. 54 having earlier energized coil 4LR–LC, coil 2LR–LC, and terminals T–2 in FIGS. 22 and 21; and (2) circuit No. 104 from terminals T–1 in FIGS. 21 and 22 through closed contact 4LR–1 along the same path as circuit No. 103 and then through normally open contact 2LR–1 closed by energized coil 2LR–LC, coil 1LR–LC, and terminals T–2 in FIGS. 22 and 21. Note here that energized coil 5LR–LC having closed contact 5LR–2 permits the present two command condition to occur as contrasted with the two command condition having circuit Nos. 149, 150 and 152 wherein this circuit condition does not exist.

Energizing coil 1LR–LC reforms other circuits. Energizing coil 1LR–LC closes: (1) normally open contact 1LR–2 to reform circuit No. 61, and (2) normally open contact 1LR–9 to reform circuit No. 59 to energize coil 3LR–UC. Forming circuit No. 61 does not energize coil 3R–C because coil 3R–C was held energized by circuit No. 68.

Sequence No. 47K starts here.

Travel of frame H in direction DHR is stopped by energization of coil 1LR–LC. Energizing coil 1LR–LC opens normally closed contact 1LR–3 to break: (1) circuit No. 100 to de-energize coil HFR–C to open contacts HFR–2, HFR–3 and HFR–4 to break circuit No. 101 to de-energize and stop motor HM; and (2) circuit No. 99 to de-energize coil HB–C to open contacts HB–2 HB–3 and HB–4 to break circuit No. 64 to de-energize and engage brake HMB.

Sequence No. 47K ends here.

Now, the proper panel of rack F, right panel FAR or left panel FAL, to be serviced in the second command is designated by one of the 3LR coils. Here, position P9 is in right hand panel FAR. Coil 4LR–UC is energized to set up the second command by circuit No. 106 formed from terminals T–1 in FIGS. 21 and 22 through closed contact S5–1 along the path followed by circuit No. 103 and then through closed contact S4–1 of switch S4, normally open contact 1LR–1 closed by energized coil 1LR–LC, coil 4LR–UC, and terminals T–2 in FIGS. 22 and 21. Energizing coil 4LR–UC: (1) opens normally open contact 4LR–2 to break circuit No. 59 to de-energize coil 3LR–UC; and (2) closes normally closed contact 4LR–3 to energize coil 3LR–LC by forming circuit No. 107 from terminals T–1 in FIGS. 21 and 22 through normally open contact 3R–3 closed by energized coil 3R–C, normally open contact 1LR–9 closed by coil 1LR–LC, normally closed contact 4R–5, normally closed contact 4LR–3 closed by energized coil 4LR–UC, closed contact 2S–R of switch 2S, coil 3LR–LC, and terminals T–2 in FIGS. 22 and 21.

Energizing coil 4LR–UC also de-energizes coils 1LR–LC and 2LR–LC by opening normally open contact 4LR–1 to break respectively circuits Nos. 104 and 103.

Energizing coil 4LR–UC breaks horizontal counter circuits. Energizing coil 4LR–UC opens normally open contact 4LR–5 in FIG. 25 to break circuit No. 72 to de-energize coil HN1R–C to open normally open contact HN1R–1 to break circuit No. 73 to de-energize coil HN3R–C.

Sequence No. 49K starts here.

Empty frame H is moved in direction DHF from the switch LS–18 closing position contiguous to position p4 toward position p7 in the following sequential steps: (1) energizing motor HM for causing fast travel of frame H in direction DHF to an approach position before position p7, (2) counting bays FB approached by frame H on counter and drive unit HNA in FIG. 25 until preselected second command twenty-second bay FB is approached with frame H in the approach position, (3) energizing motor HM for causing slow speed travel of frame H in direction DHF from this approach position to position p7, and (4) stopping motor HM and frame H at preselected second command twenty-second bay FB in position p7.

Sequence No. 51K starts here.

Motor HM is energized for moving frame H at fast speed in direction DHF. After energized coil 3LR–LC closes normally open contact 3LR–5, coil HB–C is energized by circuit No. 108 formed from terminals T–1 in FIGS. 21 and 22 through normally open contact 3R–3 closed by energized coil 3R–C, terminals T–3 in FIGS. 22 and 23, normally open switch LS–9A held closed by trip LST–9 while frame V is in position p4 or p7, normally open contact 3LR–5 closed by energized coil 3LR–LC, normally closed switch LS–3RA, normally closed contact 4R–8, coil HB–C, and terminals T–4 and T–2 in FIGS. 23, 22 and 21. Energizing coil HB–C: (1) disengages brake HMB by reforming circuit No. 64 by closing contacts HB–2, HB–3 and HB–4 to energize and disengage brake HMB; and (2) energizes coil HFF–C by forming circuit No. 110 from terminal T–1 in FIG. 21 through normally closed contact 4R–8 along the path followed by circuit No. 108 and then through normally open contact HB–1 closed by energized coil HB–C, normally open contact 1LR–4 closed by energized coil 1LR–LC, normally closed contact HN3R–1, coil HFF–C, normally closed contacts HSR–1 and HFS–1, and terminals T–4 and T–2 in FIGS. 23, 22 and 21. When coil HFF–C is energized, motor HM is energized for causing fast travel of frame H by reforming circuit No. 66 by closing contacts HFF–2, HFF–3 and HFF–4.

Since travel of frame H in direction DHF causes switch LS–3RA to be opened at each bay FB by trip LST–3R to break circuits Nos. 108 and 110, holding circuits Nos. 69 and 71 are reformed by closing normally open contact HFF–1 by energized coil HFF–C to hold coils HB–C and HFF–C energized after each opening of switch LS–3RA breaks circuits Nos. 108 and 110 respectively.

Sequence No. 51K ends here.

As frame H travels in direction DHF, switch LS–18 opens to break circuit No. 106 to de-energize coil 4LR–UC.

When frame H has traveled in direction DHF far enough to approach second command preselected twenty-second bay FB, the correct count has been reached and new circuits are formed because contacts HN8A and HNT–2 are closed and contacts HN9A and HNT–20 are closed in the approach position. Then, coil HN2R–C is energized by circuit No. 111 formed from terminals T–1 in FIGS. 21 and 25 through normally closed contact 4R–2, closed contact HNS1–1 of switch HNS1, fuse HN3, closed contacts HN8A and HNT–2, closed switch 2HNS–2, coil HN2R–C, closed switch 2HNS–20, closed contacts HNT–20 and HN9A, and terminals T–2 in FIGS. 25 and 21. Energizing coil HN2R–C energizes coil 7R–C by circuit No. 113 formed from terminals T–1 in FIGS. 21 and 25 through normally closed contact 4R–2, closed contact HNS1–1 of switch HNS1, fuse HN3, normally open contact HN2R–1 closed by energized coil HN2R–C, coil 7R–C, and terminals T–2 in FIGS. 25 and 21. Energizing coil 7R–C energizes: (1) coils 6R–C and 5LR–UC by circuit No. 112 formed from terminals T–1 in FIGS. 21 and 22 through normally closed contact S2–1 of switch S2, normally open contact 7R–1 closed by energized coil 7R–C, coils 6R–C and 5LR–UC, and terminals T–2 in FIGS. 22 and 21; and (2) coil HN1R–C by circuit No. 114 formed from terminals T–2 in FIGS. 21 and 25 through normally closed contact 4R–2, closed contact HNS1–1 of switch HNS1, fuse HN3, normally closed contact 4LR–4 closed by forming circuit No. 106 to energize coil 4LR–UC, normally open contact 7R–2 closed by energized coil 7R–C, coil HN1R–C, normally open contact 7R–3 closed by energized coil 7R–C, normally closed contact 4LR–6, and terminals T–2 in FIGS. 25 and 21. Energizing coil 5LR–UC now opens normally open contact 5LR–2 to prevent reforming circuit Nos. 103 and 104 later during travel of frame H in direction DHR back to position P1 as switch LS–18 is closed.

Sequence No. 53K starts here.

As frame H reaches the approach position before position P7 when circuit No. 111 is formed, motor HM has its fast speed forward drive disengaged. Energizing coil HN1R–C closes normally open contact HN1R–1 to reform circuit No. 73 to energize coil HN3R–C to open normally closed contact HN3R–1 in FIG. 23 to break circuits Nos. 110 and 71 to de-energize coil HFF–C so as: (1) to break circuit No. 66 by opening contacts HFF–2, HFF–3 and HFF–4 to de-energize the fast speed drive by motor HM; and (2) to break holding circuits Nos. 69 and 71 by opening normally open contact HFF–1 so that these holding circuits cannot be reformed.

Motor HM is energized for slow speed forward travel. Energizing coil HN3R–C by reforming circuit No. 73 energizes coil HSF–C by forming circuit No. 115 from terminal T–1 in FIG. 21 along the same path as circuit No. 108 through normally closed contact 4R–8 and then through normally open contact HB–1 held closed by energized coil HB–C, normally open contact 1LR–4 closed by energized coil 1LR–LC, normally open contact HN3R–2 closed by energized coil HN3R–C, coil HSF–C, normally closed contacts HFR–1 and HFF–5, and terminals T–4 and T–2 in FIGS. 23, 22 and 21. When coil HSF–C is energized, motor HM is energized for causing forward slow travel of frame H by reforming circuit No. 76 by closing contacts HSF–2, HSF–3 and HSF–4.

Eequence No. 55K starts here.

When frame H reaches position P7, motor HM and frame H are stopped at preselected second command twenty-second bay FB in position P7. As frame H reaches position P7, normally closed switch LS–3RA is opened by trip LST–3R to break (1) circuit No. 108 to de-energize coil HB–C to open contacts HB–2, HB–3 and HB–4 to break circuit No. 64 to de-energize and re-engage brake HMB, and (2) circuit No. 115 to de-energize coil HSF–C to open contacts HSF–2, HSF–3 and HSF–4 to break circuit No. 76 to de-energize and stop motor HM to stop frame H in position P7. Energized coil HB–C opens normally open contact HB–1 to prevent reforming circuit No. 115.

*Two Command Action (Second Command Bay Number Larger Than First Command Bay Number): Storing Load W in Left Panel FAL in First Command Position P6 and Retrieving Load W in Right Panel FAR in Second Command Position P9—(4) Empty Carrier K Traveling in Direction DI in Direction DVU From Position P7 to Position P8 and in Direction DER to Pick Up Load W at Second Command Position P9*

Empty frame V is moved by motor VM in direction DVU from position P7 to P8 in the following sequential steps: (1) energizing motor VM for fast speed travel of frame V in direction DVU from position P7 to an approach position before position P8, (2) counting levels FL approached by frame V in the vertical counter circuit in FIG. 26 until preselected fifth level FL is reached with frame V in this approach position, (3) energizing motor VM for causing slow speed travel of frame V in direction DVU from this approach position to position P8, and (4) stopping motor VM and frame V at preselected fifth level FL in position P8.

Fast travel by frame V from position P4 to the approach position before position P5 now occurs. When frame H is at second command preselected twenty-second bay, normally open switch LS–3RB will be closed by trip LS–3R with frame H at position P7 to energize coil VB–C by forming circuit No. 117 from terminals T–1 in FIGS. 21 and 22 through normally open contact 3R–3 closed by energized coil 3R–C, terminals T–3 in FIGS. 22 and 23, closed contact SV–1 of switch SV, normally open contact 3LR–14 closed when circuit No. 107 energized coil 3LR–LC, normally open switch LS–3RB closed by trip LST–3R, normally closed switch LS–17RA, normally closed switch LS–6A, normally closed contact HFF–6, normally open contact 3LR–10 closed by energizing coil 3LR–LC by forming circuit No. 107, normally closed switch LS–8RA, normally open contact 1LR–7 closed by energized coil 1LR–LC, normally open switch LS–16 held closed by trip LST–16 in position PEC, terminals T–10 in FIGS. 23 and 24, normally open switch LS–13B held closed by trip LST–13 in position PEC, terminals T–11 in FIGS. 24 and 23, coil VB–C, and terminals T–4 and T–2 in FIGS. 23, 22 and 21. Energizing coil VB–C: (1) reforms circuit No. 19 by closing contacts VB–2, VB–3 and VB–4 to energize and disengage brake VMB; and (2) energizes coil VFU–C by forming circuit No. 118 from terminals T–1 in FIGS. 21 and 22 through closed contact 1LR–7 along the same path followed by circuit No. 117 and then through normally open contact VB–1 closed by energized coil VB–C, normally open contact 2LR–3 closed by energized coil 2LR–LC, normally closed contact VN5R–1, coil VFU–C, normally closed contacts VSD–1 and VSU–1, and terminals T–4 and T–2 in FIGS. 23, 22 and 21. Energizing coil VFU–C reforms circuit No. 22 by closing contacts VFU–2, VFU–3 and VFU–4 to energize motor VM for fast vertical upward travel.

Counting levels FL approached by frame V by the counter circuit in FIG. 26 until preselected fifth level FL is approached now occurs. As frame V travels upwardly in direction DVU and trip LST–7 closes at each level FL normally open switch LS–7, circuit No. 80 is reformed to energize coil VN3R–C and earlier defined Sequence No. 37K occurs to cause now movement of empty frame V in direction DVU from position P7 to P8 in the same manner as earlier described in Sequence 37K for moving load carrying frame V in direction DVU from position P4 to P5.

Sequence No. 53K ends here.

As the proper count is reached when frame V reaches the approach position to position P8 (preselected fifth level FL), coil VN5R–C is energized upon the fifth closing pulse of switch LS–7 by forming circuit No. 120 from terminals T–1 in FIGS. 21 and 25 through normally closed contact 4R–2, closed contact HNS1–1 of switch HNS1, fuse HN3, terminals T–15 in FIGS. 25 and 26, closed contacts VN15 and VNT–5, closed switch 2VNS–5, normally closed contact 4LR–8, coil VN5R–C, and terminals T–2 in FIGS. 26 and 21.

Sequence No. 57K starts here.

Now, as frame V approaches position P8, motor VM has its fast speed upward drive disengaged and its slow speed upward drive engaged. Energizing coil VN5R–C: (1) opens normally closed contact VN5-R-1 to break circuit No. 118 to de-energize coil VFU–C to break circuit No. 22 by opening contacts VFU–2, VFU–3 and VFU–4 to de-energize fast speed upward drive by motor VM; (2) energizes coil VSU–C by forming circuit No. 121 from terminal T–1 in FIG. 21 through closed contact 1LR–7 along the same path followed by circuit No. 117 and then through normally open contact VB–1 closed by energized coil VB–C, normally open contact 2LR–3, closed by energized coil 2LR–LC, normally open contact VN5R–2 closed by energized coil VN5R–C, coil VSU–C, normally closed contacts VFD–1 and VFU–1, and terminals T–4 and T–2 in FIGS. 23, 22 and 21. When coil VSU–C is energized, circuit No. 27 is reformed by closing contacts VSU–2, VSU–3 and VSU–4 to energize motor VM to cause slow movement of frame V in direction DVU.

As frame V moves in direction DVU at slow speed, other circuits are formed. When coil VSU–C is energized, limit switch LS–8R is swung by solenoid coil CR from its solid line to its dot-dash line position to prepare frame V for the stopping action. Coil CR is energized by circuit No. 124 formed from terminals T–1 in FIGS. 21 and 22 through normally open contact 3R–3 closed by energized coil 3R–C, terminals T–3 in FIGS. 22 and 23, normally open contact VSU–6 closed by energized coil VSU–C, normally open contact 3LR–8 closed when coil 3LR–LC was energized by forming circuit No. 107, coil CR, and terminals T–4 and T–2 in FIGS. 23, 22 and 21. Coil VSU–C is held energized by holding circuit No. 122 following the same path as circuit No. 121 but through normally open contact VSU–5 closed by energized coil VSU–C instead of the parallel path through the normally open contact VN5R–2. This holding circuit No. 122 holds coil VSU–C energized while the vertical counter circuit in FIG. 26 rotates contact VN15 clockwise back to contact VNT–0 to reset counter to "0" position.

As frame V moves in direction DVU and switch LS–7 clears trip LST–7 and opens for the last time, circuits Nos. 80 and 83 are broken as earlier described.

Sequence No. 57K ends here.

The vertical counter circuit is now automatically reset to "0" position by rotation of rotating contact VN15 in the clockwise direction until contacts VN15 and VNT–0 superimpose and close. When circuit No. 80 is broken to de-energize coil VN3R–C, coil VN4–R–C is energized by forming circuit No. 125 from terminals T–1 in FIGS. 21 and 25 through normally closed contact 4R–2, closed contact HNS1–1 of switch HNS1, fuse HN3, terminals T–15 in FIGS. 25 and 26, closed contacts VN15 and VNT–5, closed switch 2VNS–5, normally closed contact 4LR–8, normally closed contact VN3R–1 closed by de-energized coil VN3R–C, coil VN4R–C, and terminals T–2 in FIGS. 26 and 21. Energizing coil VN4R–C reforms: (1) holding circuit No. 90 to hold energized coils VN4R–C and VN5R–C by closing normally open contact VN4R–1 by energized coil VN4R–C; and (2) circuit No. 92 by closing normally open contact VN4R–2 to energize coil VNC to reset the vertical counter circuit to "0" position by rapidly rotating contact VN15 in the clockwise direction until contacts VN15 and VNT–0 close in the same manner as earlier described.

As rotating contact VN15 rotates clockwise away from contact VNT–5, closed contacts VN15 and VNT–5 are opened to break circuits Nos. 120 and 125, but coils VN4R–C and VN5R–C are held energized by holding circuit No. 90.

Sequence No. 59K starts here.

When contacts VN15 and VNT–0 close in "0" position, other circuits are broken and formed. In this "0" position: (1) cam VM20 permits contact VNS3–1 of switch VNS3 to open to break circuit No. 90 to de-energize coils VN4R–C and VN5R–C; (2) cam VN19 permits contact VNS2–1 of switch VNS2 to open to break circuit No. 92 to de-energize coil VNC; and (3) closed contacts VNT–0 and VN15 reform circuit No. 5 to energize pilot light VN1 to indicate that the vertical counter circuit has been reset to "0" position. When coil VN5R–C is de-energized, normally open contact VN5R–2 is opened to break circuit No. 121, but coil VSU–C is held energized by holding circuit No. 122.

When frame V reaches position P8, movement of frame V in direction DVU is stopped. Opening switch LS–8RA by trip LST–8R when frame V is in position P8 breaks: (1) circuit No. 117 to de-energize coil VB–C to break circuit No. 19 by opening contacts VB–2, VB–3 and VB–4 to de-energize and engage brake VMB; and (2) breaks circuit No. 122 to de-energize coil VSU–C to break circuit No. 27 by opening contacts VSU–2, VSU–3 and VSU–4 to de-energize and stop motor VM.

Although de-energizing coil VSU–C opens normally closed contact VSU–6 to break circuit No. 124, coil CR is held energized to maintain switch LS–8R in the dot-dash line position by circuit No. 127 previously formed (after circuit No. 124 was formed and before coil VSU–C was de-energized) from terminals T–1 in FIGS. 21 and 22 through normally open contact 3R–3 closed by energized coil 3R–C, terminals T–3 in FIGS. 22 and 23, normally open switch LS–8RB closed by trip LST–8R when frame V is in position P8, normally open contact 3LR–8 closed when circuit No. 107 energized coil 3LR–LC, coil CR, and terminals T–4 and T–2 in FIGS. 23, 22 and 21.

Frame E is moved by motor EM in direction DER from positions PEC and P8 to positions PER and P9. Closing switch LS–8RB starts movement of frame E by energizing coil ER–C by forming circuit No. 128 from terminals T–1 in FIGS. 21 and 22 through normally open contact 3R–3 closed by energized coil 3R–C, terminals T–3 in FIGS. 22 and 23, normally open switch LS–8RB closed by trip LST–8R, terminals T–9 in FIGS. 23 and 24, normally closed contact SE–1 of switch SE, normally closed contacts VSU–7 and VFU–5, normally closed switches LS–12LA and LS–12RA, normally open contact 1LR–8 closed by energized coil 1LR–LC, normally open contact 3LR–2 previously closed when circuit No. 107 formed to energize coil 3LR–LC, coil ER–C, and terminals T–6, T–4 and T–2, in FIGS. 24, 23, 22 and 21. Energizing coil ER–C reforms circuit No. 43 by closing contacts ER–2, ER–3 and ER–4 to energize and disengage brake EMB and to energize motor EM to move frame E in direction DER under load W at position P9.

Sequence No. 49K ends here.

Frame E is stopped in positions PER and P9. When frame E reaches positions PER and P9, normally closed switch LS–12RA is opened by trip LST–12R to break circuit No. 128 to de-energize coil ER–C to open contacts ER–2, ER–3 and ER–4 to break circuit No. 43 to stop motor EM and to engage brake EMB to stop frame E in positions PER and P9.

Sequence No. 59K ends here; and Sequence No. 61K starts here.

Circuits are formed to prepare empty frame J to be moved by motor JM in direction DJU from position PJD to PJU to pick up load W from surface F–1 at position P9. Frame J is prepared to be raised into load contact by energizing coil JU–C by forming circuit No. 129 from terminals T–1 in FIGS. 21 and 22 through normally open contact 3R–3 closed by energized coil 3R–C; terminals T–3 and terminals T–5 in FIGS. 22, 23 and 24; normally open contact 2LR–4 closed by energized coil 2LR–LC; normally open switch LS–12RB held closed by trip LST–12R in position PER; normally closed switch LS–10A; normally closed contact JD–1; coil JU–C; and terminals T–6, T–4 and T–2 in FIGS. 24, 23, 22 and 21. Energizing coil JU–C reforms circuit No. 37 by closing contacts JU–2, JU–3 and JU–4 to energize motor JM and disengage brake JMB.

Energizing coil JU–C forms and breaks circuits. Coil JU–C is held energized by holding circuit No. 131 following the same path as circuit No. 129 but through normally open contact JU–1 closed by energized coil JU–C instead of the parallel path through contact 2LR–4. Energizing coil JU–C closes normally open contact JU–6 to reform circuit No. 40 to energize coils 1LR–UC and 2LR–UC. Energizing coil 2LR–UC breaks circuit No. 129 by opening contact 2LR–4 but coil JU–C is held energized by holding circuit No. 131.

Sequence No. 61K ends here.

Energizing coil 1LR–UC opens normally open contact 1LR–9 to break circuit No. 107 to de-energize coil 3LR–LC.

Sequence No. 62K starts here.

Energizing coil 1LR–UC breaks circuit No. 61 used for energizing coil 3R–C by opening normally open contact 1LR–2, but coil 3R–C is kept energized by holding circuit No. 68 earlier formed.

Now, motor JM, energized by circuit No. 37, moves frame J in direction DJU from position PJD to PJU to lift load W off surface F–1 onto frame J. As frame J (moving in direction DJU) leaves position PJD, switch LS–11B opens to break circuit No. 40 to de-energize coils 1LR–UC and 2LR–UC. When frame J reaches position PJU, trip LST–10 opens normally closed switch LS–10A to break circuit No. 131 to de-energize coil JU–C to open contacts JU–2, JU–3 and JU–4 to break circuit No. 37 to de-energize and stop motor JM and to engage brake JMB to stop frame J in position PJU.

Sequence No. 62K ends here.

*Two Command Action (Second Command Bay Number Larger than First Command Bay Number): Storing Load W in Left Panel FAL in First Command Position P6 and Retrieving Load W in Right Panel FAR in Second Command Position P9—(5) Carrier K Traveling in Direction DO Carrying Load W in Direction DEL From Second Command Position P9 to Position P8, in Direction DVD From Position P8 to Position P7, and in Direction DHR From Position P7 to Position P1*

Energizing coils 1LR–UC and 2LR–UC return all their contacts to the illustrated, unactuated and normal position to withdraw by frame J load W from frame F at position P9 back onto frame V at position P8, lower frame V to position P7, and move frame H to position P1.

Sequence Nos. 63K and 65K start here.

Frame E with load W is moved by motor EM in direction DEL from positions PER and P9 to positions PEC and P8. Frame E, and load W carried thereby, are moved out of frame F onto frame V in position P8 by forming circuit No. 132 from terminals T–1 in FIGS. 21 and 22 through normally open contact 3R–3 closed by energized coil 3R–C; terminals T–3 in FIGS. 22 and 23; normally open switch LS–8RB closed by trip LST–8R with frame V in position P8; terminals T–9 in FIGS. 23 and 24; normally closed contact SE–1 of switch SE; normally closed contacts VSU–7 and VFU–5; normally closed switch LS–13A closed since frame E is in position PER; normally closed contacts JD–7, JU–7 (now closed after breaking circuit No. 131 to de-energize coil JU–C), and 1LR–10; normally open contact 3LR–4 closed by forming circuit No. 107 to energize coil 3LR–LC; coil EL–C; and terminals T–6, T–4 and T–2 in FIGS. 24, 23, 22 and 21. Energizing coil EL–C energizes motor EM and disengages brake EMB to move frame E and load W out of frame F by reforming circuit No. 34 by closing contacts EL–2, EL–3, and EL–4. When frame E approaches positions PEC and P8, switch LS–13A is opened by trip LST–13 to break circuit No. 132 to de-energize coil EL–C to break circuit No. 34 by opening contacts EL–2, EL–3 and EL–4 to de-energize and engage brake EMB and to de-energize and stop motor EM.

Sequence No. 63K ends here.

Frame V is moved by motor VM in direction DVD at fast speed and then at slow speed from position P8 to P7, and then is stopped at position P7. As frame E reaches position PEC and normally open switches LS–13B and LS–16 close, circuit No. 44 reforms to energize coil VB–C and earlier defined Sequence No. 13K occurs to cause now movement of frame V in direction DVD from position P8 toward P7 in the same manner as earlier described in Sequence No. 13K from position P2 toward P1. As frame V moves in direction DVD, switch LS–8R moves clear of trip LST–8R so that its switch LS-8RB opens to break circuit No. 127 to de-energize coil CR and swing limit switch LS–8R from the dot-dash line to the solid line position in FIG. 23. As frame V approaches position P7 and normally closed switch LS–14A is opened by trip LST–14, circuit No. 45 is broken to de-energize coil VFD–C and earlier defined Sequence No. 17K occurs to cause now continued movement of frame V in direction DVD toward position P7, and stopping of frame V in position P7, in the same manner as earlier described in Sequence No. 17K for position P1 instead of P7.

Frame H is moved by motor HM in direction DHR at fast speed from position P7 toward position P1. As frame V reaches position P7, trip LST–9 closes normally open switch LS–9A to reform circuit No. 99 to energize coil HB–C and earlier defined Sequence No. 45K occurs to cause now movement of load carrying frame H in direction DHR away from position P7 in the same manner as earlier described in Sesquence No. 45K for moving empty frame H away from position P4.

Sequence Nos. 55K and 65K end here.

After frame H leaves position P7 by traveling in direction DHR, some circuits are broken. Then, contact HN8A in FIG. 25 rotates clockwise off contact HNT–2 as frame H leaves second command twenty-second bag FB to break circuit No. 111 to de-energize coil HN2R–C to open normally open contact HN2R–1 to de-energizing coil 7R–C by breaking circuit No. 113. De-energizing coil 7R–C opens: (1) contact 7R–1 to de-energize coils 6R–C and 5LR–UC by breaking circuit No. 112, and (2) normally open contacts 7R–2 and 7R–3 to de-energize coil HN1R–C by breaking circuit No. 114 to open normally open contact HN1R–1 to break circuit No. 73 to de-energize coil HN3R–C.

Sequence No. 67K starts here.

As frame H reaches the approach position before position P1, motor HM has its fast speed drive disengaged and its slow speed horizontal drive engaged. As frame H traveling in direction DHR reaches this approach position, normally closed switch LS–4A is opened by trip LST–4 (and is held open by this trip) to break circuit No. 100 to de-energize coil HFR–C to break circuit No. 101 by opening contacts HFR–2, HFR–3 and HFR–4 to de-energize the fast speed travel by motor HM. This action also closes normally open switch LS–4B by trip LST–4 to energize coil HSR–C by forming circuit No. 134 from terminals T–1 in FIGS. 21 and 22 through normally open contact 3R–3 closed by energized coil 3R–C, terminals T–3 in FIGS. 22 and 23, normally open switch LS–9A held closed by trip LST–9, normally closed contact 1LR–3, normally closed contact 4R–8, normally open contact HB–1 closed by coil HB–C energized by reformed circuit No. 99, normally closed contact 1LR–5, normally open switch LS–4B held closed by trip LST–4, coil HSR–C, normally closed contacts HFR–1 and HFF–5, and terminals T–4 and T–2 in FIGS. 23, 22 and 21. Energizing coil HSR–C forms circuit No. 135 from lines L1, L2, and L3 through normally open contacts HSR–2, HSR–3 and HSR–4, closed by energized coil HSR–C, and coils HSOL–C1 and HSOL–C2 to motor HM to move frame H at slow speed in direction DHR back to position P1.

As frame H reaches position P1, motor HM and frame H are stopped in position P1. Normally closed switch LS–5A is opened by trip LST–5 (and is held open by this trip) in position P1 to break circuit No. 68 to de-energize coil 3R–C and open normally open contact 3R–3 to break: (1) circuit No. 99 to de-energize coil HB–C to open contacts HB–2, HB–3 and HB–4 to break circuit No. 64 to de-energize and engage brake HMB; (2) circuit No. 134 to de-energize coil HSR–C to open contacts HSR–2, HSR–3 and HSR–4 to break circuit No. 135 to de-energize motor HM and stop travel movement of frame H in position P1.

Sequence No. 71K starts here.

If the vertical counter circuit in FIG. 26 has not been properly reset to the "0" position with contacts VNT–0 and VN15 superimposed and closed, this counter may be now manually reset by pressing switch VNS4. Pressing switch VNS4 forms circuit No. 136 from terminals T–1 in FIGS. 21 and 25 through normally closed contact 4R–2, closed contact HNS1–1 of switch HNS1, fuse HN3, terminals T–15 in FIGS. 25 and 26, closed contact VNS4–1 of switch VNS4, through coil VN5R–C and through normally closed contact VN3R–1, and coil VN4R–C, and terminals T–2 in FIG. 26 and 21. Energizing coil VN4R–C closes normally open contact VN4R–2 to reform circuit No. 92 to energize coil VNC to rapidly rotate contact VN15 in the clockwise direction until contacts VN15 and VNT–0 close with the vertical counter circuit reset to "0" position wherein cam VN19 permits contact VNS2–1 of switch VNS2 to open to break circuit No. 92 at this "0" position to reset the vertical counter in basically the same manner as earlier described. Releasing switch VNS4 breaks circuit No. 136 to de-energize coils VN4R–C and VN5R–C. Closing contacts VN15 and VNT–0 in the "0" position reform circuit No. 5, if it had been broken before, to re-energize pilot light VN1 to indicate that the vertical counter circuit is in the "0" position.

Sequence No. 71K ends here.

Now, all frames of carrier K are in position P1; and carrier K and all circuits are in the earlier described Condition No. 1C.

Sequence No. 67K ends here.

*Two Command Action (Second Command Bay Number Smaller Than First Command Bay Number): Storing Load W in Right Panel FAR in First Command Position P9* and *Retrieving Load W in Left Panel FAL in Second Command Position P6—(1) Carrier K Traveling in Direction DI Carrying Load W in Direction DHF From Position P1 to Position P7, and (2) Carrier K Traveling in Direction DI Carrying Load W in Direction DI carrying Load W in Direction DVU From Position P8 and in Direction DER to Deposit Load W at First Command Position P9*

This distinction in the description hereinafter is that second command bay number at position P6 is smaller than first command bay number at position P9.

The operator desires to store load W by the first command in preselected twenty-second bay FB at preselected fifth level FL, to pick up load W by a second command in preselected fifteenth bay FB at preselected third level FL, and to return last load W to position P1. Then, the operator would at position P1: (1) select and turn on the two command action by closing contact S5-1 of switch S5; (2) push button 1HNS-20 and and the button 1HNS-2 of first command push key switch 1HNS to select twenty-second bay FB; (3) push button IVNS-5 of first command push key switch 1VNS to select fifth level FL; (4) push button 2HNS-10 and button 2HNS-5 of second command push key switch 2HNS to select fifteen bay FB; (5) push button 2VNS-3 of the second command push key switch 2VNS to select third level FL.

The operator must also determine whether he wants to service right or left panel FAR or FAL. Here, the operator closes start right contact 1S-R of first command switch 1S to store load W in position P9 by the first command in right panel FAR and closes start left contact 2S-L of second command switch 2S to pick up load W in position P6 by a second command in left panel FAL.

Sequence Nos. 73K and 75K start here.

After the operator is sure that pilot light HN1 and VN1 are lit, he pushes switch S4 and earlier defined Sequence No. 19K occurs to energize coils 1LR-LC, 2LR-LC, 4LR-LC, 5LR-LC, and 3R-C.

Energizing coil 3R-C energizes coil 3LR-LC to indicate that the first command will service right panel FAR by forming circuit No. 138 from terminals T-1 in FIGS. 21 and 22 through normally open contact 3R-3 closed by energized coil 3R-C, normally open contact 1LR-9 closed by energized coil 1LR-LC, normally closed contact 4R-5, normally open contact 4LR-2 closed by energized coil 4LR-LC, closed contact 1S-R of switch 1S, coil 3LR-LC, and terminals T-2 in FIGS. 22 and 21.

Additional circuits are formed or broken now as earlier defined Sequence No. 27K now occurs.

Frame H with load W is moved by motor HM in direction DHF from position P1 to P7 in the following sequential steps: (1) energizing motor HM for fast speed travel of frame H in direction DHF from position P1 to an approach position before position P7, (2) counting bays FB approached by frame H on counter and drive unit HNA until preselected second command twenty-second bay FB is approached with frame H in the approach position, (3) energizing motor HM for causing slow speed travel of frame H in direction DHF from this approach position to position P7, and (4) stopping motor HM and frame H at preselected first command twenty-second bay FB in position P7.

Fast travel by frame H in direction DHF from position P1 toward the approach position before position P7 now occurs. After energized coils 3R-C and 3LR-LC close normally open contacts 3R-3 and 3LR-5 respectively, coil HB-C is energized by reforming circuit No. 108 and earlier defined Sequence No. 51K occurs to cause now movement of load carrying frame H in direction DHF from position P1 toward position P7 in the same manner as earlier defined in Sequence No. 51K for moving empty frame H in direction DHF from the switch LS-18 closing position contiguous to position P4 toward position P7.

As frame H travels in direction DHF, another circuit is formed. Switch LS-5A returns to its normally closed position since frame H is no longer in position P1. Then, coil 3R-C is held energized by reforming holding circuit No. 68 after closing switch LS-5A.

Sequence No. 73K ends here.

As frame H travels in direction DHF through second command position P4, the second command is set up to occur later during return travel in direction DHR. In position P4, contacts HN9A and HNT-10 and contacts HN8A and HNT-5 close at the second command count to energize coil HN2R-C by forming circuit No. 139 from terminals T-1 in FIGS. 21 and 25 through normally closed contact 4R-2, closed contact HNS1-1 of switch HNS1, fuse HN3, closed contacts HN8A and HNT-5, closed switch 2HNS-5, coil HN2R-C, closed switch 2HNS-10, closed contacts HNT-10 and HN9A, and terminals T-2 in FIGS. 25 and 21.

Energizing coil HN2R-C closes normally closed contact HN2R-1 to reform circuit No. 113 to energize coil 7R-C to close normally open contact 7R-1 to reform circuit No. 112 to energize coil 6R-C and coil 5LR-UC. Energizing coil 5LR-UC in this manner opens normally open contact 5LR-2 to prevent energizing coils 1LR-LC and 2LR-LC to relatch their contacts by reforming circuits Nos. 103 and 104 when switch LS-18 is actuated as frame H moves in direction DHF away from position P7 after completion of the first command, but permits energizing coils 1LR-LC and 2LR-LC at the proper time at second command position P4.

As frame H continues to move in direction DHF past second command position P4, circuits are broken. Opening closed contacts HNT-5 and HN8A by continued counter-clockwise rotation of contact HN8A breaks circuit No. 139 to de-energize coil HN2R-C to open normally open contact HN2R-1 to de-energize coil 7R-C to open normally open contact 7R-1 to break circuit No. 112 to de-energize coils 6R-C and 5LR-UC.

Sequence No. 77K starts here.

When frame H has traveled in direction DHF far enough to approach first command selected twenty-second bay FB, the correct count has been reached and new circuits are formed because contacts HN8A and HNT-2 and contacts HN9A and HNT-20 are closed in this approach position. Then, coil HN1R-C is energized by forming circuit No. 142 from terminals T-1 in FIGS. 21 and 25 through normally closed contact 4R-2, closed contact HNS-1 of switch HNS1, fuse HN3, closed contact HN8A and HNT-2, closed switch 1HNS-2, normally open contact 4LR-5 closed by coil 4LR-LC energized by circuit No. 54, coil HN1R-C, closed switch 1HNS-20 of switch 1HNS, closed contacts HNT-20 and HN9A, and terminals T-2 in FIGS. 25 and 21.

The following action sequentially occurs: (1) as loaded frame H approaches in direction DHF preselected twenty-second bay position P7, motor HM has its fast speed forward drive disengaged and its slow speed forward drive engaged; (2) when frame H reaches position P4, its slow speed forward drive disengaged and motor HM is stopped; (3) motor VM has its fast speed upward drive engaged to move frame V in direction DVU; and (4) vertical counting action occurs by closing and opening switch LS-7 as frame V moves toward position P8. As energized coil HN1R-C closes normally open contact HN1R-1, circuit No. 73 is reformed to energize coil HN3R-C and earlier defined Sequence No. 53K occurs to cause now the action earlier described in this paragraph in the same manner as earlier described in Sequence No. 53K for moving empty frame H in direction DHF to position P7 and frame V in direction DVU from position P7 toward position P8 (now, normally open contact 3LR-14 in FIG. 23 was closed by circuit No. 138 energizing coil 3LR-LC, which coil was energized by circuit No. 107 in Sequence No. 53K).

As the proper count is reached on the vertical counter circuit in FIG. 26 when frame V reaches the approach position to position P8 (preselected fifth level FL), coil VN5R-C is energized upon the fifth closing pulse of switch LS-7 to form circuit No. 143 from terminals T-1 in FIGS. 21 and 25 through normally closed contact 4R-2, closed contact HNS1-1 of switch HNS1, fuse HN3, terminals T-15 in FIGS. 25 and 26, closed contacts VN15 and VNT-5, closed switch 1VNS-5, normally open contact 4LR-7 closed by coil 4LR-LC when energized by forming circuit No. 54, coil VN5R-C, and terminals T-2 in FIGS. 26 and 21.

As load carrying frame V approaches position P8, the following action sequentially occurs: (1) motor VM has its fast speed upward drive disengaged and its slow speed upward drive engaged, and (2) coil CR is energized to swing out switch LS–8R in FIG. 23 to its dot-dash line position. Energizing coil VN5R–C opens normally closed contact VN5R–1 to break circuit No. 118 to de-energize coil VFU–C and earlier defined Sequence No. 57K occurs to cause now the action earlier described in this paragraph in the same manner as earlier described in Sequence No. 57K for moving empty frame V in the same manner.

The vertical counter circuit in FIG. 26 is now automatically reset to "0" position by rotation of contact VN15 in the clockwise direction until contacts VN15 and VNT–0 superimpose and close. When circuit No. 80 is broken to de-energize coil VN3R–C, coil VN4R–C is energized by forming circuit No. 145 from terminals T–1 in FIGS. 21 and 25 through normally closed contact 4R–2, closed contact HNS1–1 of switch HNS1, fuse HN3, terminals T–15 in FIGS. 25 and 26, closed contacts VN15 and VNT–5, closed switch 1VNS–5, normally open contact 4LR–7 closed when circuit No. 54 formed to energize coil 4LR–LC, normally closed contact VN3R–1 closed because coil VN3R–C is de-energized, coil VN4R–C, and terminals T–2 in FIGS. 26 and 21. Energizing coil VN4R–C reforms holding circuit No. 90 to hold energized coils VN4R–C and VN5R–C by closing normally open contact VN4R–1. Energizing coil VN4R–C energizes coil VNC by reforming circuit No. 92 by closing normally open contact VN4R–2 to energize coil VNC to reset the vertical counter circuit in FIG. 26 to "0" position by rapidly rotating contact VN15 in the clockwise direction until contacts VN15 and VNT–0 close in the same manner as earlier described.

As rotating contact VN15 is rotated clockwise away from contact VNT–5, closed contacts VN15 and VNT–5 are opened to break circuits Nos. 143 and 145, but coils VN4R–C and VN5R–C are held energized by holding circuit No. 90.

Now, the following action sequentially occurs: (1) contact VN15 rotates clockwise back to the "0" position so that other circuits are broken and formed; (2) frame V (carrying load W) moves in direction DVU and is stopped in position P8; and (3) frame E is moved by motor EM in direction DER from positions PEC and P8 to positions PER and P9. When contact VN15 reaches the "0" position, cam VN20 opens contact VNS3–1 of switch VNS3 to break circuit No. 90 to de-energize coils VN4R–C and VN5R–C, and earlier defined Sequence No. 59K to cause now the aforementioned action in the same manner as earlier described in Sequence No. 59K for moving empty frames V and E (now, normally open contact 3LR–2 was closed by circuit No. 138 energizing coil 3LR–LC, which coil was energized by circuit No. 107 in Sequence No. 53K).

Sequence Nos. 75K and 77K end here.

Circuits are formed to prepare frame J to be moved by motor JM in direction DJU from position PJU to PJD to deposit load W on surface F–1 at position P9. As will be recalled, frame J is in position PJU after raising load W off surface F–1 at position P9 in the earlier described second command and has remained in position PJU throughout its travel. Frame J is prepared to be lowered by energizing coil JD–C by forming circuit No. 146 from terminals T–1 in FIGS. 21 and 22 through normally open contact 3R–3 closed by energized coil 3R–C; terminals T–3 and T–5 in FIGS. 22, 23 and 24; normally open contact 2LR–4 closed by energized coil 2LR–LC; normally open switch LS–12RB held closed by trip LST–12R in position PER; normally closed switch LS–11A; normally closed contact JU–5; coil JD–C; and terminals T–6, T–4 and T–2 in FIGS. 24, 23, 22 and 21. Energizing coil JD–C reforms circuit No. 94 by closing contacts JD–2, JD–3 and JD–4 to energize motor JM and disengage brake JMB.

Energizing coil JD–C forms and breaks circuits. Coil JD–C is held energized by holding circuit No. 148 following the same path as circuit No. 146 but through normally open contact JD–5 closed by energized coil JD–C instead of the parallel path through contact 2LR–4. Energizing coil JD–C closes normally open contact JD–6 to energize coils 1LR–UC and 2LR–UC by reforming circuit No. 97. Energizing coil 2LR–UC breaks circuit No. 146 by opening normally open contact 2LR–4 but coil JD–C is held energized by holding circuit No. 148.

Energizing coil 1LR–UC breaks other circuits. Energizing coil 1LR–UC breaks: (1) circuit No. 61 energizing coil 3R–C by opening normally open contact 1LR–2, but coil 3R–C is kept energized by holding circuit No. 68 earlier formed; and (2) circuit No. 138 to de-energize coil 3LR–LC by opening normally open contact 1LR–9.

Now, motor JM, energized by circuit No. 94, moves frame J in direction DJD from position PJU to PJD to deposit load W on surface F–1 in position P8. As frame J (moving in direction DJD) leaves position PJU, switch LS–10B opens to break circuit No. 97 to de-energize coils 1LR–UC and 2LR–UC. When frame J reaches position PJD, trip LST–11 opens normally closed switch LS–11A to break circuit No. 148 to de-energize coil JD–C to open contacts JD–2, JD–3 and JD–4 to break circuit No. 94 to de-energize and stop motor JM and to engage brake JMB to stop frame J in position PJD.

*Two Command Action (Second Command Bay Number Smaller Than First Command Bay Number): Storing Load W in Right Panel FAR in First Command Position P9 and Retrieving Load W in Left Panel FAL in Second Command Position P6—(3) Empty Carrier K Traveling in Direction DO From First Command Position P9 Through Position P8 and Position P7 to Position P4, (4) Empty Carrier K Traveling in Direction DI in Direction DVU From Position P4 to Position P5 and in Direction DEL to Pick Up Load W at Second Command Position P6, and (5) Carrier K Traveling in Direction DO Carrying Load W in Direction DER From Second Command Position P6 to Position P5, in Direction DVD From Position P5 to Position P4, and in Direction DHR From Position P4 to Position P1*

Sequence No. 79K starts here.

Now, the following action sequentially occurs: (1) empty frame E is moved by motor EM in direction DEL from positions PER and P9 to positions PEC and P8; (2) frame V is moved by motor VM in direction DVD at fast speed and then at slow speed from position P8 to position P7, and then is stopped at position P7; and (3) frame H is moved by motor HM in direction DHR at fast speed from position P7 toward position P4. De-energizing coil JD–C closes normally closed contact JD–7 to reform circuit No. 132 to energize coil EL–C and earlier Sequence No. 65K occurs to cause now the action earlier described in this paragraph in the same manner as earlier described in Sequence No. 65K for loaded frames E, V and H (now, normally open contact 3LR–4 is closed when circuit No. 138 formed to energize coil 3LR–LC, which coil was energized by circuit No. 107 is Sequence No. 65K).

After frame H leaves position P7 while traveling in direction DHR, some circuits are broken. Then, contact HN8A rotates clockwise off contact HNT–2 as frame H leaves first command twenty-second bay FB to break circuit No. 142 to de-energize coil HN1R–C. De-energizing coil HN1R–C opens normally open contact HN1R–1 to break circuit No. 73 to de-energize coil HN3R–C.

Sequence No. 79K ends here.

As frame H travels in direction DHR, bays FB are counted on counter and drive unit HNA until preselected second command fifteenth bay FB is reached and the correct count has been obtained to form circuits. Re-closing in position P4 contacts HN8A and HNT–5 and contacts HN9A and HNT–10 reforms circuit No. 139 to re-energize coil HN2R–C to close normally open contact HN2R–1 to reform circuit No. 113 to energize coil 7R–C. Energizing coil 7R–C closes normally open contact 7R–1 to reform circuit No. 112 to energize coils 6R–C and 5LR–UC.

As frame H continues to travel in direction DHR, switch LS–18 is closed contiguous to position P4 by trip LST–18 to set up the second command action and stop travel of frame H in direction DHR.

As frame H moves in direction DHR and switch LS–18 is closed by trip LST–18 contiguous to position P4, coils 2LR–LC and 1LR–LC are energized to relatch their contacts for the second command by: (1) circuit No. 149 formed from terminals T–1 in FIGS. 21 and 22 through closed contact S2–1 of switch S2, normally open contact 6R–1 closed by circuit No. 112 having earlier energized coil 6R–C, normally open switch LS–18 closed by trip LST–18, closed contact S5–1 of switch S5, normally open contact 4LR–1 closed by circuit No. 54 having earlier energized coil 4LR–LC, coil 2LR–LC, and terminals T–2 in FIGS. 22 and 21; and (2) circuit No. 150 formed from terminals T–1 in FIG. 21 through closed contact 4LR–1 along the same path as circuit No. 149 and then through normally open contact 2LR–1 closed by energized coil 2LR–LC, coil 1LR–LC, and terminals T–2 in FIGS. 22 and 21.

Energizing coil 1LR–LC reforms other circuits. Energizing coil 1LR–LC closes normally open contact 1LR–2 to reform circuit No. 61 and closes normally open contact 1LR–9 to reform circuit No. 138 to energize coil 3LR–LC. Forming circuit No. 61 does not energize coil 3R–C because coil 3R–C was held energized by circuit No. 68.

Travel of frame H in direction DHR is stopped by energizing coil 1LR–LC to open normally closed contact 1LR–3 to break circuit No. 100 to de-energize coil HFR–C and earlier defined Sequence No. 47K occurs.

Now, the proper panel, FAR or FAL, to be serviced in the second command is designated by one of the 3LR coils. Here, position P6 is in left panel FAL. Coil 4LR–UC is energized by circuit No. 152 formed from terminals T–1 in FIG. 21 through closed contact S5–1 along the path followed by circuit No. 149 and then through closed contact S4–1 of switch S4, normally open contact 1LR–1 closed by energized coil 1LR–LC, coil 4LR–UC, and terminals T–2 in FIGS. 22 and 21. Energizing coil 4LR–UC: (1) opens normally open contact 4LR–2 to break circuit No. 138 to de-energize coil 3LR–LC; and (2) closes normally closed contact 4LR—3 to energize coil 3LR–UC by forming circuit No. 153 from terminals T–1 in FIGS. 21 and 22 through normally closed contact 3R–3 closed by energized coil 3R–C, normally open contact 1LR–9 closed by coil 1LR–LC, normally closed contact 4R–5, normally closed contact 4LR–3 closed by energized coil 4LR–UC, closed contact 2S–L of switch 2S, coil 3LR–UC, and terminals T–2 in FIGS. 22 and 21.

Energizing coil 4LR–UC breaks and forms other circuits. Energizing coil 4LR–UC: (1) de-energizes coils 1LR–LC and 2LR–LC by opening normally open contact 4LR–1 to break respectively circuits Nos. 150 and 149, and (2) closes normally closed contacts 4LR–4 and 4LR–6 to reform circuit No. 114 to energize coil HN1R–C to close normally open contact HN1R–1 to reform circuit No. 73 to energize coil HN3R–C.

Sequence No. 83K starts here.

Slow travel of frame H in direction DHF from the switch LS–18 closing position contiguous to position P4 now occurs, and frame H is stopped in position P4. Energizing coil 3LR–UC by forming circuit No. 153 closes normally open contact 3LR–7 to reform circuit No. 62 to energize coil HB–C to disengage break HMB by reforming circuit No. 64 by closing contacts HB–2, HB–3 and HB–4 to energize and disengage brake HMB. Since coil HN3R–C is energized by reformed circuit No. 73; normally open contact HN3R–2 is closed to energize coil HSF–C by reforming circuit No. 75 and earlier defined Sequence No. 33K occurs to cause now movement of empty frame H in direction DHF to position P4 in the same manner as earlier described in Sequence No. 33K for moving load carrying frame H in direction DHF to position P4.

During this movement of frame H in direction DHF to position P4, switch LS–18 opens to break circuit No. 152 to de-energize coil 4LR–UC.

Now, the following action sequentially occurs: (1) fast travel by empty frame V from position P4 to the approach position before position P5, and (2) counting levels FL approached by frame V on the counter circuit in FIG. 26 until preselected third level FL is approached. When frame H is at preselected second command fifteenth bay FB, normally closed switch LS–3LB is closed by trip LST–3L with frame H in position P4 to reform circuit No. 78 to energize coil VB–C and earlier defined Sequence No. 35K occurs to cause now the action earlier described in this paragraph in the same manner as earlier described in Sequence No. 35K for moving load carrying frame V in the same manner (now, normally open contact 3LR–13 is closed by circuit No. 153 energizing coil 3LR–UC, which coil was energized by circuit No. 59 in Sequence No. 35K).

As the proper count is reached on the vertical counter circuit in FIG. 26 when frame V reaches the approach position to position P5 (preselected third level FL), coil VN5R–C is energized upon the third closing pulse of switch LS–7 by circuit No. 155 formed from terminals T–1 in FIGS. 21 and 25 through normally closed contact 4R–2, closed contact HNS1–1 of switch HNS1, fuse HN3, terminals T–15 in FIGS. 25 and 26, closed contacts VN15 and VNT–3, closed switch 2VNS–3, normally closed contact 4LR–8, coil VN5R–C, and terminals T–2 in FIGS. 26 and 21.

Now, the following action sequentially occurs: (1) as empty frame V approaches position P5 by travel in direction DVU, motor VM has sequentially its fast speed upward drive disengaged and its slow speed upward drive engaged: (2) coil CL is energized to swing out switch LS–8L; and (3) other circuits are formed and broken. Energizing coil VN5R–C opens normally closed contact VN5R–1 to break circuit No. 79 to de-energize coil VFU–C and earlier defined Sequence No. 39K occurs to cause now the action earlier described in this paragraph in the same manner as earlier described in Sequence No. 39K for moving load carrying frame V in the same manner.

The vertical counter circuit in FIG. 26 is now automatically reset to "0" position by rotation of contact VN15 clockwise until contacts VN15 and VNT–0 close. When circuit No. 80 is broken to de-energize coil VN3R–C, coil VN4R–C is energized by forming circuit No. 156 from terminals T–1 in FIGS. 21 and 25 through normally closed contact 4R–2, closed contact HNS1–1 of switch HNS1, fuse HN3, terminals T–15 in FIGS. 25 and 26, closed contacts VN15 and VNT–3, closed switch 2VNS–3, normally closed contact 4LR–8 closed when circuit No. 152 formed to energize coil 4LR–UC, normally closed contact VN3R–1 closed because coil VN3R–C is de-energized, coil VN4R–C, and terminals T–2 in FIGS. 26 and 21. Energizing coil VN4R–C reforms holding circuit No. 90 to hold energized coils VN4R–C and VN5R–C by closing normally open contact VN4R–1. Energizing coil VN4R–C energizes coil VNC by reforming circuit No. 92 by closing normally open contact VN4R–2 to energize coil VNC to reset the vertical counter circuit in FIG. 26 to "0" position by rapidly rotating contact VN15 in the clockwise direction until contacts VN15 and VNT–0 close in the same manner as earlier described.

As rotating contact VN15 is rotated clockwise away from contact VNT–3, closed contacts VN15 and VNT–3 are opened to break circuits Nos. 155 and 156, but coils VN4R–C and VN5R–C are held energized by holding circuit No. 90.

Now, the following action sequentially occurs: (1) circuits are formed and broken when contact VN15 rotates clockwise back to the "0" position, (2) empty frame V is stopped in position P5, (3) a holding circuit is reformed to hold solenoid coil CL energized, and (4) frame E is moved in direction DEL from positions PEC and P5 to positions PEL and P6. When contact VN15 reaches "0" position, contact VNS3–1 opens to break circuit No. 90 to de-energize coils VN4R–C and VN5R–C, and earlier defined Sequence No. 41K occurs to cause now the action earlier described in this paragraph in the same manner as earlier described in Sequence No. 41K for load carrying carrier K.

Sequence No. 83K ends here.

Circuits are formed and broken to prepare empty frame J to be moved by motor JM in direction DJU from position PJD to PJU to pick up load W from surface F–1 at position P6. As frame E reaches positions PEL and P6 to hold closed by trip LST–12L normally open switch LS–12LB, circuit No. 36 is reformed to energize coil JU–C and earlier defined Sequence No. 6K occurs to prepare now frame J for movement in position P6 in the same manner as earlier described in Sequence No. 6K in position P3.

Energizing coil 1LR–UC breaks circuits. Energizing coil 1LR–UC breaks: (1) circuit No. 153 to de-energize coil 3LR–UC by opening normally open contact 1LR–9; and (2) circuit No. 61 energizing coil 3R–C by opening normally open contact 1LR–2, but coil 3R–C is kept energized by holding circuit No. 68 earlier formed.

Motor JM now moves frame J in direction DJU from position PJD to PJU to lift load W off surface F–1 onto frame J. As frame J leaves position PJD, normally open switch LS–11B opens to break circuit No. 40 to de-energize coils 1LR–UC and 2LR–UC and earlier defined Sequence No. 7K occurs to cause movement of frame J in position P6 in the same manner as earlier described in Sequence No. 7K in position P3.

The following action occurs sequentially: (1) frame E with load W is moved in direction DER from positions PEL and P6 to positions PEC and P5, (2) frame V is moved in direction DVD from positions P5 to P4, and (3) frame H is moved in direction DHR at fast speed toward position P1. As contact JU–7 closes after coil JU–C is de-energized by breaking circuit No. 38, circuit No. 41 reforms to energize coil ER–C and earlier defined Sequence No. 44K occurs to cause now the action earlier described in this paragraph.

As frame H travels in direction DHR after leaving position P4, circuits are broken. As frame H moves in direction DHR, contact HN8A is rotated clockwise off contact HNT–5 to break circuit No. 139 to de-energize coil HN2R–C to open normally open contact HN2R–1 to break circuit No. 113 to de-energize coil 7R–C to: (1) open normally open contacts 7R–2 and 7R–3 to break circuit No. 114 to de-energize coil HN1R–C to open normally open contact HN1R–1 to break circuit No. 73 to de-energize coil HN3R–C, and (2) open normally open contact 7R–1 to break circuit No. 112 to de-energize coils 6R–C and 5LR–UC.

Now, the following action sequentially occurs: (1) as frame H traveling in direction DHR reaches the approach position before position P1, motor HM has its fast speed drive disengaged and its slow speed horizontal drive engaged; (2) as frame H reaches position P1, motor HM and frame H are stopped in position P1; (3) the vertical counter circuit in FIG. 26 may be reset to the "0" position manually if this condition does not now exist; and (4) carrier K and the circuits are in earlier described Condition No. 1C. As frame H traveling in direction DHR horizontally reaches this approach position, normally closed switch LS–4A is opened by trip LST–4 to break circuit No. 100 to de-energize coil HFR–C to stop fast reverse travel of frame H, and earlier defined Sequence No. 67K occurs to cause now the action earlier described in this paragraph.

*Two Command Action (Second Command Bay Number the Same as First Command Bay Number): Storing Load W in Left Panel FAL in First Command Position P6 and Retrieving Load W in Right Panel FAR in Second Command Position P11—(1) Carrier K Traveling in Direction DI Carrying Load W in Direction DHF From Position P1 to Position P4, (2) Carrier K Traveling in Direction DI Carrying Load W in Direction DVU From Position P4 to Position P5 and in Direction DEL to Deposit Load W at First Command Position P6, (3) Empty Carrier K Traveling in Direction DO From First Command Position P6 Through Position P5 to Position P4, (4) Empty Carrier K Traveling in Direction DI in Direction DVU From Position P4 to Position P10 and in Direction DER to Pick Up Load W at Second Command Position P11, and (5) Carrier K Traveling in Direction DO Carrying Load W in Direction DEL From Second Command Position P11 to Position P10, in Direction DVD From Position P10 to Position P4, and in Direction DHR from Position P4 to Position P1.*

The distinction in the description hereinafter is that the second command bay number position P11 is the same as the first command bay number position 6.

The operator desires to store load W by the first command in preselected fifteenth bay FB at preselected third level FL, to pick up a Load W by the second command in preselected fifteeth bay FB at preselected fifth level FL, and to return last load W to position P1. Then, the operator would at position P1: (1) select and turn on the two command action by closing contacts S5–1 of switch S5; (2) push button 1HNS–10 and button 1HNS–5 of first command switch 1HNS to select the fifteenth bay; (3) push button 1VNS–3 of first command switch 1VNS to select third level FL; (4) push button 2HNS–15 and button 2HNS–5 of second command switch 2HNS to select fifteenth bay FB; and (5) push button 2VNS–5 of second command switch 2VNS to select fifth level FL.

The operator must also determine whether he wants to service panel FOR or FAL. Here, operator closes start left contacts 1S–L of first command switch 1S to store load W in position P6 by the first command in left panel FAL and closes start right contact 2S–R of second command switch 2S to pick up load W in position P11 by a second command in the right panel FAR.

Sequence No. 85K starts here.

The following action sequentially occurs: (1) coils 1LR–LC, 2LR–LC, 4LR–LC, 5LR–LC, 3LR–UC, and 3R–C are energized; and (2) frame H with load W travels at fast speed in direction DHF from position P1 toward P4. After the operator is sure that pilot lights HN1 and VN1 are lit, he pushes switch S4 and earlier defined Sequence No. 21K occurs to perform the aforementioned action in the same manner as earlier described in Sequence No. 21K.

When frame H has traveled in direction DHF far enough to approach common first and second command selected fifteeth bay FB, the correct count has been reached for both commands and new circuits are formed for both commands.

Circuits are formed for the second command. When contacts HN8A and HNT–5 and contacts HN9A and HNT–10 are closed in this approach position, coil HN2R–2 is energized by reforming circuit No. 139 to close normally open contact HN2R–1 to reform circuit No. 113 to energize coil 7R–C to energize coils 6R–C and 5LR–UC by closing normally open contact 7R–1 to reform circuit No. 112.

The following action sequentially occurs: (1) the first command horizontal count circuits are formed; (2) motor HM has sequentially its fast speed forward drive disengaged, its slow speed forward drive engaged, and its slow speed forward drive disengaged, and is stopped when frame H carrying load W reaches position P4; (3) frame V is moved by motor VM in direction DVU at fast speed and then at slow speed from position P4 to position P5, and then is stopped at position P5 at preselected first command third level FL with the vertical counter circuit in FIG. 26 being reset to "0" position and switch LS–8L being swung outwardly to its dot-dash line position; (4) frame E is moved in direction DEL from positions PEC and P5 to positions PEL and P6 (Sequence No. 85K ends here); (5) frame J is moved in direction DJD from position PJU to PJD to deposit load W on surface F–1 at position P6; (6) empty frame E is moved in direction DER from position PEL and P6 to positions PEC and P5; (7) frame V is moved from positions P5 to P4 in direction DVD; and (8) frame H is moved by motor HM in direction DHR at fast speed. As contacts HN8A and HNT–5 and contacts HN9A and HNT–10 are closed in this approach position, circuit No. 72 is reformed to energize coil HN1R–C and earlier defined Sequence No. 31K occurs to cause now the aforementioned action in the same manner as earlier described in Sequence No. 31K.

As frame H moves in direction DHR and switch LS–18 is closed by trip LST–18 contiguous to position P4, coils 2LR–LC and 1LR–LC are energized to relatch their contacts for the second command by reforming: (1) circuit No. 149 by closing switch LS–18 to energize coil 2LR–LC, and (2) circuit No. 150 to energize coil 1LR–LC by closing normally open contact 2LR–1 by energized coil 2LR–LC.

Energizing coil 1LR–LC reforms other circuits. Energizing coil 1LR–LC closes normally open contact 1LR–2 to reform circuit No. 61 and closes normally open contact 1LR–9 to reform circuit No. 59 to energize coil 3LR–UC. Reforming circuit No. 61 does not energize coil 3R–C because coil 3R–C was held energized by circuit No. 68.

Travel of frame H in direction DHR is stopped by energizing coil 1LR–LC. Energizing coil 1LR–LC opens normally closed contact 1LR–3 to break circuit No. 100 to de-energize coil HFR–C and earlier defined Sequence No. 47K occurs.

The proper panel, FAR or FAL, to be serviced in the second command is designated by one of the 3LR coils. Here, position P11 is in right hand panel FAR. Coil 4LR–UC is energized by reforming circuit No. 152 by closing normally open contact 1LR–1 by energized coil 1LR–LC. Energizing coil 4LR–UC: (1) opens normally open contact 4LR–2 to break circuit No. 59 to de-energize coil 3LR–UC; and (2) closes normally closed contact 4LR–3 to energize coil 3LR–LC by reforming circuit No. 107.

Energizing coil 4LR–UC breaks and forms other circuits. Energizing coil 4LR–UC: (1) de-energizes coils 1LR–LC and 2LR–LC by opening normally open contact 4LR–1 to break respectively circuits Nos. 149 and 150, and (2) closes normally closed contacts 4LR–4 and 4LR–6 to reform circuit No. 114 to continue energizing coil HN1R–C, still energized by earlier formed circuit No. 72.

Sequence No. 87K starts here.

Slow travel of frame H in direction DHF from the switch LS–18 closing position contiguous to position P4 to position P4 now occurs. After coil 3LR–LC has been energized by reformed circuit No. 107 to close normally open contact 3LR–5, coil HB–C is energized by reforming circuit No. 108: (1) to energize and disengage brake HMB by closing contacts HB–2, HB–3 and HB–4 to reform circuit No. 64; and (2) to energize coil HSF–C by closing normally open contact HB–1 to reform circuit No. 115 to energize motor HM for causing forward slow travel of frame H by reforming circuit No. 76 by closing contacts HSF–2, HSF–3 and HSF–4.

As frame H moves in direction DHF toward position P4, normally open switch LS–18 opens to break circuit No. 152 to de-energize coil 4LR–UC.

The following action sequentially occurs: (1) when empty frame H reaches position P4, motor HM and frame H are stopped at preselected second command fifteenth bay position P4; (2) frame V is moved by motor VM in direction DVU at fast speed and then at slow speed from position P4 to position P10 at preselected fifth level FL with solenoid coil CR energized to swing switch LS–8R to its dot-dash line position in FIG. 23 and with the vertical counter circuit in FIG. 26 being automatically reset to "0" position; (3) frame E is moved by motor EM in direction DER from positions PEC and P10 to positions PER and P11 (Sequence No. 87K ends here); (4) empty frame J is moved by motor JM in direction DJU from position PJD to PJU to pick up load W from surface F–1 at position P11; (5) frame E with load W is moved by motor EM in direction DEL from positions PER and P11 to positions PEC and P10; (6) frame V is moved by motor VM in direction DVD at fast speed and then at slow speed from position P10 to P4, and then is stopped at position P4; and (7) frame H is moved by motor HM in direction DHR at fast speed from position P4 toward position P1. As frame H, moving in direction DHF, reaches preselected fifteenth bay FB in position P4 for the second command, normally closed switch LS–3RA is opened by trip LST–3R to break circuit No. 108 to de-energize coil HB–C, and earlier defined Sequence No. 55K occurs to cause now the aforementioned action between positions P4, P10 and P11 in the same manner as earlier described in Sequence No. 55K between positions P7, P8 and P9 respectively.

After frame H leaves position P4 traveling in direction DHR, some circuits are broken. Then, contact HN8A is rotated clockwise off contact HNT–5 to break: (1) circuit No. 139 to de-energize coil HN2R–C, and (2) circuit No. 72 but coil HN1R–C is held energized by circuit No. 114. De-energizing coil HN2R–C opens normally open contact HN2R–1 to break circuit No. 113 to de-energize coil 7R–C to open: (1) normally open contacts 7R–2 and 7R–3 to de-energize coil HN1R–C by breaking circuit No. 114 to open normally open contact HN1R–1 to de-energize coil HN3R–C by breaking circuit No. 73, and (2) normally open contact 7R–1 to de-energize coils 6R–C and 5LR–UC by breaking circuit No. 112.

The following action sequentially occurs: (1) as frame H traveling in direction DHR reaches the approach position before position P1, motor HM has its fast speed drive disengaged and its slow speed drive engaged at this approach position before position P1; (2) as frame H reaches position P1, motor HM and frame H are stopped in position P1; (3) the vertical counter circuit in FIG. 26 may be reset to the "0" position manually if this condition does not now exist; and (4) carrier K and the circuits are in earlier described condition No. 1C. As frame H traveling in direction DHR horizontally reaches this approach position, normally closed switch LS–4A is opened by trip LST–4 to break circuit No. 100 to de-energize coil HFR–C to stop fast travel of frame H, and earlier defined Sequence No. 67K occurs to cause now the aforementioned action in the same manner as earlier described in Sequence No. 67K.

Now, all frames of carrier K are in position P1; and carrier K and all circuits are in the earlier described Condition No. 1C.

*Single Command: (1) Storing Load W in Left Panel FAL in Position P6—Carrier K Traveling in Direction DI Carrying Load W in Direction DHF From Position P1 to Position P4, in Direction DVU From Position P4 to Position P5, in Direction DEL to Deposit Load W at Position P6, and Returning as Empty Carrier K in Direction DO From Position P6 Through Positions P5 and P4 to Position P1; and (2) Retrieving Load W in Right Panel FAR in Position P9—Empty Carrier K Traveling in Direction DI in Direction DHF From Position P1 to Position P7, in Direction DVU From Position P7 to Position P8, and in Direction DER to Position P9, and Returning Carrier K Carrying Load W in Direction DO From Position P9 Through Positions P8 and P7 to Position P1*

The single command action to position P6 will be first described.

The operator selects single command action and prevents two command action by swinging two command switch S5 clockwise to close contact S5–2 to open contact S5–1.

Since the operator again desires to store load W in fifteenth bay FB and third level FL of position P5, he pushes switches 1HNS–10, 1HNS–5 and 1VNS–3 to indicate respectively this bay and level, as he did before.

Since the operator desires to store load W in left panel FAL in position P6, the operator closes start left contact 1S–L of first command switch 1S.

Sequence No. 89K starts here.

The following action sequentially occurs: (1) after the operator is sure that pilot lights HN1 and VN1 are lit, he pushes switch S4 to energize coils 1LR–LC, 2LR–LC, 4LR–LC, 5LR–LC, 3R–C, and 3LR–UC; (2) frame H with load W is moved by motor HM in direction DHF at fast speed and then at slow speed from position P1 to P4 and then is stopped in position P4 at preselected single command fifteenth bay FB; (3) frame V is moved by motor VM in direction DVU at fast speed and then at slow speed from position P4 to P5, and then is stopped in preselected third level FL position P5 with solenoid coil CL in FIG. 23 energized to hold switch LS–8L outwardly in its dot-dash line position and with the vertical counter circuit in FIG. 26 automatically reset to "0" position; (4) frame E is moved in direction DEL from positions PEC and P5 toward positions PEL and P6 (Sequence No. 89K ends here) and is stopped in position P6; (5) frame J is moved by motor JM in direction DJD from position PJU to PJD to deposit load W on surface F–1 at position P6; (6) empty frame E is moved in direction DER from positions PEL and P6 to positions PEC and P5; (7) frame V is moved in direction DVD from position P5 to P4; and (8) frame H is moved by motor HM in direction DHR at fast speed toward position P1. When switch S4 is pushed to close contact S4–3, coil 5LR–LC is energized by reforming circuit No. 52, and earlier defined Sequence No. 25K occurs to cause now the aforementioned action in the same manner as earlier described in Sequence No. 25K.

After frame H travels in direction DHR away from position P4 toward position P1, circuits are broken. As contact HN8A rotates clockwise away from contact HNT–5, circuit No. 72 is broken to de-energize coil HN1R–C to open normally open contact HN1R–1 to break circuit No. 73 to de-energize coil HN3R–C.

The following action sequentially occurs: (1) as empty frame H traveling in direction DHR reaches the approach position before position P1, motor HM has its fast speed drive disengaged and its slow speed horizontal drive engaged at this approach position before position P1; (2) as frame H reaches position P1, motor HM and frame H are stopped in position P1; (3) the vertical counter circuit in FIG. 26 may be reset to the "0" position manually if this condition does not now exist, and (4) carrier K and all circuits are in earlier described Condition No. 1C. As frame H traveling in direction DHR reaches this approach position, normally closed switch LS–4A is opened by trip LST–4 to break circuit No. 100 to de-energize coil HFR–C to stop fast reverse travel of frame H, and earlier defined Sequence No. 67K occurs to cause now the aforementioned action in the same manner as earlier described in Sequence No. 67K for moving load carrying frame H.

The single command action to position P9 will now be described.

The operator selects single command action and prevents two command action by swinging two command switch S5 clockwise to close contact S5–2 to open contact S5–1.

Since the operator again desires to retrieve load W in twenty-second bay FB and fifth level FL of position P9, he pushes switches 1HNS–20, 1HNS–2 and 1VNS–5 to indicate respectively this bay and level, as he did before.

Since the operator desires to retrieve load W from right panel FAR in position P9, the operator closes the start right contact 1S–R of first command switch 1S.

Sequence No. 91K starts here.

The following action sequentially occurs: (1) after the operator is sure that pilot lights HN1 and VN1 are lit, he pushes switch S4 to energize coils 1LR–LC, 2LR–LC, 4LR–LC, 5LR–LC, 3R–C, and 3LR–LC; (2) empty frame H is moved by motor HM in direction DHF at fast speed and then at slow speed from position P1 to P7 and then is stopped at position P7 at preselected single command twenty-second bay FB; (3) frame V is moved by motor VM in direction DVU at fast speed and then at slow speed from position P7 to position P8, and then is stopped at position P8 at preselected fifth level FL with the vertical counter circuit in FIG. 26 automatically reset to "0" position and with solenoid coil CR in FIG. 23 energized to hold switch LS–8R outward in its dot-dash line position; (4) frame E is moved in direction DER from positions PEC and P8 toward right positions PER and P9 (Sequence No. 91K ends here) and is stopped in position P9; (5) frame J is moved by motor JM in direction DJU from position PJD to PJU to pick up load W from surface F–1 at position P9; (6) frame E with load W is moved in direction DEL from positions PER and P9 to positions PEC and P8; (7) frame V is moved in direction DVD from position P8 to P7; and (8) frame H is moved by motor HM in direction DHR at fast speed toward position P1. This action takes place in six sequential steps. First, when switch S4 is pushed to close contact S4–3, coil 5LR–LC is energized by reforming circuit No. 52, and earlier defined Sequence No. 73K occurs to cause now the aforementioned action in the same manner as earlier described in Sequence No. 73K for moving loaded carrier K. Second, when frame H (traveling in direction DHF) reaches the approach position to position P7, the proper horizontal count has been reached to close contacts HN8A and HNT–2 and contacts HN9A and HNT–20 to reform circuit No. 142 to energize coil HN1R–C, and earlier defined Sequence No. 77K occurs to cause now the aforementioned action in the same manner as earlier described in Sequence No. 77K for moving loaded carrier K. Third, when frame E reaches positions PER and P9, normally open switch LS–12RB closes to reform circuit No. 129 to energize coil JU–C, and earlier defined Sequence No. 61K occurs to prepare now empty frame J to be moved by motor JM in direction DJU in the same manner as earlier described in Sequence No. 61K. Fourth, energizing coil 1LR–UC by reforming circuit No. 40 opens normally open contact 1LR–9 to break circuit No. 138 to de-energize coil 3LR–LC. Fifth, energizing coil 1LR–UC also breaks circuit No. 61 by opening normally open contact 1LR–2, and earlier defined Sequence No. 62K occurs to move frame J in direction DJU to position PJU to lift load W off surface F–1 at position P9 onto frame J as earlier described in Sequence No. 62K. Sixth, when frame J reaches position PJU and coil JU–C is de-energized, normally closed contact JU–7 is closed to reform circuit No. 132 to energize coil EL–C, and Sequence No. 79K occurs to cause now movement of frames E, V and H from position P9 through positions P8 and P7 in the same manner as earlier described in Sequence No. 79K for moving empty carrier K.

The following action sequentially occurs: (1) as frame H traveling in direction DHR reaches the approach position before position P1, motor HM has its fast speed drive disengaged and its slow speed drive engaged at this approach position before position P1; (2) as frame H reaches position P1, motor HM and frame H are stopped in position P1; (3) the vertical counter circuit in FIG. 26 may be reset to the "0" position manually if this condition does not now exist; and (4) carrier K and all circuits are in the earlier described Condition No. 1C. As frame H traveling in direction DHR horizontally reaches this approach position, normally closed switch LS–4A is opened by trip LST–4 to break circuit No. 100 to de-energize coil HFR–C to stop fast reverse travel of frame H, and earlier defined Sequence No. 67K occurs to cause now the aforementioned action in the same manner as earlier described in Sequence No. 67K.

*Discharging Load W—Carrier K Carrying Load W Traveling in Direction DO From Position P1 Through Position P2 to Position P3 to Deposit Load W at Position P3, and Empty Carrier K Traveling in Direction DI From Position P3 Through Position P2 to Position P1*

Any load W in position P1 may be carried to position P3 and removed from the apparatus in the manner here described.

Sequence No. 92K starts here.

The following action sequentially takes place: (1) pushing switch S3 energizes coils 1LR–LC, 2LR–LC, 3LR–UC, 3R–C, 4R–C and 5R–C; (2) frame V with load W is moved by motor VM in direction DVU at fast speed and then at slow speed from position P1 to position P2 and then is stopped at position P2 with solenoid coil CL energized to swing switch LS–8L out to its dot-dash line position in FIG. 23; and (3) frame E is moved by motor EM in direction DEL from positions PEC and P2 to positions PEL and P3. As switch S3 is pushed at position P1 to close its contact S3–2, coils 4R–C and 5R–C are energized by reforming circuit No. 8, and earlier defined Sequence No. 3K occurs to cause now the aforementioned action in the same manner as earlier described in Sequence No. 3K but now the frames are loaded where before they were empty.

Sequence No. 92K ends here.

Circuits are formed and broken to prepare frame J to be moved by motor JM in direction DJU from position PJU to PJD to deposit load W on surface F–1 at position P3. As frame E reaches position PEL, trip LST–12L closes normally open switch LS–12LB to energize coil JD–C by reforming circuit No. 93, and earlier defined Sequence No. 42K occurs to prepare frame J for this movement in position P3 in the same manner as earlier described in Sequence No. 42K in position P6.

Energizing coil 1LR–UC breaks other circuits. Energizing coil 1LR–UC breaks: (1) circuit No. 15 energizing coils 4R–C and 5R–C by opening normally open contact 1LR–9, but coils 4R–C and 5R–C are kept energized by holding circuit No. 23 earlier formed; and (2) circuit No. 13 energizing coil 3R–C by opening normally open contact 1LR–2, but coil 3R–C is kept energized by holding circuit No. 16 earlier formed.

Motor JM moves frame J in direction DJU from position PJU to PJD to deposit load W on surface F–1 in position P3. As frame J leaves position PJU, switch LS–10B opens to break circuit No. 97 to de-energize coils 1LR–UC and 2LR–UC, and earlier defined sequence No. 43K occurs to cause now movement of frame J in position P3 in the same manner as earlier described in Sequence No. 43K in position P6.

This action sequentially occurs: (1) empty frame E is moved by motor EM in direction DER from positions PEL and P3 to positions PEC and P2; and (2) frame V is moved by motor VM in the direction DVD at fast speed and then at slow speed from position P2 to P1 and then is stopped at position P1, where carrier K and the circuits are in earlier described Condition No. 1C. When coil JD–C is de-energized by breaking circuit No. 93 when frame J reaches position PJD, normally closed contact JD–7 closed to reform circuit No. 41 to energize coil ER–C, and earlier defined Sequence No. 11K occurs to cause now the aforementioned action in the same manner as earlier described in Sequence No. 11K but now the frames are empty while before they were load carrying.

Now, all frames of carrier K are in position P1; and carrier K and all circuits are in the earlier described Condition No. 1C.

*Safety Jam Action Between Position P1 and Positions P3, P6, P9 and P11—Moving Frames E and J in Direction DEL or DER With its Carried Load W Onto a Load Carrying Surface F–1 in Frame F in Position P3, P6, P9, or P11 With Frame J in up Position PJU*

Means is provided responsive to load W on surface F–1 at any position P3, P6, P9 or P11 during travel through any of the commands (single, first or second): (1) for stopping before collision damage occurs travel of frame E from position PEC toward PEL or PER and (2) for automatically returning frame E to position PEC and moving frame V (and if necessary, frame H) directly back to position P1. If this stopping occurs during the first command, the second command action will be ignored with carrier K going directly to position P1.

When frame F has load W stored on one of its surfaces F–1 therein and frame E attempts: (1) to move load W onto this surface F–1 with frame J in position PJU or (2) to move frame J in position PJD under load W in frame F having an excessively downwardly bowed bottom surface in the travel path of frame J, interference occurs when frame J strikes load W in frame F. However, before damage can occur, switch LS–15 in FIGS. 2, 14, 15 and 24 is closed by trip LST–15 on frame J. Moving trip bar LST–15A of switch LS–15 endwise in either direction, as will occur when frame J is moved in direction DEL or DER against load W in frame F, against the bias of centering springs LST–15A causes notch LST–15D to close switch LS–15 on frame J.

Whenever frame E travels in direction DEL into position P3 or P6 or in direction DER into position P9 or P11 and frame J has a jamming action against load W in one of these positions in frame F, trip LST–15 closes normally open switch LS–15 to form circuit No. 157 from terminals T–1 in FIGS. 21 and 22 through normally open contact 3R–3 closed by energized coil 3R–C; terminals T–3 and T–5 in FIGS. 22, 23 and 24; normally open switch LS–15 now closed; coil 8R–C; and terminals T–6, T–4 and T–2 in FIGS. 24, 23, 22 and 21.

Sequence No. 93K starts here.

Energizing coil 8R–C forms: (1) circuit No. 159 from terminals T–1 in FIGS. 21 and 22 through normally open contact 3R–3 closed by energized coil 3R–C; terminals T–3 and T–5 in FIGS. 22, 23 and 24; normally open contact 8R–1 closed by energized coil 8R–C; coils 1LR–UC and 2LR–UC; and terminals T–6, T–4 and T–2 in FIGS. 24, 23, 22 and 21; and (2) circuit No. 160 (to energize coil 4LR–UC to assure that second command action will not occur) from terminals T–1 in FIGS. 21 and 22 through closed contact S2–1 of switch S2, normally open contact 8R–2 closed by energized coil 8R–C, coil 4LR–UC, and terminal T–2 in FIGS. 22 and 21.

Sequence No. 93K ends here.

Since the action taking place is different at position P3 than at positions P6, P9 and P11, each will be separately described.

First, action occurring at P3 will be described. If frame E is moving in direction DEL toward position P3 in panel FAL when it jams against load W in frame F in position P3, earlier defined Sequence No. 1K or 92K is occurring and there have been reformed circuit No. 33 to energize coil EL–C and circuit No. 34 to energize motor EM and brake EMB.

Travel of frame E in direction DEL is stopped and circuits are broken. When coil 1LR–UC is energized by forming circuit No. 159, then normally open: (1) contact 1LR–8 is opened to break circuit No. 33 to de-energize coil EL–C to break circuit No. 34 to de-energize motor EM and brake EMB; (2) contact 1LR–2 is opened to break circuit No. 13 but coil 3R–C is held energized by circuit No. 16; and (3) contact 1LR–9 is opened to break circuit No. 15, but coils 4R–C and 5R–C are held energized by circuit No. 23.

The following action sequentially occurs: (1) frame E is moved in direction DER to positions PEC and P2, and (2) frame V is moved in direction DVD from position P2 to P1, where carrier K and the circuits are in earlier described Condition No. 1C. When circuit No. 159 is formed to energize coil 1LR–UC, normally closed contact 1LR–10 is closed to reform circuit No. 41 to energize coil ER–C, and earlier defined Ssquence No. 11K occurs to cause the aforementioned action.

As return travel of frame E starts in direction DER and contact with load W in frame F is broken, circuit No. 157 is broken as centering springs LST–15C return trip bar LST–15A to its center position to open switch LS–15 to de-energize coil 8R–C to open normally open: (1) contact 8R–1 to break circuit No. 159 to de-energize coils 1LR–UC and 2LR–UC, and (2) contact 8R–2 to break circuit No. 160 to de-energize coil 4LR–UC.

Second, jam action at position P6, P9 or P11 will be described. If frame E is moving in direction DEL when it jams against load W in frame F in panel FAI in position P6, earlier defined Sequence No. 23K, 83K, 85K or 89K is occurring and there have been reformed circuit No. 33 to energize coil EL–C and circuit No. 34 to energize motor EM and brake EMB. If frame E is moving in direction DER when it jams against load W in frame F in panel FAR in position P9 or P11, Sequence No. 49K, 75K, 87K or 91K is occurring and there have been reformed circuit No. 128 to energize coil ER–C and circuit No. 43 to energize motor EM and brake EMB.

Travel of frame E moving in direction DEL at position P6 or in direction DER at position P9 or P11 is stopped. Energizing coil 1LR–UC by forming circuit No. 159 opens normally open contact 1LR–8 to break: (1) circuit No. 33 to de-energize coil EL–C to break circuit No. 34 to de-energize motor EM and brake EMB; or (2) circuit No. 128 to de-energize coil ER–C to break circuit No. 43 to de-energize motor EM and brake EMB.

Sequence No. 95K starts here.

Energizing coil 1LR–UC opens normally open contact 1LR–2 to break circuit No. 61, but coil 3R–C is held energized by circuit No. 68; and opens normally open contact 1LR–9 to break any of the following circuits heretofare formed: (1) circuit No. 59 or 153 to de-energize coil 3LR–UC, or (2) circuit No. 107 or 138 to de-energize coil 3LR–LC.

Sequence No. 94K ends here.

The proper return direction DEL or DER is assured, and it cannot be reversed by energizing the other coil 3LR–UC or 3LR–LC from which is now energized because energizing coil 1LR–UC has opened normally open contact 1LR–9 before contacts 4LR–2 and 4LR–3 are moved by energizing coil 4LR–UC by forming circuit No. 108.

Empty or loaded frame E is moved in return direction DER at position P6 or direction DEL at position P9 or P11 to PEC. At position P6, energizing coil 1LR–UC by forming circuit No. 159 closed normally closed contact 1LR–10 to reform circuit No. 41 to energize coil ER–C and earlier defined Sequence No. 8K occurs to cause now movement of frame E in direction DER from position P6 to positions PEC and P5 in the same manner as earlier described in Sequence No. 8K for loaded frame E in positions P3 and P2. At position P9 or P11, energizing coil 1LR–UC by forming circuit No. 159 closes normally closed contact 1LR–10 to reform circuit No. 132 to energize coil EL–C and earlier defined Sequence No. 63K occurs to cause now movement of frame E in direction DEL to positions PEC and P8 or P10 in the same manner as earlier described in Sequence No. 63K for frame E in positions P9 and P8.

During return movement of frame E to position PEC, circuits are broken. After contact with load W in frame F is broken, switch LS–15 opens to break circuit No. 157 to de-energize coil 8R–C to open normally open: (1) contact 8R–1 to break circuit No. 159 to de-energize coils 1LR–UC and 2LR–UC, and (2) contact 8R–2 to break circuit No. 160 to de-energize coil 4LR–UC.

Sequence No. 95K starts here.

Empty or loaded frame E is now in position PEC for return directly to position P1; frame V is moved in direction DVD from position P5, P8 or P10 to P4 or P7 in these three steps. First frame E in position PEC closes switches LS–13B and LS–16B, circuit No. 44 is reformed to energize coil VB–C, and earlier defined Sequence No. 14K occurs to cause now movement in the aforementioned manner as earlier described in Sequence No. 14K for moving loaded frame V from position P2 toward P1. Second, whichever of the following circuits that were earlier formed is now broken: (1) circuit No. 127 to de-energize coil CR after opening switch LS–8RB, or (2) circuit No. 31 to de-energize coil CL after opening switch LS–8LB during movement of frame V in direction DVD. Third, frame V continues to move in direction DVD and is stopped at position P4 or P7. As switch LS–14A is opened by trip LST–14, circuit No. 45 is broken to de-energize coil VFD–C and earlier defined Sequence No. 17K occurs to cause now movement in the aforementioned manner as earlier described in Sequence No. 17K for moving loaded frame V to position P1.

Sequence No. 97K starts here.

Empty or loaded frame H is moved in direction DHR directly from position P4 or P7 toward P1. As frame V reaches position P4 or P7, trip LST–9 closes normally open switch LS–9A, circuit No. 99 reforms to energize coil HB–C, and earlier defined Sequence No. 45K occurs to cause now the aforementioned movement in the same manner as earlier described in Sequence No. 45K for moving empty frame H from position P4.

As frame H travels in direction DHR, closing switch LS–18 cannot set up the second command action. Forming circuit No. 160 energized coil 4LR–UC to open normally open contact 4LR–1 to prevent energizing coils 1LR–LC and 2LR–LC by reforming circuits Nos. 103, 104, 149, or 150 to close normally open contact 1LR–2 to reform circuit No. 61.

As frame H travels in direction DHR after leaving position P4 or P7, whichever of the following circuits that have been earlier formed are now broken. Rotating contact HN8A clockwise off: (1) contact HNT–2 breaks circuit No. 111 to de-energize coil HN2R–C or breaks circuit No. 142 to de-energize coil HN1R–C, or (2) contact HNT–5 breaks circuit No. 139 to de-energize coil HN2R–C or breaks circuit No. 72 to de-energize coil HN1R–C. De-energizing coil HN2R–C opens normally open contact HN2R–1 to de-energize coil 7R–C to open: (1) contact 7R–1 to break circuit No. 112 to de-energize coils 6R–C and 5LR–UC, or (2) contacts 7R–2 and 7R–3 to de-energize coil HN1R–C. De-energizing coil HN1R–C opens normally open contact HN1R–1 to break circuit No. 73 to de-energize coil HN3R–C.

The following action sequentially occurs: (1) as empty or loaded frame H traveling in direction DHR reaches approach position before position P1, motor HM has its fast drive disengaged and its slow speed drive engaged at this approach position; (2) as frame H reaches position P1, motor HM and frame H are stopped in position P1; (3) the vertical counter circuit in FIG. 26 may be reset to the "0" position manually if this condition does now exist; and (4) carrier K and all circuits are in the earlier described Condition No. 1C after return from position P6, P9 or P11. As frame H traveling in direction DHR reaches this approach position, normally closed switch LS–4A is opened by trip LST–4 to break circuit No. 100 to de-energize coil HFR–C and earlier defined Sequence No. 67K occurs to cause now the aforementioned action as earlier described in Sequence No. 67K for moving loaded frame H.

Sequence Nos. 95K and 97K end here.

*Overtravel Action Between Position P1 and Position P3, P5, P8 or P10—(1) Movement of Frame V in Direction DVU Through Position P2, P5, P8 or P10 Past Top level FL, (2) Movement of Frame H in Direction DHF Through Position P4 or P7 Past Last Bay FB, (3) Improper Horizontal Stop at Position P4 or P7 by Frame H While Traveling in Direction DHF, or (4) Return of Carrier K by Actuation of Cycle Return Switch SR*

In (1) and (2) above, there is provided means responsive to overtravel of frame V or H during travel through any of said commands (single, first or second command) for stopping carrier K; and return means for starting return movement and for moving frame V (and if necessary frame H) or frame H respectively by return movement directly from its overtravel position back to position P1. If this overtravel occurs during the first command, the second command action will be ignored with carrier K going directly back to position P1.

(1) *Overtravel Movement of frame V in direction DVU through position, P2, P5, P8 or P10 past top level FL.*—Whenever during travel of frame V in direction DVU a dangerous condition occurs with frame V having a tendency to travel beyond topmost level FL, normally open switch LS–6B is closed by trip LST–6 to form circuit No. 162 from terminals T–1 in FIGS. 21 and 22 through normally open contact 3R–3 closed by energized coil 3R–C, terminals T–3 in FIGS. 22 and 23, normally open switch LS–6B now closed, terminals T–8 in FIGS. 23 and 24, coil 8R–C, and terminals T–6, T–4 and T–2 in FIGS. 24, 23, 22 and 21. Energizing coil 8R–C causes Sequence No. 93K now to occur to form and break circuits in earlier defined Sequence No. 93K.

Since the action taking place is different during overtravel through position P2 than during overtravel through positions P5, P8 or P10, each will be separately described.

First, the action occurring during overtravel through position P2 will be described. If frame V is moving in direction DVU through position P2, earlier defined Sequence No. 1K or 92K is occurring. As frame V travels at fast speed, there has been reformed circuit: (1) No. 17 to energize coil VB–C, (2) No. 19 to energize brake VMB, (3) No. 20 to energize coil VFU–C, and (4) No. 22 to energize motor VM.

As overtravel of frame V in direction DVU occurs, travel of frame V is stopped and circuits are broken. When coil 1LR–UC is energized by forming circuit No. 159 is Sequence No. 93K, normally open contact 1LR–7 is opened to break circuit: (1) No. 17 to de-energize coil VB–C to break circuit No. 19 to de-energize brake VMB, (2) No. 20 to de-energize coil VFU–C to break circuit No. 22 to de-energize motor VM; and normally open: (1) contact 1LR–2 is opened to break circuit No. 13 but coil 3R–C is held energized by circuit No. 16, and (2) contact 1LR–9 is opened to break circuit No. 15, but coils 4R–C and 5R–C are held energized by circuit No. 23.

Empty or loaded frame V is moved in direction DVD from the overtravel position to position P1, where carrier K and the circuits are in earlier described condition No. 1C. When coil 1LR–UC is energized, normally closed contact 1LR–6 is closed to reform circuit No. 44 to energize coil VB–C, and earlier defined Sequence No. 15K occurs to cause now the aforementioned action in the same manner as earlier described in Sequence No. 15K for loaded frame V.

As frame V moves in direction DVD, switch LS–6B opens to break circuit No. 162 to de-energize coil 8R–C to open normally open: (1) contact 8R–1 to break circuit No. 159 to de-energize coils 1LR–UC and 2LR–UC, and (2) contact 8R–2 to break circuit No. 160 to de-energize coil 4LR–UC.

Second, the overtravel action through position P5, P8 or P10 will be described. If frame V is moving in direction DVU when overtravel occurs, earlier defined Sequence No. 23K, 49K, 75K, 83K, 85K, 87K, 89K or 91K is occurring and there have been reformed circuit: (1) No. 78 or 117 to energize coil VB–C, (2) No. 19 to energize brake VMB, (3) No. 79 or 118 to energize coil VFU–C, and (4) No. 22 to energize motor VM.

Travel of frame V in direction DVD at the overtravel position is stopped. Opening switch LS–6A breaks circuit: (1) No. 78 or 117 to de-energize coil VB–C to break circuit No. 19 to de-energize brake VMB, and (2) No. 79 or 118 to de-energize coil VFU–C to break circuit No. 22 to de-energize motor VM.

Energizing coil 8R–C by forming circuit No. 105 causes Sequence No. 94K now to occur to break circuits in earlier defined Sequence No. 94K.

The following action sequentially occurs: (1) empty or loaded frame V is moved in direction DVD from the overtravel position to position P4 or P7, and (2) frame H is moved from position P4 or P7 directly back to position P1, where carrier K and the circuits are in earlier described condition No. 1C. When coil 1LR–UC is energized by forming circuit No. 159 in Sequence No. 93K, normally closed contact 1LR–6 is closed to reform circuit No. 44 to energize coil VB–C and earlier defined Sequence No. 95K occurs to cause now the aforementioned action. Reset of the vertical counter circuit back to the "0" position may be especially necessary now in position P1 by performing again Sequence No. 71K. During this return movement, circuits Nos. 31 or 127 do not have to be broken to de-energize respectively coils CL or CR because switch LS–8LB or LS–8RB was never closed.

During return movement of frame V in direction DVD away from the overtravel position, switch LS–6B is opened to break circuit No. 162 to de-energize coil 8R–C to open normally open: (1) contact 8R–1 to break circuit No. 159 to de-energize coils 1LR–UC and 2LR–UC, and (2) contact 8R–2 to break circuit No. 160 to de-energize coil 4LR–UC.

(2) *Overtravel movement of frame H in direction DHF through position P4 or P7 past last bay FB.*—If frame H is traveling in direction DHF, earlier defined Sequence No. 23K, 49K, 75K, 85K, 89K or 91K is occurring and there have been reformed circuit: (1) No. 62 or 108 to energize coil HB–C, (2) No. 64 to energize brake HMB, (3) No. 65 or 110 to energize coil HFF–C, (4) Nos. 69 and 71 to respectively hold energized brake HB–C and coil HFF–C, and (5) No. 66 to energize motor HM.

Whenever during travel of frame H in direction DHF a dangerous condition occurs with frame H having a tendency to travel beyond last bay FB, normally open switch LS–1 on frame H in FIGS. 4, 4A, 9, 13 and 24 is closed by trip LST–1 on frame F to form circuit No. 163 from terminals T–1 in FIGS. 21 and 22 through normally open contact 3R–3 closed by energized coil 3R–C; terminals T–3 and T–5 in FIGS. 22, 23 and 24; normally open switch LS–1 now closed; coil 8R–C; and terminals T–6, T–4 and T–2 in FIGS. 24, 23, 22 and 21. Energizing coil 8R–C causes Sequence Nos. 93K and 94K now to occur to form and break circuits in earlier defined Sequence Nos. 93K and 94K.

Travel of frame H at the overtravel position is stopped. Energizing coil 1LR–UC by forming circuit No. 159 in Sequence No. 93K opens normally open contact 1LR–4 to break circuit No. 65, 71 or 110 to de-energize coil HFF–C to open normally open contact HFF–1 to break: (1) holding circuit No. 69 energizing brake coil HB–C, but coil HB–C is kept energized by circuit No. 62 or 108; and (2) circuit No. 66 to de-energize motor HM by opening contacts HFF–2, HFF–3 and HFF–4. Travel of frame H in direction DHF is stopped, not by engaged brake HMB but when motor HM is energized to drive frame H in direction DHR, as occurs in the next paragraph.

Frame H is moved in direction DHR from the overtravel position directly back to position P1, where carrier K and the circuits will be in earlier described Condition No. 1C. When coil 1LR–UC is energized, normally closed contact 1LR–3 is closed to reform circuit No. 99 to energize coil HB–C and earlier defined Sequence No. 97K occurs to cause now movement in the aforementioned manner. Circuit No. 64 need not be reformed during Sequence No. 97K to energize brake HMB because it was held energized by earlier formed circuits Nos. 62 or 108 energizing coil HB–C.

During return movement of frame H in direction DHR away from the overtravel position, switch LS–1 is opened to break circuit No. 163 to de-energize coil 8R–C to open normally open: (1) contact 8R–1 to break circuit No. 159 to de-energize coils 1LR–UC and 2LR–UC, and (2) contact 8R–2 to break circuit No. 160 to de-energize coil 4LR–UC.

As frame H moves in direction DHR and reaches position P1, other circuits are broken. Breaking circuit No. 63 during Sequence No. 97K de-energizes coil 3R–C to open normally open contact 3R–3 to break circuit No. 62 or 108 to de-energize coil HB–C to break circuit No. 64 by opening contact HB–2, HB–3 and HB–4 to de-energize brake HMB.

(3) *Overtravel action beyond normal stop causing improper horizontal stop at position P4 or P7 by frame H while traveling in direction DHR.*—There is provided stop means (switch LS–3L or LS–3R) responsive to engagement with a stop portion (trip LST–3L or LST–3R) when frame H is in vertical alignment with one of the selected surfaces F–1 at position P6, P9 or P11 at selected bay FB for stopping travel of frame H in stop position P4 or P7 in alignment with this surface. Any overtravel of this stop position is independently detected for servicing each panel FAL and FAR by overtravel in FIG. 23 of the actuating arm of: (1) switch LS–3L to actuate switch LS–17L during overtravel of a proper stop for servicing panel FAL, and (2) switch LS–3R adapted to close switch LS–17R upon overtravel of the proper stop position for servicing panel FAR. If frame H is not accurately stopped and overtravels the stop position (determined by switch LS–3L or LS–3R corresponding to the selected panel FAL or FAR to be serviced and to side control contacts 1S and 2S), the corresponding switch LS–17L or LS–17R will be actuated and these actions will occur: (1) movement of frame V in direction DVU toward position P5, P8 or P10 toward surface F–1 being approached will be prevented, and (2) frame H will be moved by return movement from this improper stop position directly back to position P1.

As frame H (traveling in direction DHF) is properly stopped in stop position P4 or P7 by actuation of its switch LS–3LR or LS–3R by trip LST–3L or LST–3R respectively, circuits are formed. If panel FAL is to be serviced (such as in position P6) Sequence No. 23K, 83K, 85K or 89K is occurring; and switch LS–3LA is closed to reform circuit: (1) No. 78 to energize coil VB–C, (2) No. 19 to energize brake VMB, and (3) Nos. 79 and 22 to energize coil VFU–C and motor VM. If right panel FAR is to be serviced (such as in position P9 or P11), Sequence No. 49K, 75K, 87K or 91K is occurring; and switch LS–3RB is closed to reform circuit: (1) No. 117 to energize coil VB–C, (2) No. 19 to energize brake VMB, (3) No. 118 to energize coil VFU–C, and (4) No. 22 to energize motor VM. In either event, frame V is ready to travel at fast speed in direction DVU, as earlier described in these aforementioned sequences.

As frame H continues to move in direction DHF and overtravels this proper stop, switch LS–17L or LS–17R is actuated by the overtraveling actuating arm of switch LS–3L or LS–3R respectively (shown about to occur in FIGS. 4 and 23 showing proper stop position for position P4 or P7). If an improper stop occurs by overtravel for the frame panel FAL or FAR selected to be serviced, travel of frame V in direction DVU is prevented. During servicing of left panel FAL, opening switch LS–17LA breaks: (1) circuit No. 78 to de-energize coil VB–C to open contacts VB–2, VB–3 and VB–4 to break circuit No. 19 to de-energize and engage brake VMB; and (2) circuit No. 79 to de-energize coil VFU–C to open contacts VFU–2, VFU–3 and VFU–4 to break circuit No. 22 to de-energize motor VM. During servicing panel FAR, opening switch LS–17RA breaks: (1) circuit No. 117 to de-energize coil VB–C to open contacts VB–2, VB–3 and VB–4 to break circuit No. 19 to de-energize and engage brake VMB; and (2) circuit No. 118 to de-energize coil VFU–C to open contacts VFU–2, VFU–3 and VFU–4 to break circuit No. 22 to de-energize motor VM.

If an improper stop occurs by overtravel for panel FAR or FAL selected to be serviced, frame H is moved in direction DHR by return movement directly back to position P1. During servicing panel FAL, normally open switch LS–17LB is closed by overtravel of the actuator arm of switch LS–3L to form circuit No. 164 from terminals T–1 in FIGS. 21 and 22 through normally open contact 3R–3 closed by energized coil 3R-C, terminals T–3 in FIGS. 22 and 23, normally closed contact 3LR–11 closed because circuit No. 59 or 153 has earlier formed to energize coil 3LR–UC to indicate panel FAL was to be serviced, normally open switch LS–17LB now closed, normally closed contact HFF–7, terminals T–8 in FIGS. 23 and 24, coil 8R–C, and terminals T–6, T–4 and T–2 in FIGS. 24, 23, 22 and 21. During servicing panel FAR, normally open switch LS–17RB is closed by over actuating the arm of switch LS–3R to form circuit No. 166 from terminals T–1 in FIGS. 21 and 22 through normally open contact 3R–3 closed by energized coil 3R–C, terminals T–3 in FIGS. 22 and 23, normally open contact 3LR–12 closed when circuit No. 107 or 138 formed to energize coil 3LR–LC to indicate panel FAR was to be serviced, normally open switch LS–17RB now closed, normally closed contact HFF–7, terminals T–8 in FIGS. 23 and 24, coil 8R–C, and terminals T–6, T–4 and T–2 in FIGS. 24, 23, 22 and 21.

In either of these aforedescribed events, the remaining action required to move frame H back to position P1 is substantially the same so will be described only once.

Energizing coil 8R–C causes Sequence Nos. 93K and 94K now to occur to form and break circuits in earlier defined Sequence Nos. 93K and 94K.

Frame H is moved from the improper stop past position P4 or P7 directly back to position P1, where carrier K and the circuits are in earlier described condition No. 1C. When coil 1LR–UC is energized by forming circuit No. 159 in Sequence No. 93K, normally closed contact 1LR–3 is closed to reform circuit No. 99 to energize coil HB–C and earlier defined Sequence No. 97K occurs to cause now movement in the aforementioned manner.

During return of frame H in direction DHR away from the overtravel position, switch LS–17LB or LS–17RB is opened to break circuit No. 164 or 166 respectively to de-energize coil 8R–C to open normally open: (1) contact 8R–1 to break circuit No. 159 to de-energize coil 1LR–UC and 2LR–UC, and (2) contact 8R–2 to break circuit No. 160 to de-energize coil 4LR–UC.

It should be apparent that stopping travel of frame V in direction DVU and automatically returning frame H in direction DHR to position P1 will only occur if an improper stop occurs for the frame panel, FAL or FAR, selected to be serviced. Manually actuated left side control contact 1S–L or 2S–L energizes coil 3LR–UC to designate servicing of left panel FAL, and manually actuated right side control contact 1S–R or 2S–R energizes coil 3LR–LC designating right panel FAR to be serviced. These coils control contacts 3LR–11, 3LR–12, 3LR–13, and 3LR–14 to assure that only actuation of switch LS–17L by left side trip LST–3L will cause the aforementioned action when panel FAL is to be serviced and actuation of switch LS–17R by right side trip LST–3R will cause the aforementioned action when panel FAR is to be serviced, but actuation of switch 17L without actuation of switch 17R will not cause such action druing servicing of panel FAR, and actuation of switch 17R without actuation of switch 17L will not cause such action during servicing of panel FAL. Hence, it is possible for each side panel FAL to have an accurate stop position for each selected horizontal stop position (such as position P4) independently located in direction DHF with respect to the stop position for the other panel. The reason and desirability for these independent accurate stops for each panel are explained in more detail in the last chapter of this application under the title "Stop Positions P4 and P7, etc."

(4) *Return of carrier K by actuation of cycle return switch SR.*—Pressing switch SR at any time during any sequence will automatically return carrier K back to position P1. Pressing switch SR forms circuit No. 167 from terminals T–1 in FIGS. 21 and 22 through normally open contact 3R–3 now closed by coil 3R–C; terminals T–3 and T–5 in FIGS. 22, 23 and 24; closed contact SR–1 of switch SR; coil 8R–C; and terminals T–6, T–4 and T–2 in FIGS. 24, 23, 22 and 21. Energizing coil 8R–C causes Sequence Nos. 93K and 94K now to occur to form and break the circuits in earlier described Sequence Nos. 93K and 94K. Releasing switch SR opens contact SR–1 to break circuit No. 167 to de-energize coil 8R–C. Then, carrier K is returned back to position P1 by any suitable one of the last four described return actions (jam action, vertical overtravel, horizontal overtravel or improper stop action) back to position P1 (where carrier K and the circuits will be in earlier described Condition No. 1C), with the choice being determined by where frames H, V, or E are located when switch SR is pushed, because all return actions are based on energizing cycle return coil 8R–C.

Figure 27:
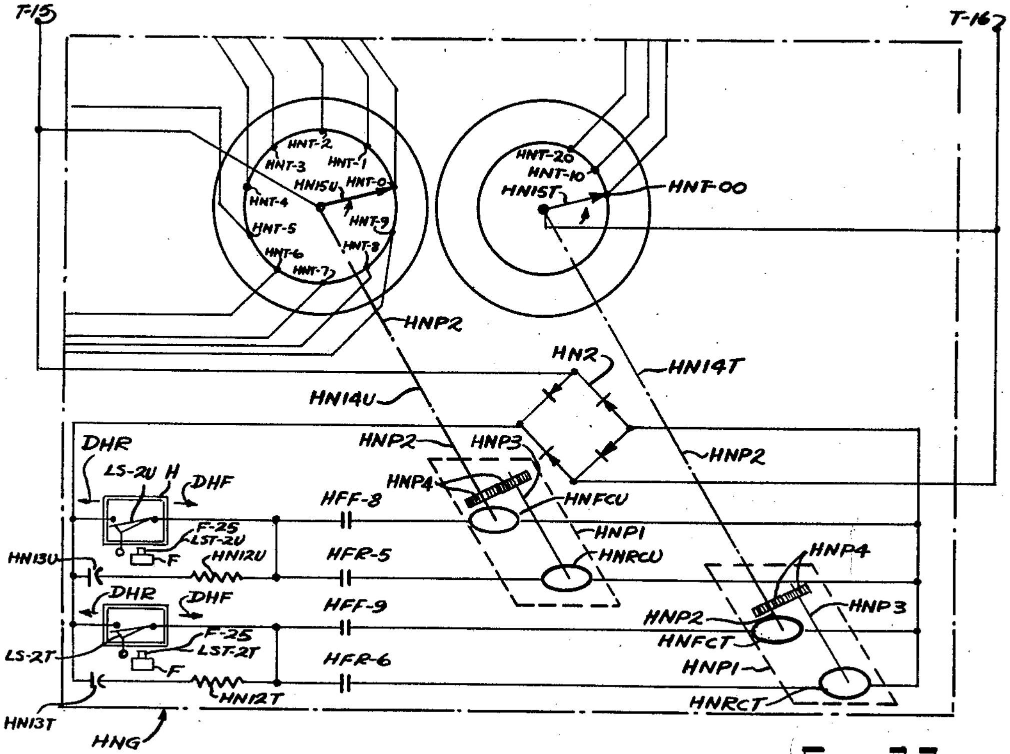

OTHER FEATURES (1) *Counter and drive unit HNG in FIG. 27.*—During travel of frame H in direction DHF or DHR, the control disclosed herein has been shown to include a counting means responsive to travel of frame H relative to positions P1, P4 and P7 along any one of these directions for maintaining movement of frame H in this one direction from any given position, such as position P4, to another position, such as position P7, and for stopping frame H aligned with surface F–1 at positions P7 and P8. This counting means has been disclosed as including a counter mechanism or counter and drive unit HNA in FIG. 25 but instead may have substituted in place thereof a counter mechanism or counter and drive unit HNG in FIG. 27.

Unit HNG can be substituted for unit HNA in FIG. 25 by connecting terminals T–15 and T–16 from FIG. 27 in FIG. 25 and removing unit HNA. Then, it will be apparent that unit HNB permits the same forming and breaking of circuit Nos. 72, 111, 139 and 142, as earlier described.

Connecting in unit HNG in this manner rectifies A.-C. to D.-C. power with A.-C. to D.-C. rectifier HN2 by circuit No. 170 formed from terminals T–1 in FIGS. 21 and 25 through normally closed contact 4R–2, closed contact HNS1–1 of switch HNS1, fuse HN3, terminals T–15 in FIGS. 25 and 27, rectifier HN2, terminals T–16 and T–2 in FIGS. 27, 25 and 21. Then, circuit No. 170 is formed or broken at the same time as earlier described for circuit No. 6 to rectify A.-C. to D.-C. power with rectifier VN2 in FIG. 26.

In FIG. 27, there are two identical assemblies HNP1. Each assembly HNP1 includes two solenoid stepper coils HNFC and HNRC, each corresponding to coil 24 in the aforementioned U.S. Patent No. 2,501,950 and connected respectively to shaft HNP2 and HNP3 by a one way driving ratchet drive mechanism (corresponding respectively with shaft 61 and the ratchet tooth drive mechanism provided by either teeth 63 on disk 62 and teeth 65 on disk 64 or ratchet elements 78 and 79 in said patent), with switch LS–2U or LS–2T serving as master switch 43 in said patent, and with holding resistor 84′ and interrupter contacts 48 and 49 of said patent eliminated. Shafts HNP2 and HNP3 in each assembly HNP1 are connected by gears HNP4. Series connected resistance HN12U or HN12T and condenser HN13U or HN13T are connected in parallel with switch LS–2U or LS–2T so that when either of these switches open, any sparks caused by the inductance of coils HNFCU, HNRCU, HNCFT will be suppressed. Return spring 38 in said patent returns the armature of any of these coils back to its original and retracted position upon de-energization of the coil by opening of switch LS–2U or LS–2T.

It will be apparent hereinafter that each closing of switch LS–2U or LS–2T will cause: (1) during movement in direction DHF energizing coil HNFCU or HNFCT so as to rotate shaft HNP2 and rotating contact HN15U or HN15T thereon one step counterclockwise, such as from stationary contact HNT–0 or HNT–00 to stationary contact HNT–1 or HNT–10; and (2) during movement in direction DHR energizing coil HNRCU or HNRCT so as to rotate shaft HNP2 and the rotating contact HN15U or HN15T thereon one step clockwise, such as from stationary contact HNT–1 or HNT–10 to stationary contact HNT–0 or HNT–00.

When frame H travels in direction DHF at fast speed, coil HFF–C is energized by circuit No. 65, 71 or 110 to close normally open contacts HFF–8 and HFF–9 in FIG. 27. Forward stepper coil units HNFCU is energized at every bay by closing normally open limit switch LS–2U to maintain the units count by adding to the count in the forward direction by forming circuit No. 171 from rectifier HN2 in FIG. 27 through normally open switch LS–2U closed by trip LST–2U, normally open contact HFF–8 closed by energized coil HFF–C, coil HNFCU, and rectifier HN2. The tens count is maintained by adding to the count during travel of frame H in direction DHF by closing normally open switch LS–2T at every tenth bay FB to energize forward stepper coil-tens HNFCT by circuit No. 173 formed from rectifier HN2 through normally open switch LS–2T closed by trip LST–2T, normally open contact HFF–9 closed by energized coil HFF–C, coil HNFCT, and rectifier HN2.

When frame H travels in direction DHR at fast speed, coil HFR–C is energized by circuit No. 100 to close normally open contacts HFR–5 and HFR–6. Reverse stepper coil-units HNRCU is energized at every bay by closing normally open switch LS–2U to maintain the units count by substracting from the count in the reverse direction by forming circuit No. 174 from rectifier HN2 through normally open switch LS–2U closed by trip LST–2U, normally open contact HFR–5 closed by energized coil HFR–C, coil HNRCU, and rectifier HN2. The tens count is maintained by subtracting from the count during travel of frame H in direction DHR by closing normally open switch LS–2T at every tenth bay to energize reverse stepper coil-tens HNRCT by circuit No. 176 formed from rectifier HN2 through normally open switch LS–2T closed by trip LST–2T, normally open contact HFR–6 closed by energized coil HFF–C, coil HNRCT, and rectifier HN2.

Now, it should be apparent that counter mechanism HNG in FIG. 27 on frame H is actuated by tripping engagement of switches LS–2U and LS–2T by at least one member LST–2U or LST–2T at each bay FB during travel along one direction DHF, and along the reverse direction DHR, for maintaining the count corresponding with bay FB location of frame H at all times during movement in either of these directions and completely independently of the spacing between bays FB.

Some of the advantages of using unit HNG in FIG. 27, instead of unit HNA in FIG. 25, are obtained by elimination of gear box HN6. Unit HNG does not require careful calculation of gear ratios; permits considerable variation in horizontal length of bays FB along direction DHF in frames F in different installations without redesign, as would be required with gear box HN6; and permits spacing between adjacent bays FB to be varied, such as may be required by separation of some bays FB to straddle a building column housing the apparatus or to provide a lateral access or fire aisle into zone KZ through frame F. This is not possible with gear driven unit HNA because spacing of bays FB along direction DHF must be uniform with the gear drive.

Although units HNA and HNG have been described only with respect to frame H, it should be readily apparent that they could be used by suitable modification with any directionally movable frame, such as frame V.

Unit HNG in FIG. 27 must maintain the proper count not only at the stop position for frame H provided by opening switch LS–3LA or LS–3RA in preselected bay FB, such as at position P4, but also at the closing position for switch LS–18 on the position P1 side thereof and contiguous thereto for setting up the second command action, as earlier explained and must maintain this proper count during movement in both directions DHF and DHR. This is assured by maintaining proper horizontal spacing along direction DHR between switches LS–2U and LS–2T, switch trips LST–2U and LST–2T with respect to each bay FB and preselected position, such as position P4, as provided by the arcuate contacts in unit HNA engaged by rotating contacts HN8A and HN9A.

(2) *Safety brake for frame V.*—Since brake VMB in FIG. 21 is energized and disengaged by coil VB–C during driving movement of frame V in direction DVU or DVD by motor VM in FIG. 21, there is always the danger that if this driving movement is stopped for any reason while brake VMB is energized and disengaged, frame V will move downwardly too rapidly for safety in direction DVD. This may occur if motor VM or any coil VFD–C, VFU–C, VSD–C or VSU–C burns out or if drive belt VM–1 breaks.

To overcome this danger and to limit free travel velocity of frame V in direction DVD, additional safety brake 2VMB in FIGS. 8 and 21 has been added on shaft VM–4 and frame V to brake shaft VM–4 against rotation relative to frame V.

Whenever coil VB–C is energized by forming circuit No. 17, 44, 78 or 117 to form circuit No. 19 to energize and disengage brake VMB, safety brake coil 2VB–C energizes and disengages brake 2VMB. Coil 2VB–C is energized by forming circuit No. 180, extending in parallel with coil VB–C, through normally closed limit switch LS–20 and coil 2VB–C. Energizing coil 2VB–C forms circuit No. 181 in FIG. 21 from lines L1, L2 and L3 through normally open contacts 2VB–2, 2VB–3 and 2VB–4, closed by energized coil 2VB–C, and brake 2VMB.

This aforedescribed safety means is responsive to travel velocity in direction DVD of frame V for automatically engaging brake 2VMB when this velocity exceeds a predetermined value exceeding normal drive velocity by motor VM. In FIGS. 8 and 23, frame V has safety unit Z rotatably mounted therein. Gear VM–6 meshes with vertical gear rack H–3A and drives through bevel gears Z8 shaft Z3 rotatably driving centrifugal weights Z1 pivotally connected through four equal length linkage members to axially fixed collar Z4 and axially slidable collar Z5, both rotatably driven by shaft Z3. As downward velocity of frame V exceeds the aforesaid predetermined value, centrifugal weights Z1 move radially outwardly and pull block Z5 axially downwardly against upward force of spring Z2 to swing lever Z6, connected to block Z5 by a suitable shoe, clockwise about its pivot Z9 on frame V to open normally closed limit switch LS–20 on frame V. Opening switch LS–20 breaks circuit No. 180 to de-energize coil 2VB–C, even though coil VB–C is still energized, to open normally open contacts 2VB–2, 2VB–3 and 2VB–4 to break circuit No. 181 and de-energize and engage safety brake 2VMB to retard downward movement of frame V by gears VM–5 and VM–6 engaging racks H–3B and H–3A so that its velocity in direction DVD cannot exceed the predetermined value.

If circuit Nos. 180 and 181 are not otherwise broken, they will be broken to de-energize coil 2VB–C and brake 2VMB respectively whenever circuit No. 17, 44, 78 or 117 is broken to de-energize coil VB–C.

(3) *Thermal overloads.*—If any of the motors are thermally overheated, one of the thermal overload coils HFOL–C1, HFOL–C2, HSOL–C1, HSOL–C2, VFOL–C1, VFOL–C2, EOL–C1, EOL–C2, JOL–C1 or JOL–C2 in FIG. 21 will open up its controlled contact located between coil 3R–C and terminal T–2 in FIG. 22 to break any energizing circuits for coil 3R–C to automatically stop carrier K. After the overload is corrected, pressing switch S3 or S4 will automatically move carrier K through at least some portion of the remainder of its cycle of operation and back to position P1, in generally the same manner as disclosed in my aforesaid copending United States patent application, Serial No. 813,585, as should be readily apparent.

(4) *Manually controlled operation—(1) movement of frame H in direction DHR, and (2) movement of frame V in direction DVU.*—During set up or testing of the apparatus, it is desirable that travel of carrier K be limited either to one direction or to the travel of one frame H or V at a time so as to accurately check the mode of operation and to avoid any damage to component parts. Switches SV and Se permit control of the apparatus in the same manner as the same designated switches disclosed in my aforesaid copending patent application.

(5) *Variations in movements of frames H and V.*—Although frame H is shown as being horizontally movable and frame V is shown as being vertically movable, it should be readily apparent that many of the described features will function well with any suitable directionally movable frame substituted for these frames to travel in zone KZ with this directionally movable frame movable horizontally, vertically, diagonally, or any combination thereof. Frames H and V may also be simultaneously movable so as to carry load W by resultant diagonal movement as this directionally movable frame. Although carrier K has been disclosed as always returning to position P1, it should be readily apparent that it is within the scope of this invention to have carrier K travel directly from position P2 to P5, P5 to P8, P5 to P10 (or between any other different load storage positions located at different levels FL and/or bays FB in frame F) instead of having to travel through position P1 or through switch LS–18 closing position when traveling between these positions.

(6) *Summary of two command and single command action.*—There has been described two command actions involving first and second load transfer positions P6 and P9, P9 and P6, or P6 and P11 selected by a plurality of manually actuatable selectable elements (including switches 1S, 2S, 1HNS, 2HNS, 1VNS and 2VNS comprising left side control contacts 1S–L, 2S–L and control switch S3; and comprising right side control contacts 1S–R and 2S–R); and single command actions involving load transfer positions P3, P6 or P9 selected by at least one manually actuatable selectable control element (including switch S3 or 1HNS, 1VNS and 1S, comprising left side control contact 1S–L and right side control contact 1S–R). Hereinafter, the description of the two command will be restricted, whenever possible, to first position P6 and second position P6' in FIG. 1 and the single command to position P6 as generic examples of all conditions described and with each of these positions aligned with positions P4 and P5. When these switches are pushed in control position P1, carrier K is at position P1 or any other suitable reference position.

When contact S5–1 is closed, a two command control is provided comprising: (1) switches 1S, 2S, 1HNS, 2HNS, 1VNS and 2VNS actuatable at position P1 with carrier K at position P1, and corresponding with first and second selected load transfer positions P6 and P6'; and (2) means for sequentially moving carrier K from position P1 to and stopping by a first command at position P6, transferring load W between carrier K and frame F in position P6, moving carrier K from position P6 by the usual return motion in direction DHR toward position P1 so as to close switch LS–18 (with never more than one-half bay of extra motion being required) for automatically moving carrier K by the second command to and stopping at position P6', and transferring W between carrier K and frame F in position P6' in response to earlier actuation of contacts 1S–L, 2S–R, 1HNS–5, 1HNS–10, 1VNS–3, 2HNS–10, 2HNS–5, and 2VNS–3 at position P1 corresponding to first and second command positions P6 and P6'. During this action, surface F–1 is loaded at one of these selected positions P6 and is unloaded at the other position P6'. This aforedescribed two command action may take any of the following forms: (1) the second command bay number (position P9) being larger than the first command bay number (position P6), (2) the second command bay number (position P6) being smaller than the first command bay number (position P9), (3) the second command bay number (position P11) being the same as the first command bay number (position P6), (4) taking one load W from position P1 and storing it in position P6, P9 or P6 and then retrieving another load W from position P9, P6 or P11 back to position P1; (5) load W being transferred from one position to another position within frame F by having carrier K leave and return to position P1 empty, (6) having a second pick up and discharge position, similar in function to position P3, at the far right end of frame F in FIG. 1 to be serviced by the operator at position P1 by either using the first command to pick up load W at said second position and using the second command to deposit load W in frame F at any suitable position P6 or using the first command to retrieve load W from position P6 and the second command to deposit this load W at the second position for removal from the apparatus; and (7) load W may be received by the apparatus at position P3, stored in frame F, and later discharged from the apparatus at said second position, or load W may be received at this second position and discharged at position P3. The first four uses have been described sequentially heretofore, and it should be readily apparent that the last three uses broadly come within the description earlier given in this paragraph and are capable of being performed by this apparatus.

When contact S5–2 is closed, a single command control is provided comprising: (1) switch 1S, 1HNS and 1VNS actuatable at position P1 with carrier K at position P1, and corresponding with selected load transfer position P6; and (2) means for sequentially moving carrier K from position P1 to and stopping by a single command at position P6; transferring load W between carrier K and frame F in position P6; and then returning carrier K to position P1 in response to earlier actuation of contacts 1S–L, 1HNS–5, 1HNS–10 and 1HNS–3 at position P1 corresponding to position P6.

Hence, the operator may select either single command or multiple command control. Either control may deposit or retrieve load W into or from frame F in either panel FAL or FAR.

Since frame J may be either in position PJU or PJD, it is possible that frame J may be in the wrong position for the start of a new two command, single command, or pick up and discharge cycle at position P3. Frame J may be moved to the other, or right position, by running carrier K through a single command cycle at any unloaded opening F–2 in frame F or at unloaded position P3.

(7) *Stop positions P4 and P7 of frame H and stop Positions P2, P5, P8 and P10 of frame V are independently controlled for servicing panel FAL or FAR.*—Hereafter, each position P4 or P5 will be considered as having two separate left and right stop positions for servicing positions P6 and P6' respectively. Frame F has at position P5 in panels FAL and FAR left and right side surface F–1 in positions P6 and P6' straddling carrier K and controlled respectively by contacts 1S–L and 2S–R. When left position P6 is to be serviced, left stop means or switches LS–3L and LS–8L on frames H and V are responsive to manually actuating contact 1S–L and responsive to engagement with stop portion or trips LST–3L and LST–8L respectively on the left side of frame F in alignment with selected surface F–1 in position P6 in panel FAL for stopping travel of frame H in a left stop position P4 and of frame V in a left stop position P5 in alignment with surface F–1 at position P–6. When servicing position P6', right stop means or switches LS–3R and LS–8R on frames H and V are responsive to manually actuating contact 2S–R and responsive to engagement with stop portion or trips LST–3R and LST–8R respectively on right side of frame F in alignment with selected surface F–1 in position P6' in panel FAR for stopping travel of frame H in right stop position P4 and of frame V in right stop position P5 in alignment with surface F–1 in position P6' in the same manner as earlier described during travel to positions P9 and P11.

Figure 5:
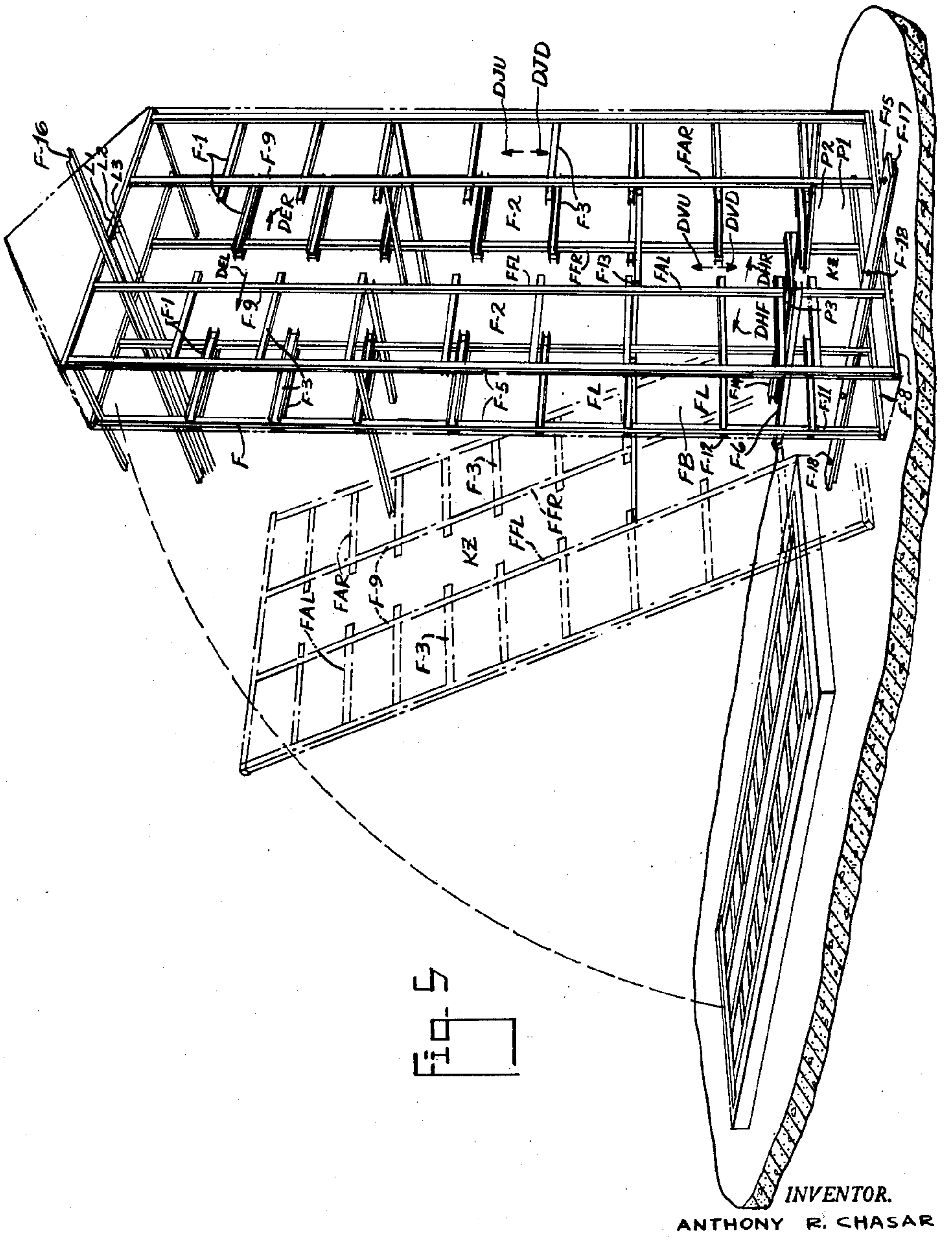
FIG. 5 is a perspective view of a portion of the load storage frame with one suitable method shown for erecting said frame.
Figure 6:
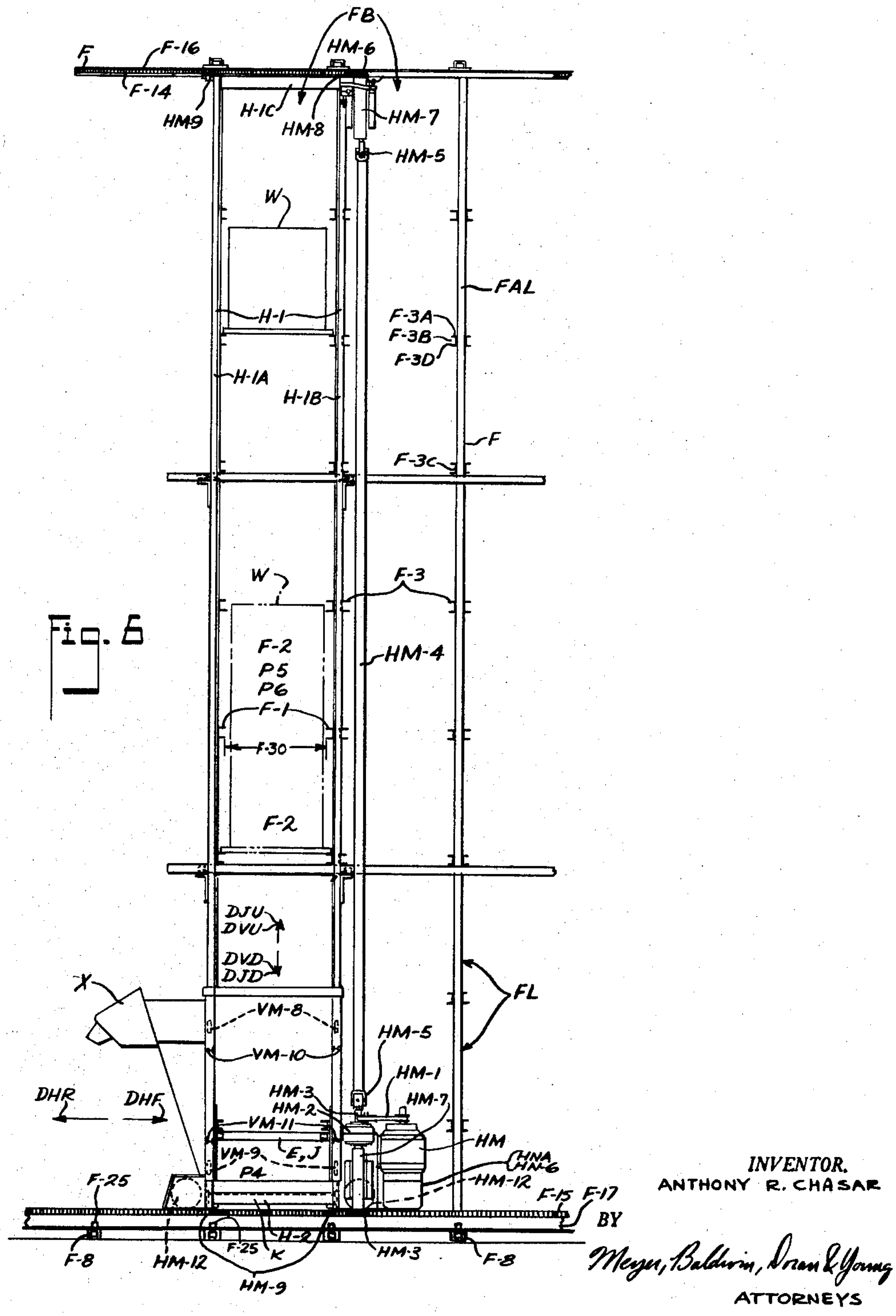
FIG. 6 is a vertical view of the load carrier and load storage frame taken generally along line 6—6 in FIGS. 1 and 2.

The advantages of providing separate left and right stop positions for each position P4 and P5 in zone KZ are many. Using switches LS–3L and LS–3R permits one to compensate for misalignment errors caused during erection of frame F including: (1) horizontal frame members F–8 in FIG. 5 may extend parallel to each other in a horizontal plane but not perpendicular from gear rack F–15 in a lateral direction so that surfaces F–1 in one panel, FAL or FAR, are ahead of those along direction DHF in the other panel; and (2) since gear racks F–14 and F–17 in FIGS. 5 and 7 are each made up of a plurality of longitudinally aligned rack sections secured in place by screws F–18, there may be different longitudinal spacings provided during erection between racks so that mast H–1 will change its vertical orientation in the vertical plane through direction DHF when carrier K travels in direction DHF, and these independent left and right stop positions will permit one to compromise the alignment error obtained in different bays FB so that frame E will be able to enter each vertically aligned opening F–2 in frame F in any given bay FB. Using switches LS–8L and LS–8R determines each stop position by tripping off a surface on frame F contiguous to position P6 or P6' to be serviced to compensate for any settling of the supporting floor or frame F and any inaccuracy caused during erection of frame F.

Switches LS–17L and LS–17R respectively independently detect any overtravel of the proper left or right horizontal travel stop positions P4 for servicing each of the panels FAL and FAR to stop advancement of frame V in direction DVU and to automatically move frame H by return movement back to position P1. Assuring an accurate stop is important while traveling in direction DHF because: (1) frame V should be vertically aligned with surfaces F–1 in selected bay FB at any horizontal stop position P4 so that frame E will be able to be easily inserted into frame F at any one side position in that bay FB, including position P6 or P6'; (2) guide roller V–6 is vertically aligned between surfaces F–3E on frame members F–3 in adjacent bays FB by any proper horizontal stop position P4; (3) if during travel in direction DHF toward any selected position P5 power failure should occur when switch LS–3L or LS–3R is closed by trip LST–3L or LST–3R at some bay FB before positions P4 with frame V improperly aligned for servicing the openings in that bay because of overtravel, the power failure causes opening of normally open contact HFF–1 to break holding circuits Nos. 69 and 71 to de-energize respectively coils HB–C and HFF–C; then, if switches LS–17L and LS–17R were not used, upon restoring power frame H would not move and frame V would travel in direction DVU (because normally closed contact HFF–6 and switch LS–3LB or LS–3RB would be closed) to a position at same level FL as position P5 so that serious damage might be caused when frame E strikes frame F out of alignment with surface F–1 therein; and (4) in selected position, use of switch LS–17L or LS–17R allows for the horizontal length in direction DHF of trip LST–3L or LST–3R because otherwise a stop anywhere along the horizontal length of one of these trips would indicate a proper stop position and permit further movement of frames V and E.

Frame members F–25 provide at every bay FB common stop portions or trips LST–2T, LST–2U, LST–3L, and LST–18 on the left side in FIGS. 4, 4A, 9 and 13; other frame members F–25 provide at every bay FB stop portion or trip LST–3R on the right side; and other frame members F–25 provide at every tenth bay FB trip LST–2T. Each frame member F–25 can be secured at any suitable position along direction DHF on cross frame member F–8 by screw F–19 extending through member F–25 closer to the right edge than the left edge thereof in FIG. 13 (each stop position P4 can be changed by turning its member F–25 180 degrees about its vertical axis) so that stop portions F–25 on the left and right sides are independently adjustable relative to frame F along length of travel of frame H in direction DHF for permitting independent relative adjustment of the stops of frame H for the left and right sides.

It should be readily apparent that the principle of using this independent adjustment of left and right side trips, and the use of switches LS–17L and LS–17R to stop advance of the frames of carrier K in direction DHF and to automatically return carrier K to position P1 may be used with switches LS–8L and LS–8R at vertical stop positions P5 for frame V. Then, an improper stop by frame V in direction DVU would prevent further advance of frame E in direction DEL or DER and would automatically return frames V and H to position P1.

Frame V, traveling in direction DVU, is stopped at any selected level position P5 for position P6 or P6' by switch LS–8L or LS–8R actuated in response to engagement with trip LST–8L or LST–8R on projecting frame member F–3 of surface F–1 in adjacent bay FB contiguous to any position P5 for stopping travel of frame V in selected position P5 for servicing respectively left or right panel FAL or FAR in position P6 or P6'. Switch LS–8L or LS–8R is swung outwardly to its dot-dash line extended position in FIGS. 9A and 23 by energizing coil CL or CR about 2½ inches below any vertical stop position P5 by coacting frame V position responsive means (including trip LST–19 and switch LS–19 for position P2 and including trip LST–7 and switch LS–7 for positions P5) for detecting the approach position before any position P5 and for advancing the stop portion sensing engaging member or switch LS–8L or LS–8R relative to frame V laterally of direction DVU from a retracted position into an extended position aligned with trip LST–8L or LST–8R by energizing coil VN5R–C to close contact VN5R–2 to energize coil VSU–C to close normally open contact VSU–6 to energize coil CL or CR. Then, frame V is stopped in response to engagement by a switch LS–8L or LS–8R in one of the dot-dash line extended positions in FIG. 23 with trip LST–8L or LST–8R in alignment with selected surface F–1 in position P6 or P6' for stopping travel of frame V in alignment with such surface F–1. Switch LS–8L or LS–8R is laterally retracted from its extended dot-dash line position in FIGS. 9A and 23 into its retracted, solid line position with respect to direction DVD in response to frame V moving in direction DVD away from any position P5 by having normally open switch LS–8LB or LS–8RB open to break holding circuit No. 31 energizing coil CL or circuit No. 127 energizing coil CR.

The advantages of this advancing and retracting action for switches LS–8L and LS–8R are many, including: (1) since some of the loads W may consist of a plurality of vertically stacked packages on a flat or skid, some of these packages stored in frame F may extend laterally in direction DER from position P6, or in direction DEL from position P6', far enough out toward zone KZ to be in the path of extended switch LS–8L or LS–8R during travel of frame V in direction DVU so that the extended switch will be actuated by one of these packages to cause frame V to be stopepd in the wrong vertical position or the actuating arm of one of these switches may be bent during travel in direction DVD; (2) overworking of switch LS–8L or LS–8R by actuation at each level FL on a frame member F–3 is prevented so as to improve the stopping accuracy and to increase the life of the switches; and (3) the circuit is simplified by eliminating necessity for two normally open VFU contacts actuated by coil VFU–C, one in parallel with each switch LS–8LA and LS–8RA, to provide holding circuits (in the same manner as provided by normally open contact HFF–1 for forming holding circuits Nos. 69 and 71 to hold energized respectively coils HB–C and HFF–C upon opening of switch LS–3LA or LS–3RA by trip LST–3L or LST–3R respectively at bays FB before the selected stop position P4 is reached) to maintain coils VFU–C and VB–C energized during tripping of switch LS–8L or LS–8R at every level FL upon member F–3 before any selected position P5 because switches LS–8LA and LS–8RA do not open at any level FL below selected stop position P5.

It should be apparent that this principle of advancing and retracting switches LS–8L or LS–8R, as they respectively approach and leave any selected stop position P5, and having trips LST–8L or LST–8R on an extended end of frame member F–3 or other part of surface F–1, might also be used if desired for switch LS–3L or LS–3R (with or without switch LS–17L or LS–17R) to obtain some or all of these advantages by suitable modification of the circuit.

Various changes in details and arrangement of parts may be made by one skilled in the art without departing from either the spirit of this invention or the scope of the appended claims.

What is claimed is:

1. A load transfer and storage apparatus comprising a storage frame having a plurality of load support means; a pick-up-and-discharge station; a load carrier movable forwardly from said station to any of said support means for depositing or retrieving a load thereat; power means for actuating said carrier; control means for operating said carrier including selector means; said selector means comprising first command selective control elements for causing said carrier to move to a first selected support means in execution of a first command; said selector means comprising second command selective control elements for causing said carrier to move to a second selected support means in execution of a second command; said control means including cycling means for initiating cycling whereby said carrier is caused to move forwardly to a selected support means of a command and automatically return rearwardly to said station after executing a command; said control means including means automatically deactivating said cycling means after the completion of said first command and means automatically reinitiating said cycling means in a forward direction after said cycling means has been deactivated and causing said carrier to execute said second command before said carrier returns to said station; said control means including reject means carried by said carrier and responsive to a load on a selected support means of a command, when said carrier is loaded, and causing said carrier to return directly to said station whereby when said reject means is actuated during execution of a first command, both commands are terminated.

2. A load transfer and storage apparatus comprising a storage frame having a plurality of load support means; a pick-up-and-discharge station; a load carrier movable forwardly from said station to any of said support means for depositing or retrieving a load thereat; power means for actuating said carrier; control means for operating said carrier including selector means; said selector means comprising first command selective control elements for causing said carrier to move to a first selected support means in execution of a first command; said selector means comprising second command selective control elements for causing said carrier to move to a second selected support means in execution of a second command; said control means including cycling means for initiating cycling whereby said carrier is caused to move forwardly to a selected support means of a command and automatically return rearwardly to said station after executing a command; said control means including means automatically deactivating said cycling means after the completion of said first command and means automatically reinitiating said cycling means in a forward direction after said cycling means has been deactivated and causing said carrier to execute said second command before said carrier returns to said station; said plurality of load support means being arranged in at least one horizontal row of bays; said station disposed adjacent to one end of said row; said carrier movable forwardly away from and rearwardly toward said station past said row of bays; said first command control elements including an element for each bay; said second command control elements including an element for each bay; said control means including means deactivating said second command control elements when a bay designated by said second command control elements is passed by said carrier moving in a forward direction away from said station before said carrier reaches a bay designated by said first command control elements whereby said first command is executed before said second command.

3. A load transfer and storage apparatus comprising a storage frame having a plurality of load support means; a pick-up-and-discharge station; a load carrier movable from said station to any of said support means for depositing or retrieving a load thereat; power means for actuating said carrier; control means for operating said carrier including selector means; said selector means comprising first command selective control elements for causing said carrier to move to a first selected support means in execution of a first command; said selector means comprising second command selective control elements for causing said carrier to move to a second selected support means in execution of a second command; said control means including cycling means for initiating cycling whereby said carrier is caused to move to a selected support means of a command and automatically return to said station after executing a command; said control means including a second command initiating control element actuatable by return movement only of said carrier toward said station whereby upon initiation of said cycling, said first command is always executed first, after which, upon return movement of said carrier toward but short of said station, said second command is executed; said control means including a two-command selector having two operative positions; said second command initiating control element responsive to said two command selector in one position to cause execution of a second command when said second command initiating control element is actuated; said second command initiating control element being rendered ineffective when said two-command selector is in the other position whereby only a single command is executed by said carrier.

4. A load transfer and storage apparatus comprising a storage frame having a plurality of load support means arranged in vertical and horizontal rows; a pick-up-and-discharge station aligned with one of said horizontal rows; a load carrier movable horizontally along said one horizontal row to a selected one of said vertical rows and then vertically to the level of a selected one of said support means; said carrier having means for picking up or depositing a load at any selected support means; power means for actuating said carrier; control means for operating said carrier including selector means; said selector means comprising first command selective control elements for causing said carrier to move to a first selected support means in execution of a first command; said selector means comprising second command selective control elements for causing said carrier to move to a second selected support means in execution of a second command; said control means including cycling means for initiating cycling whereby said carrier is caused to move forwardly, first horizontally and then vertically, to a selected support means of a command and automatically return rearwardly, first vertically and then horizontally, to said station after executing a command; said control means including means automatically deactivating said cycling means after completion of said first command upon return movement of said carrier rearwardly in a horizontal direction and means automatically reinitiating said cycling means in a forward horizontal direction after said cycling means has been deactivated and causing said carrier to execute said second command before said carrier returns to said station; said control means including reject means carried by said carrier and responsive to a load on a selected support means of a command, when said carrier is loaded, causing said carrier to return directly to said station whereby when said reject means is actuated during execution of a first command, both commands are terminated.

5. A load transfer and storage apparatus comprising a storage frame having a plurality of load support means arranged in vertical and horizontal rows; a pick-up-and-discharge station aligned with one of said horizontal rows; a load carrier movable horizontally along said one horizontal row to a selected one of said vertical rows and then vertically to the level of a selected one of said support means; said carrier having means for picking up or depositing a load at any selected support means; power means for actuating said carrier; control means for operating said carrier including selector means; said selector means comprising first command selective control elements for causing said carrier to move to a first selected support means in execution of a first command; said selector means comprising second command selective control elements for causing said carrier to move to a second selected support means in execution of a second command; said control means including cycling means for initiating cycling whereby said carrier is caused to move forwardly, first horizontally and then vertically, to a selected support means of a command and automatically return rearwardly, first vertically and then horizontally, to said station after executing a command; said control means including means automatically deactivating said cycling means after completion of said first command upon return movement of said carrier rearwardly in a horizontal direction and means automatically reinitiating said cycling means in a forward horizontal direction after said cycling means has been deactivated and causing said carrier to execute said second command before said carrier returns to said station; said station being disposed adjacent to one end of said horizontal row; said first command control elements including an element for each said vertical row; said second command control elements including an element for each said vertical row; said control means including means deactivating said second command control elements when a vertical row designated by said second command control elements is passed by said carrier moving in a forward horizontal direction before said carrier reaches a vertical row designated by said first command control elements whereby said first command is executed before said second command.

6. A load transfer and storage apparatus comprising a storage frame having a plurality of load support means arranged in vertical and horizontal rows; a pick-up-and-discharge station aligned with one of said horizontal rows; a load carrier movable horizontally along said one horizontal row to a selected one of said vertical rows and then vertically to the level of a selected one of said support means; said carrier having means for picking up or depositing a load at any selected support means; power means for actuating said carrier; control means for operating said carrier including selector means; said selector means comprising first command selective control elements for causing said carrier to move to a first selected support means in execution of a first command; said selector means comprising second command selective control elements for causing said carrier to move to a second selected support means in execution of a second command; said control means including cycling means for initiating cycling whereby said carrier is caused to move forwardly, first horizontally and then vertically, to a selected support means of a command and automatically return rearwardly, first vertically and then horizontally, to said station after executing a command; said control means including means automatically deactivating said cycling means after completion of said first command upon return movement of said carrier rearwardly in a horizontal direction and means automatically reinitiating said cycling means in a forward horizontal direction after said cycling means has been deactivated and causing said carrier to execute said second command before said carrier returns to said station; said control means including a switch mounted to said carrier and actuatable to stop vertical movement of said carrier; said switch having an operative member; means defining a trip adjacent to the level of each said support means; said operative member having a portion engageable with any of said trips to actuate said switch and stop said carrier at the level of any of said support means; said operative member movably mounted relative to said carrier for movement from a first position out of actuating alignment with said trips to a second position in actuating alignment with said trips; and power means responsive to approach of said carrier to the level of a selected support means of either said command effecting movement of said operative member from said first position to said second position.

7. A load transfer and storage apparatus comprising a load storage frame having a plurality of load support means; a pick-up-and-discharge station; a load carrier movable forwardly from said station to any of said support means for depositing or retrieving a load thereat; power means for actuating said carrier; control means for operating said carrier including selector means; said selector means comprising first command selective control elements for causing said carrier to move to a first selected support means in execution of a first command; said selector means comprising second command selective control elements for causing said carrier to move to a second selected support means in execution of a second command; said control means including cycling means for causing said carrier to consecutively executive both said commands and return to said station after completion of said second command; said control means including a two-command selector having two operative position; said cycling means responsive to said two-command selector in one position and causing said carrier to consecutively execute both said commands and responsive to said selector is the other position causing said carrier to execute only said first command before returning to said station; and said control means including safety means, responsive to overtravel of said carrier beyond said storage frame in a forward direction, causing said carrier to stop and return rearwardly to said station whereby when said safety means is actuated during execution of a first command, both commands are terminated.

8. A load transfer and storage apparatus comprising a storage frame having a plurality of load support means arranged in vertical and horizontal rows; means defining a pick-up-and-discharge station; a load carrier movable from said station to a selected one of said support means for picking up or depositing a load thereat; electrical power means for actuating said carrier; first and second command selectors for directing said carrier to move sequentially to two selected load support means in execution of first and second commands; each said selector comprising a first set of switches corresponding to the vertical rows of said support means and a second set of switches corresponding to the horizontal rows of said support means; cycling means for causing said carrier to execute a command and for causing said carrier to return to said station after executing a command in response to actuation of selected switches of a first and second set of switches of a selector corresponding to selected vertical and horizontal rows, the intersection of which defines the location of a selected support means; and means interrupting said cycling means after said carrier has executed a command of said first command selector and causing said carrier to execute a command of said second command selector before returning to said station.

9. A load transfer and storage apparatus as set forth in claim 8; said control means including a command selector switch having two operative positions in one of which only one command may be executed, and in the other of which two commands may be executed.

References Cited in the file of this patent

UNITED STATES PATENTS

| | | |
|---|---|---|
| 650,848 | Littlefield | June 5, 1900 |
| 1,566,488 | Lewis | Dec. 22, 1925 |
| 1,694,823 | Larson | Dec. 11, 1928 |
| 1,717,046 | Lindquist et al. | June 11, 1929 |
| 1,737,357 | Christel | Nov. 26, 1929 |
| 1,768,360 | Jenney | June 24, 1930 |
| 1,773,163 | Becker | Aug. 19, 1930 |
| 1,873,829 | Dunlop | Aug. 23, 1932 |
| 1,911,015 | Crabbe et al. | May 23, 1933 |
| 1,934,508 | McCormick | Nov. 7, 1933 |
| 1,938,238 | Wallis | Dec. 5, 1933 |
| 2,014,351 | Becker | Sept. 10, 1935 |
| 2,093,074 | Dickinson | Sept. 14, 1937 |
| 2,102,995 | Combs | Dec. 21, 1937 |
| 2,204,023 | Mason | June 11, 1940 |
| 2,435,471 | Schmidt | Feb. 3, 1948 |
| 2,626,065 | Sanders et al. | Jan. 20, 1953 |
| 2,691,448 | Lontz | Oct. 12, 1954 |
| 2,707,666 | Becker | May 3, 1955 |
| 2,804,218 | Sylvester et al. | Aug. 27, 1957 |
| 2,816,624 | Asheim et al. | Dec. 17, 1957 |
| 2,915,204 | Alimanestiano | Dec. 1, 1959 |
| 2,936,081 | Peras | May 10, 1960 |
| 2,941,738 | Burke et al. | June 21, 1960 |
| 3,049,247 | Lemelson | Aug. 14, 1962 |

FOREIGN PATENTS

| | | |
|---|---|---|
| 717,018 | Great Britain | Oct. 20, 1954 |
| 1,227,258 | France | Mar. 7, 1960 |

UNITED STATES PATENT OFFICE

CERTIFICATE OF CORRECTION

Patent No. 3,139,994 July 7, 1964

Anthony R. Chasar

It is hereby certified that error appears in the above numbered patent requiring correction and that the said Letters Patent should read as corrected below.

Column 3, line 38, for "Coils, Motor Brakes", in italics, read -- Coils, Motor, Motor Brakes --, in italics; column 4, line 50, for "VSC-C" read -- VSU-C --; column 5, line 6, for "PDJ" read -- PJD --; line 51, for "and/or movable" read -- and/or H movable --; column 11, line 64, for "which" read -- switch --; column 13, line 41, for "3R-C", first occurrence, read -- 3R-3 --; column 14, line 15, for "38-3" read -- 3R-3 --; column 15, line 13, for "38-3" read -- 3R-3 --; same line 13, for "38-C" read -- 3R-C --; column 16, line 29, for "blake" read -- brake --; line 53, for "LST-6" read -- LST-16 --; column 18, line 59, strike out "HSOL-2", first occurrence; column 21, line 37, for "To", in italics, read -- Two --, in italics; column 22, line 14, for "3LR-3" read -- 2LR-3 --; column 26, line 7, for "LS-90A" read -- LS-9A --; line 22, strike out the opening parenthesis; column 27, line 68, for "HFS-1" read -- HSF-1 --; column 33, line 55, for "bag" read -- bay --; column 34, lines 69 and 70, for "DVU From Position P8", in italics, read -- DVU From Position P7 to Position P8 --, in italics; column 36, line 36, for "HNS-1" read -- HNS1-1 --; column 37, line 50, for "59K to" read -- 59K occurs to --; column 42, line 49, for "FOR" rea -- FAR --; line 74, for "HN2R-2" read -- HN2R-C --; column 56, line 27, for "HNCFT" read -- HNFCT, or HNRCT --; column 65, line 73, for "executive" read -- execute --.

Signed and sealed this 28th day of September 1965.

(SEAL)
Attest:

ERNEST W. SWIDER
Attesting Officer

EDWARD J. BRENNER
Commissioner of Patents